US011382473B2

(12) United States Patent
Burns et al.

(10) Patent No.: US 11,382,473 B2
(45) Date of Patent: Jul. 12, 2022

(54) PREDICTIVE MAINTENANCE OF MOBILE CLEANING ROBOT

(71) Applicant: iRobot Corporation, Bedford, MA (US)

(72) Inventors: Daniel J. Burns, Wakefield, MA (US); Teresa Borcuch, Acton, MA (US)

(73) Assignee: iRobot Corporation, Bedford, MA (US)

( * ) Notice: Subject to any disclaimer, the term of this patent is extended or adjusted under 35 U.S.C. 154(b) by 424 days.

(21) Appl. No.: 16/710,126

(22) Filed: Dec. 11, 2019

(65) Prior Publication Data
US 2021/0177226 A1 Jun. 17, 2021

(51) Int. Cl.
*A47L 9/28* (2006.01)
*A47L 9/04* (2006.01)

(52) U.S. Cl.
CPC .......... *A47L 9/2805* (2013.01); *A47L 9/0466* (2013.01); *A47L 9/281* (2013.01); *A47L 9/2826* (2013.01);
(Continued)

(58) Field of Classification Search
CPC ............. A47L 2201/00; A47L 2201/02; A47L 2201/04; A47L 2201/06; A47L 9/0466; A47L 9/2805; A47L 9/281; A47L 9/2826; A47L 9/2831; A47L 9/2847; A47L 9/2852; A47L 9/2857
See application file for complete search history.

(56) References Cited

U.S. PATENT DOCUMENTS 1,755,054 A * 4/1930 Darst .................... F16C 33/805
384/488
1,780,221 A * 11/1930 Buchmann ............... A46B 3/00
15/194
(Continued)

FOREIGN PATENT DOCUMENTS

AU     2003275566    6/2004
CN      1889882      1/2007
(Continued)

OTHER PUBLICATIONS

"International Application Serial No. PCT US2020 043188, International Search Report dated Oct. 8, 2020", 4 pgs.
(Continued)

*Primary Examiner* — Marc Carlson
(74) *Attorney, Agent, or Firm* — Schwegman Lundberg & Woessner, P.A.

(57) ABSTRACT

Described herein are systems and methods for assessing a health status of a cleaning head assembly in a mobile cleaning robot. The mobile robot includes motorized cleaning member that rotatably engages a floor surface to extract debris. An exemplary system includes a processor circuit that receives robot data produced by the mobile cleaning robot traversing an environment, determines a robot parameter using a portion of the received robot data corresponding to a floor area having a specific surface condition traversed repeatedly by the mobile cleaning robot, and determines a state of the cleaning head and an estimate of remaining useful life of the cleaning head based on the robot parameter. The determined state of the cleaning head system can be provide to a user via a user interface.

20 Claims, 21 Drawing Sheets

(52) U.S. Cl.
CPC ........... *A47L 9/2831* (2013.01); *A47L 9/2852* (2013.01); *A47L 2201/02* (2013.01); *A47L 2201/04* (2013.01)

(56) References Cited

U.S. PATENT DOCUMENTS

| | | | | |
|---|---|---|---|---|
| 1,970,302 | A * | 8/1934 | Gerhardt | A46B 13/001 |
| | | | | 15/198 |
| 2,136,324 | A * | 11/1938 | Simon | A47L 11/4069 |
| | | | | 15/372 |
| 2,302,111 | A * | 11/1942 | Dow | A47L 9/02 |
| | | | | 15/396 |
| 2,353,621 | A * | 7/1944 | Replogle | A47L 9/19 |
| | | | | 15/339 |
| 2,770,825 | A * | 11/1956 | Pullen | A47L 11/4013 |
| | | | | 15/48 |
| 3,119,369 | A * | 1/1964 | Harland | A47L 9/19 |
| | | | | 96/416 |
| 4,953,253 | A * | 9/1990 | Fukuda | A47L 9/2847 |
| | | | | 15/377 |
| 4,958,406 | A * | 9/1990 | Toyoshima | A47L 9/2821 |
| | | | | 15/319 |
| 5,086,539 | A * | 2/1992 | Rench | A47L 5/30 |
| | | | | 15/384 |
| 5,255,409 | A * | 10/1993 | Fujiwara | A47L 9/2831 |
| | | | | 15/412 |
| 5,722,109 | A * | 3/1998 | Delmas | A47L 9/2894 |
| | | | | 15/412 |
| 6,389,329 | B1 * | 5/2002 | Colens | A47L 9/2805 |
| | | | | 318/587 |
| 6,532,404 | B2 * | 3/2003 | Colens | A47L 11/4011 |
| | | | | 318/587 |
| 6,594,844 | B2 * | 7/2003 | Jones | G05D 1/0238 |
| | | | | 15/49.1 |
| 6,690,134 | B1 * | 2/2004 | Jones | G05D 1/028 |
| | | | | 318/587 |
| 6,781,338 | B2 | 8/2004 | Jones et al. | |
| 8,584,305 | B2 * | 11/2013 | Won | A47L 11/4013 |
| | | | | 15/319 |
| 9,375,847 | B2 * | 6/2016 | Angle | H04L 12/282 |
| 9,993,129 | B2 * | 6/2018 | Santini | A47L 11/4041 |
| 2018/0147721 | A1 * | 5/2018 | Griffin | G05D 1/0274 |
| 2018/0338655 | A1 * | 11/2018 | Schregardus | A47L 9/0411 |
| 2018/0344116 | A1 * | 12/2018 | Schriesheim | G06F 3/0486 |
| 2019/0142233 | A1 | 5/2019 | Swett et al. | |

FOREIGN PATENT DOCUMENTS

| | | |
|---|---|---|
| CN | 102890508 | 1/2013 |
| DE | 2128842 | 12/1980 |
| EP | 2407074 | 1/2012 |
| WO | 2018217226 | 11/2018 |

OTHER PUBLICATIONS

"International Application Serial No. PCT US2020 043188, Written Opinion dated Oct. 8, 2020", 5 pgs.

* cited by examiner

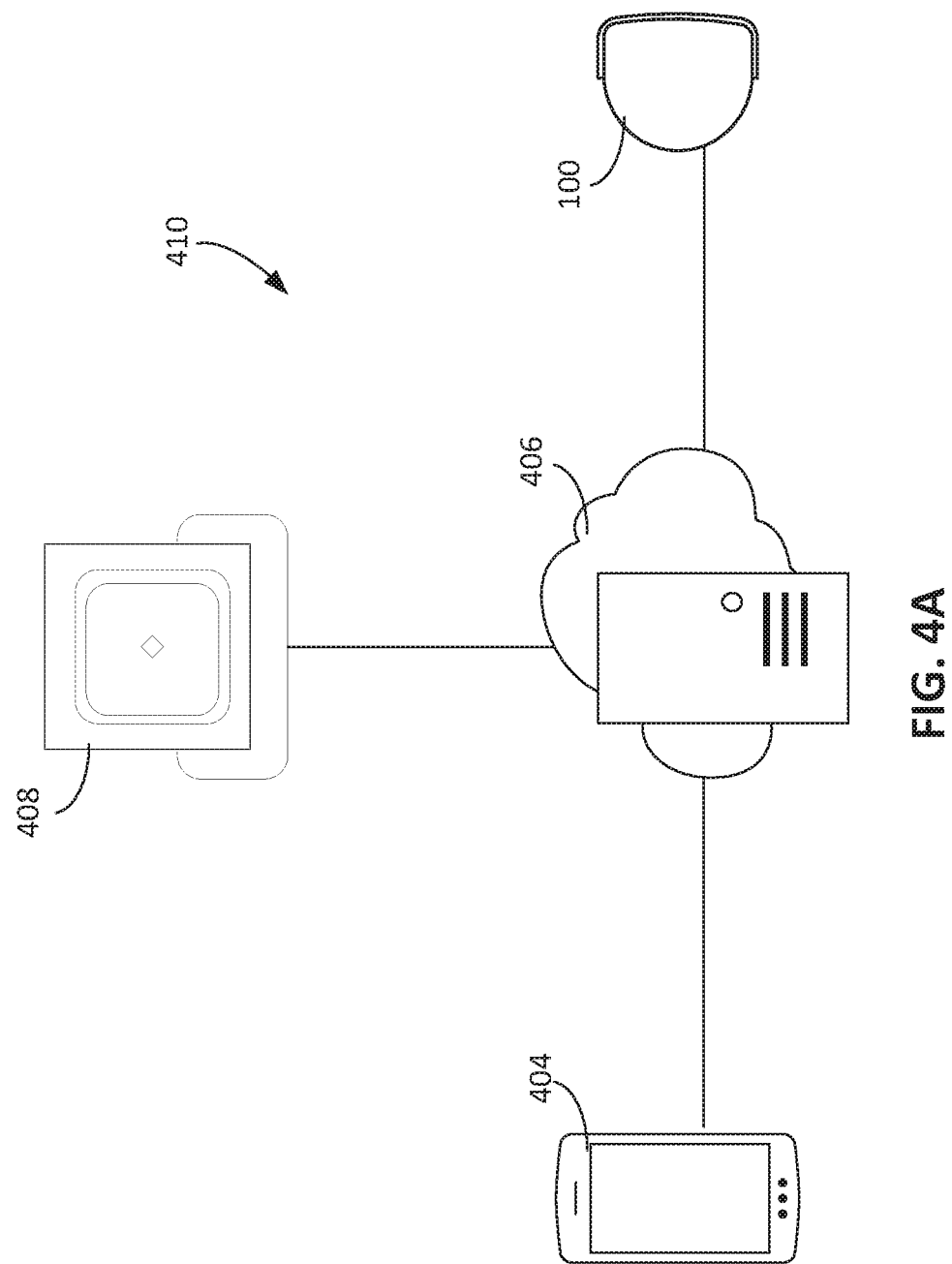

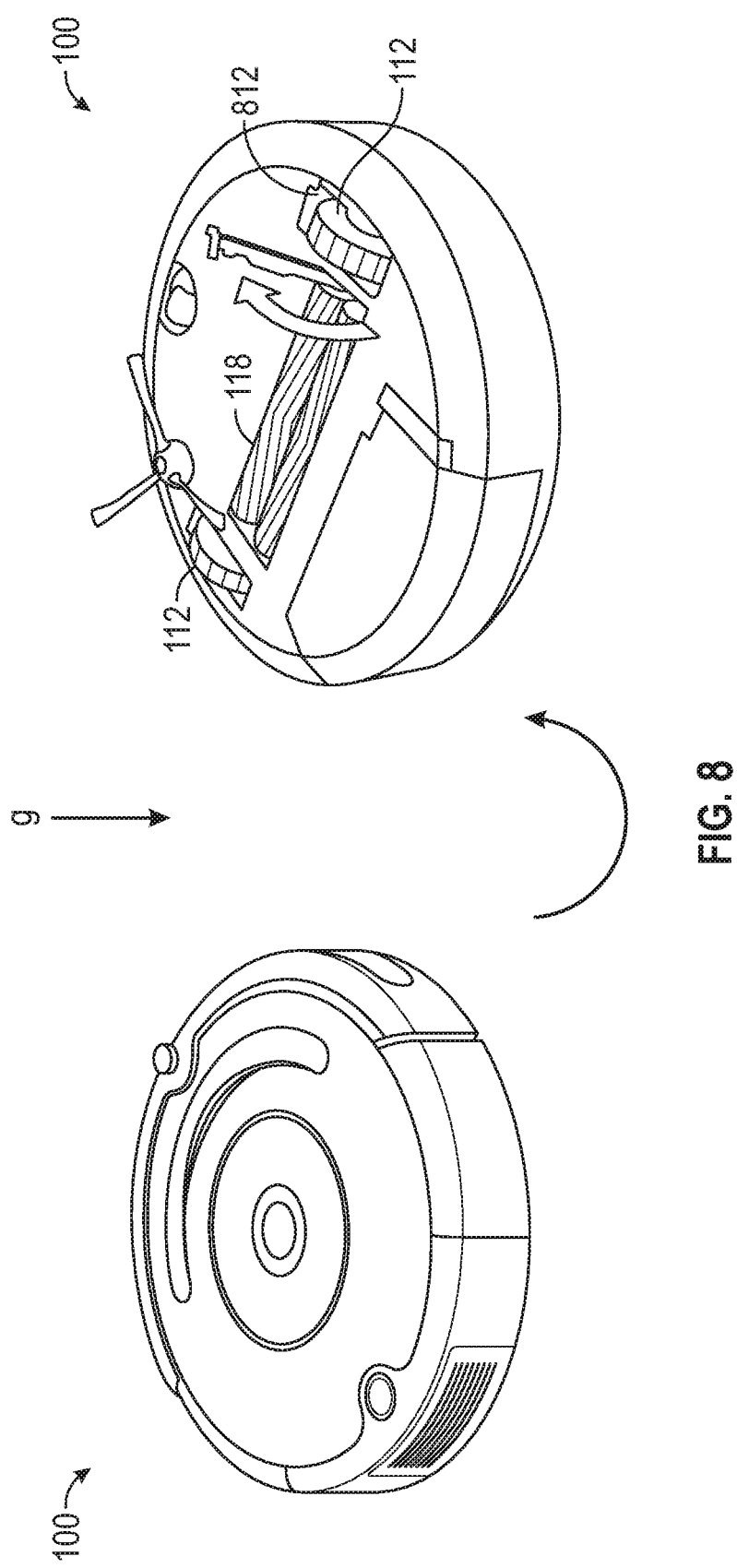

PREDICTIVE MAINTENANCE OF MOBILE CLEANING ROBOT

TECHNICAL FIELD

This document relates generally to mobile robots and, more particularly, to systems, devices, and methods for predictive maintenance of mobile cleaning robot.

BACKGROUND

Autonomous mobile robots can move about a surface in an environment. Examples of the autonomous mobile robots include cleaning robots that autonomously perform cleaning tasks within an environment, e.g., a home. Many kinds of cleaning robots are autonomous to some degree and in different ways. A cleaning robot can conduct "cleaning missions," Where the robot traverses and simultaneously ingests (e.g., vacuums) debris from the floor surface of their environment.

A mobile cleaning robot can include a cleaning head, such as brushes, beater rollers, or the like that pick up or help pick up debris. However, while the cleaning head can agitate and extract debris and dirt away from the floor surface, filaments (e.g., hair, thread, string, carpet fiber) may become tightly wrapped around the roller. In particular, pet hair tends to accumulate rapidly and resist removal. Debris may accumulate in the cleaning head. Additionally, the cleaning head may become worn over time. Routine maintenance is essential for effective cleaning.

OVERVIEW

This document describes systems, devices; and methods for automatically determining a state of a cleaning head in a mobile cleaning robot, such as a wear level, or a debris accumulation level (i.e., a level of "dirtiness" of the cleaning head) of the cleaning head or a cleaning member thereof. The cleaning head state, and thus the requirement for maintenance, can be determined during normal operation of a mobile robot. Using a predictive maintenance approach, the cleaning head state is determined based on an actual condition of the cleaning head, rather than a population-aggregated estimate of expected life (e.g., an average or other population-based statistics). An exemplary system can receive robot data produced by the mobile cleaning robot traversing an environment, extract a portion of the received robot data corresponding to a floor area having a specific surface condition traversed by the mobile cleaning robot, determine a robot parameter using the extracted robot data portion, determine a state of the cleaning head, and estimate the remaining useful life of the cleaning head, based on the robot parameter. The system can generate a recommendation for a user to clean the cleaning head, or to replace the cleaning head that wears out.

Example 1 is a system for assessing a health status of a cleaning head assembly in a mobile cleaning robot that includes a cleaning member driven by a motor and rotatably engaging a floor surface to extract debris. The system comprises a processor circuit configured to receive robot data produced by the mobile cleaning robot traversing an environment; determine a robot parameter using a portion of the received robot data corresponding to a floor area in the environment traversed by the mobile cleaning robot, the floor area having a surface condition; and determine a state of the cleaning head based on the determined robot parameter, the cleaning head state indicative of at least one of a wear level or a debris accumulation level for the cleaning member; and a user interface configured to notify a user of the determined state of the cleaning head.

In Example 2, the subject matter of Example 1 optionally includes the processor circuit that can be configured to generate a trend of the robot parameter including over multiple cleaning missions respectively comprising traversal of the same floor area by the mobile cleaning robot, and to determine the state of the cleaning head based on the generated trend of the robot parameter.

In Example 3, the subject matter of any one or more of Examples 1-2 optionally includes the processor circuit that can be further configured to generate an estimate of remaining useful life (ERL) of the cleaning member using the determined robot parameter.

In Example 4, the subject matter of any one or more of Examples 1-3 optionally includes the robot data that can include measurements of one or more of: voltage supplied to the motor; motor current; angular velocity of the cleaning member; or torque generated at the cleaning member.

In Example 5, the subject matter of any one or more of Examples 3-4 optionally includes the processor circuit that can be configured to: estimate a state variable of the cleaning member using (1) a mathematical model of the cleaning head assembly representing cleaning head dynamics, and (2) the data portion corresponding to the floor area with the surface condition; and generate the ERL of the cleaning member using the estimated state variable.

In Example 6, the subject matter of Example 5 optionally includes the state variable that can include a disturbance torque associated with debris accumulation in the cleaning member or wear of the cleaning member.

In Example 7, the subject matter of any one or more of Examples 5-6 optionally includes the mathematical model that can include a state space model, and the processor circuit can be configured to generate the state space response model using (1) voltage supplied to the motor to drive the cleaning member and (2) resulting motor current when the mobile cleaning robots operates on one or more surface conditions.

In Example 8, the subject matter of any one or more of Examples 1-7 optionally includes the processor circuit that can be configured extract the portion of the received robot data corresponding to the floor area with the surface condition based on a floor map containing information about surface conditions of one or more floor areas in the environment, the surface condition including one or more of: a floor type; a floor surface at a specific spatial location of the environment; a platform surface of a docking station for the mobile cleaning robot; or a floor surface having a specific dimension or shape.

In Example 9, the subject matter of any one or more of Examples 1-8 optionally includes the processor circuit that can be configured to extract the portion of the received robot data according to a phase of a cleaning mission including at least one of: a docking phase upon which the mobile cleaning robot returns to a docking station; or an undocking phase upon which the mobile cleaning robot departs the docking station.

In Example 10, the subject matter of any one or more of Examples 1-9 optionally includes the robot parameter that can include energy generated by the motor for driving the cleaning member across the floor area with the surface condition, and the processor circuit that can be configured to: generate a trend of motor energy including over multiple cleaning missions respectively comprising traversal of the same floor area by the mobile cleaning robot; determine the debris accumulation level based on an increase trend of the motor energy during a first monitoring period; and determine the wear level based on a decrease trend of the motor energy during a second monitoring period longer than the first monitoring period.

In Example 11, the subject matter of Example 10 optionally includes the first monitoring period between two consecutive maintenance services of the cleaning head.

In Example 12, the subject matter of any one or more of Examples 10-11 optionally includes the processor circuit that can be configured to trend the motor energy over multiple cleaning missions each occurred at a specific time relative to the detected indication of maintenance of the cleaning head.

In Example 13, the subject matter of Example 12 optionally includes a maintenance detector circuit coupled to one or more sensors to detect an indication of maintenance being performed on the cleaning head.

In Example 14, the subject matter of any one or more of Examples 1-13 optionally includes the robot parameter that can include a dynamic response of the motor driving the cleaning member to rotatably engage a platform surface of a docking station for the mobile cleaning robot, and the processor circuit that can be configured to determine the state of the cleaning head based on a comparison of the determined dynamic response of the motor to one or more of a first motor response template for a worn cleaning head, or a second motor response template for a debris-accumulated cleaning head; and wherein the first and second motor response templates each can be generated using robot data corresponding to the cleaning member rotatably engaging the platform surface of the docking station.

In Example 15, the subject matter of Example 14 optionally includes the processor circuit that can be configured to: generate a parametric model to fit the determined dynamic response of the motor; determine one or more model parameters for the parametric model such that the fitting satisfies a specific criterion; and determine the state of the cleaning head using the determined one or more model parameters.

In Example 16, the subject matter of any one or more of Examples 1-15 optionally includes a plurality of estimators associated with respective floor areas in the environment with respective surface conditions. The plurality of estimators each can be configured to determine a respective robot parameter using a portion of the received robot data corresponding to the respective floor area. The processor circuit can be configured to: generate a composite robot parameter using the robot parameters respectively determined by the plurality of estimators in a cleaning mission; generate a trend of the composite robot parameter over multiple cleaning missions each comprising traversal of one or more of the respective floor areas by the mobile cleaning robot; and determine the state of the cleaning head based on the generated trend of the composite robot parameter.

In Example 17, the subject matter of Example 16 optionally includes the processor circuit that can be configured to determine for each of the plurality of estimators a respective weight factor, and to generate the composite robot parameter using a combination of the robot parameters weighted by respective weight factors.

In Example 18, the subject matter of Example 17 optionally includes the plurality of estimators each can be configured to generate an estimated remaining useful life (ERL) of the cleaning member, and the processor circuit that can be configured to generate an aggregated ERL using a combination of the ERLs weighted by the respective weight factors.

In Example 19, the subject matter of any one or more of Examples 17-18 optionally includes the processor circuit that can be configured to determine the weight factor based on a floor type of the floor area associated with the respective estimator.

In Example 20, the subject matter of any one or more of Examples 17-19 optionally includes the processor circuit that can be configured to determine the weight factor based on a variability metric of the robot data acquired when the mobile cleaning robot traverses the floor area associated with the respective estimator in a cleaning mission.

In Example 21, the subject matter of any one or more of Examples 1-20 optionally includes the user interface that can be configured to notify the user of the ERL of the cleaning member.

In Example 22, the subject matter of any one or more of Examples 1-21 optionally include the user interface that can be configured to generate a recommendation to clean the cleaning member in response to the determined debris accumulation level; or a recommendation to replace the cleaning member based on the determined wear level.

In Example 23, the subject matter of any one or more of Examples 1-22 optionally include the user interface that can be configured to prompt the user to purchase a new cleaning head to replace the cleaning head with the determined wear level.

Example 24 is a method of assessing a health status of a cleaning head assembly in a mobile cleaning robot including a cleaning member driven by a motor and rotatably engaging a floor surface to extract debris. The method comprises steps of: receiving robot data produced by the mobile cleaning robot traversing an environment; determining, via a processor circuit, a robot parameter using a portion of the received robot data corresponding to a floor area in the environment traversed by the mobile cleaning robot, the floor area having a surface condition; determining, via the processor circuit, a state of the cleaning head based on the determined robot parameter, the cleaning head state indicative of at least one of a wear level or a debris accumulation level for the cleaning member; and presenting on a user interface the determined state of the cleaning head.

In Example 25, the subject matter of Example 24 optionally includes extracting the portion of the received robot data corresponding to the floor area with the surface condition based on a floor map containing information about surface conditions of one or more floor areas in the environment. The surface condition can include one or more of: a floor type; a floor surface at a specific location in the environment; a platform surface of a docking station for the mobile cleaning robot; or a floor surface having a specific dimension or shape.

In Example 26, the subject matter of any one or more of Examples 24-25 optionally include extracting the portion of the received robot data based on a specific phase of a cleaning mission including at least one of: a docking phase upon which the mobile cleaning robot returns to a docking station; or an undocking phase upon which the mobile cleaning robot departs the docking station.

In Example 27, the subject matter of any one or more of Examples 24-26 optionally includes generating an estimate of remaining useful life (ERL) of the cleaning member using the determined robot parameter.

In Example 28, the subject matter of Example 27 optionally includes estimating a state variable of the cleaning member using (1) a mathematical model of the cleaning head assembly representing cleaning head dynamics, and (2) the data portion corresponding to the floor area with the surface condition; and generating the ERL of the cleaning member using the estimated state variable.

In Example 29, the subject matter of Example 28 optionally includes the state variable that can include a disturbance torque associated with debris accumulation in the cleaning member or wear of the cleaning member. The present example can further include comprising generating a mathematical model including a state space model representing a relationship between (1) voltage supplied to the motor to drive the cleaning member and (2) resulting motor current when the mobile cleaning robots operates on one or more surface conditions.

In Example 30, the subject matter of any one or more of Examples 24-29 optionally includes the robot parameter that can include energy generated by the motor for driving the cleaning member across the floor area with the surface condition. The present example can further include generating a trend of the robot parameter including over multiple cleaning missions respectively comprising traversal of the same floor area by the mobile cleaning robot determining the debris accumulation level based on an increase trend of the motor energy during a first monitoring period; and determining the wear level based on a decrease trend of the motor energy during a second monitoring period longer than the first monitoring period.

In Example 31, the subject matter of Example 30 optionally includes: detecting or receiving an indication of maintenance being performed on the cleaning head; determining the debris accumulation level based on an increase trend of the motor energy during a first monitoring period between two consecutive maintenance services of the cleaning head; and determining the wear level based on a decrease trend of the motor energy over multiple cleaning missions each occurred at a specific time relative to the detected indication of maintenance of the cleaning head.

In Example 32, the subject matter of any one or more of Examples 24-31 optionally includes the robot parameter that can include a dynamic response of the motor driving the cleaning member to rotatably engage a platform surface of a docking station for the mobile cleaning robot. The step of determining the state of the cleaning head can be based on a comparison of the determined dynamic response of the motor to one or more of a first motor response template for a worn cleaning head, or a second motor response template for a debris-accumulated cleaning head. The first and second motor response templates each can be generated using robot data corresponding to the cleaning member rotatably engaging the platform surface of the docking station.

In Example 33, the subject matter of any one or more of Examples 24-35 optionally includes: determining at least a first robot parameter using a first portion of the received robot data corresponding to a first floor area in the environment having a first surface condition, and a second robot parameter using a second portion of the received robot data corresponding to a second floor area in the environment having a second surface condition, the first and second floor areas each traversed by the mobile cleaning robot; generating a composite robot parameter using at least the first and second robot parameters; generating a trend of the composite robot parameter over multiple cleaning missions each comprising traversal of one or more of the first or the second floor area by the mobile cleaning robot; and determining the state of the cleaning head based on the generated trend of the composite robot parameter.

In Example 34, the subject matter of Example 33 optionally includes generating a weighted combination of at least the first and second robot parameters weighted by respective weight factors.

In Example 35, the subject matter of any one or more of Examples 24-34 optionally includes: generating at least a first estimate of remaining useful life (ERL) of the cleaning member using the first robot parameter, and a second ERL of the cleaning member using the second robot parameter; and generating an aggregated ERL using at least the first and second ERLs weighted by respective weight factors.

Example 36 is a device for assessing a health status of a cleaning head assembly in a mobile cleaning robot. The device comprises: a communication circuit configured to communicatively couple to the mobile robot to receive robot data produced by the mobile cleaning robot traversing an environment; a memory circuit configured to store a floor map containing information about surface conditions including floor types of one or more floor areas in the environment; a processor circuit configured to: using the floor map, extract a portion of the received robot data corresponding to a floor area traversed by the mobile cleaning robot, the floor area having a specific floor type; determine a robot parameter using the extracted data portion; and determine a state of the cleaning head based on the determined robot parameter, the cleaning head state indicative of at least one of a wear level or a debris accumulation level for a cleaning member of the cleaning head assembly; and a user interface configured to notify a user of the determined state of the cleaning head.

In Example 37, the subject matter of Example 36 optionally includes the processor circuit that can further be configured to generate an estimate of remaining useful life (ERL) of the cleaning member using the determined robot parameter.

In Example 38, the subject matter of any one or more of Examples 36-37 optionally includes the robot parameter that can include energy generated by the motor for driving the cleaning member across the floor area with the specific floor type, and the processor circuit that can be configured to: generate a trend of motor energy including over multiple cleaning missions respectively comprising traversal of the same floor area by the mobile cleaning robot; determine the debris accumulation level based on an increase trend of the motor energy during a first monitoring period; and determine the wear level based on a decrease trend of the motor energy during a second monitoring period longer than the first monitoring period.

In Example 39, the subject matter of any one or more of Examples 36-38 optionally includes the robot parameter includes a dynamic response of the motor driving the cleaning member to rotatably engage a platform surface of a docking station for the mobile cleaning robot, and the processor circuit that can be configured to determine the state of the cleaning head based on a comparison of the determined dynamic response of the motor to one or more of a first motor response template for a worn cleaning head, or a second motor response template for a debris-accumulated cleaning head. The first and second motor response templates each can be generated using robot data corresponding to the cleaning member rotatably engaging the platform surface of the docking station.

In Example 40, the subject matter of any one or more of Examples 36-39 optionally includes the processor circuit that can be configured to: determine at least a first robot parameter using a first portion of the received robot data corresponding to a first floor area having a first floor type, and a second robot parameter using a second portion of the received robot data corresponding to a second floor area having a second floor type, the first and second floor areas each traversed by the mobile cleaning robot; generate a composite robot parameter using at least the first and second robot parameters weighted by respective weight factors; generate a trend of the composite robot parameter over multiple cleaning missions each comprising traversal of one or more of the first or the second floor area by the mobile cleaning robot; and determine the state of the cleaning head based on the generated trend of the composite robot parameter.

This Overview is an overview of some of the teachings of the present application and not intended to be an exclusive or exhaustive treatment of the present subject matter. Further details about the present subject matter are found in the detailed description and appended claims. Other aspects of the disclosure will be apparent to persons skilled in the art upon reading and understanding the following detailed description and viewing the drawings that form a part thereof, each of which are not to be taken in a limiting sense. The scope of the present disclosure is defined by the appended claims and their legal equivalents.

BRIEF DESCRIPTION OF THE DRAWINGS

Various embodiments are illustrated by way of example in the figures of the accompanying drawings. Such embodiments are demonstrative and not intended to be exhaustive or exclusive embodiments of the present subject matter.

FIG. 4A is a diagram illustrating an example of a communication network in which a mobile cleaning robot operates and data transmission in the network.

FIG. 8 is a diagram illustrating an exemplary method of detecting a maintenance action being performed on a cleaning head of a mobile robot.

DETAILED DESCRIPTION

Figure 1:
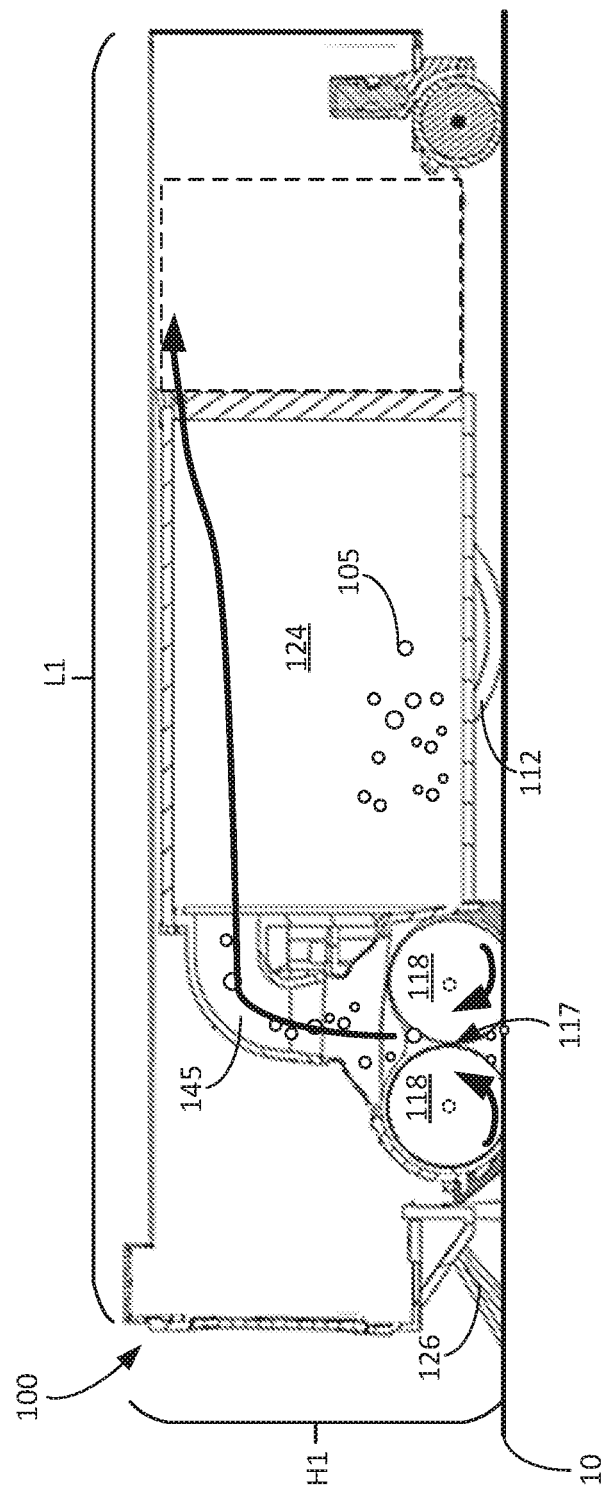
FIGS. 1, 2A, and 2B are side cross-sectional, bottom, and top perspective views of a mobile robot.

A mobile cleaning robot can have debris accumulation in its cleaning head after repeated use, such as errant filaments (e.g., hair, thread, string, carpet fiber) spooling tightly about a rotating brush or a roller. The cleaning head may wear out over time. Routine maintenance is essential for effective cleaning, as well as a healthy operating condition and prolonged useful life of the mobile robot. Conventionally, robot maintenance (e.g., cleaning the debris, repair, or replace the cleaning head) is often performed on a regular basis. This is known as scheduled maintenance or preventive maintenance, characterized by routine inspection periodically or at a set time. For example, when a certain amount of run time has elapsed from a reference time (e.g., time since last maintenance), an alert may be triggered to remind the user to clean the cleaning brushes, or to check the wear status of the cleaning brushes. Some mobile robots base a scheduled maintenance on odometry, or the distance traveled by the mobile robot, where a maintenance alert is triggered when the mobile robot has traveled a predetermined amount of distance. After performing the maintenance (e.g., cleaning the brushes), a user can manually reset the corresponding timer, or the odometer.

Scheduled maintenance, either based on elapsed time or distance traveled, essentially relies on a heuristic that presumes debris accumulates uniformly at a fixed rate for all robots and in all environments. However, in practice, debris accumulation often varies from robot to robot. A mobile robot rarely maintains a fixed debris accumulation rate due to different floor conditions in the robot environment, amount and distribution of debris, variations in cleaning missions, or cleaning frequencies or schedules, among other factors. Additionally, for many conventional mobile robots, the scheduled maintenance schedules, such as a threshold time or a threshold distance to trigger the maintenance alert, are predetermined based on a population-aggregated approximation of a degradation process of a cleaning head (e.g., debris accumulation, or normal wear out). Such populated-based estimate can be different from actual detection or inference of cleaning head state of an individual mobile robot, and can incorrectly or untimely trigger an alarm of debris or wear states of the cleaning head. For example, a scheduled maintenance can be unnecessary or premature when the cleaning head is not dirty or not worn out enough to require immediate attention. On the other hand, a scheduled maintenance can be overdue when the cleaning head becomes dirty or worn out well before next scheduled maintenance. Moreover, scheduled maintenance is likely to miss an accidental damage to the cleaning head that occurs prior to the next scheduled maintenance. For those reasons stated above, at least in some cases, scheduled maintenance can lead to poor cleaning performance, damaged components, and negative user satisfaction.

This document discusses a predictive maintenance (PdM) paradigm that predicts cleaning head state in a mobile cleaning robot, including individualized estimate of debris accumulation or wear levels of the cleaning head or a cleaning member thereof. PdM, also known as condition-based maintenance, is maintenance that monitors the performance and condition of equipment during normal operation to predict an occurrence of a particular type of event, such as a fault or failure of the equipment. Different from preventive maintenance, PdM relies on the actual condition of equipment, rather than average or expected life statistics (e.g., population-based estimate of debris buildup cycle or expected lifetime of the cleaning head), to predict when maintenance will be required.

When estimating wear and debris accumulation states of a cleaning head in a mobile cleaning robot, data collected from the mobile robot (e.g., via sensors configured to sense mechanical or electrical parameters) that are representative of wear or debris accumulation may be confounded by environmental conditions. For example, the floor type traversed by the robot can dominate the characteristic of the robot data. Dedicated sensors may be used to add additional sensing capabilities for automated means of inspecting the operating status of the cleaning head, such as through visual inspection, torque or force sensing, etc. However, these additional components add cost and complexity to an integrated system. Alternatively, sensors or derived signals that have been used in other robot operations (e.g., navigation, cleaning, and motion control) and already incorporated into the mobile robot may be reused and repurposed to assess cleaning head debris accumulation and wear states. For example, electric current measured from a motor driving the cleaning head is indicative of load on the cleaning head. The load may include a first component due to debris accumulation (e.g., hair), and a dominant second component due to interactions between a cleaning member (e.g., brushes) with the floor. The motor current measurement can be dominated by the surface condition of the floor area being cleaned, such as the floor type (e.g., hardwood, tile, or carpet). The present inventors have recognized a challenge in predictive maintenance of mobile cleaning robot, particularly an unmet need for an improved method of estimating wear and debris accumulation levels under different floor conditions.

The present document discusses predictive maintenance (PdM) of a mobile cleaning robot. A cleaning head assembly includes one or more cleaning members that, driven by one or more electric motors, rotatably engage a floor surface to agitate and extract debris. An exemplary system includes a data receiver to receive robot data produced by the mobile cleaning robot traversing an environment, and a controller that estimates debris accumulation and wear levels of the cleaning member. To disambiguate the impact of floor interactions and the impact of debris or wear states of the cleaning head on the measured robot data, the controller can determine a robot parameter using a portion of the received robot data corresponding to a specific floor area traversed by the mobile robot. The floor area has a specific surface condition, such as a particular floor type, a particular spatial location in the environment, or a particular area with specific size or dimension, etc. With such a controlled (i.e., substantially fixed) floor condition, the controller can determine the state of the cleaning head indicative of a wear level or a debris accumulation level based on the determined robot parameter. The system may include a user interface to prompt a user to perform maintenance or replacement of the cleaning head based on the determined debris or wear states.

Compared to conventional scheduled or preventive maintenance, the PdM of a mobile cleaning robot as discussed in the present document has several benefits. First, monitoring actual operating conditions of the cleaning head can reduce the number of faults or failures of a mobile robot, reduce downtime for repairs, and reduce maintenance cost. Second, the debris and wear levels are estimated using algorithms based on existing sensors, which have been used for other robot operations such as robot navigation and cleaning control. Avoidance of dedicated sensors for wear and debris state detection can reduce complexity of the integrated robot system, and bring down total cost. Third, the mobile robot PdM paradigm in this document also includes methods of disambiguating the impact of floor interactions and the impact of debris and wear of the cleaning head on the measured robot data. The present inventors have recognized that spatial information of the floors and floor surface conditions (e.g., floor type) can provide a means to control for floor type interactions between the cleaning head and the floor surface. Whereas robot data such as instantaneous measurement of motor responses (e.g., current draw, energy consumption, frequency domain transforms thereof, etc.) are dominated by interactions with the floor surface, tracking these robot data as functions of floor location and floor conditions, then trending those observations over time (e.g., using current measurement robot data and historical robot data), can provide a means for isolating the components due to debris and wear from the measured motor signals. For example, presuming that the floor type in a home does not change frequently, a trend of the robot data taken over the course of several cleaning missions can effectively control for the data variation due to floor interactions, and it is expected that the remaining effects will be due to debris accumulation and wear. Once the effect of spatial locations of floors and floor conditions is isolated and removed from the observations, more reliable and accurate inferences can be drawn from the robot data regarding the state of the cleaning head, including the wear level or the debris accumulation level, and subsequently used to communicate maintenance needs to the robot owner. Consequently, with the systems, devices, and methods for assessing robot cleaning head state as discussed herein, more efficient maintenance and improved operation of a mobile robot can be achieved.

In the following, mobile robot and its working environment are briefly discussed with reference to FIGS. 1-3. Detailed descriptions of systems, devices, and methods of coverage path planning, according to various embodiments described herein, are discussed with reference to FIGS. 4-15.

Examples of Autonomous Mobile Robots

Figure 2A:
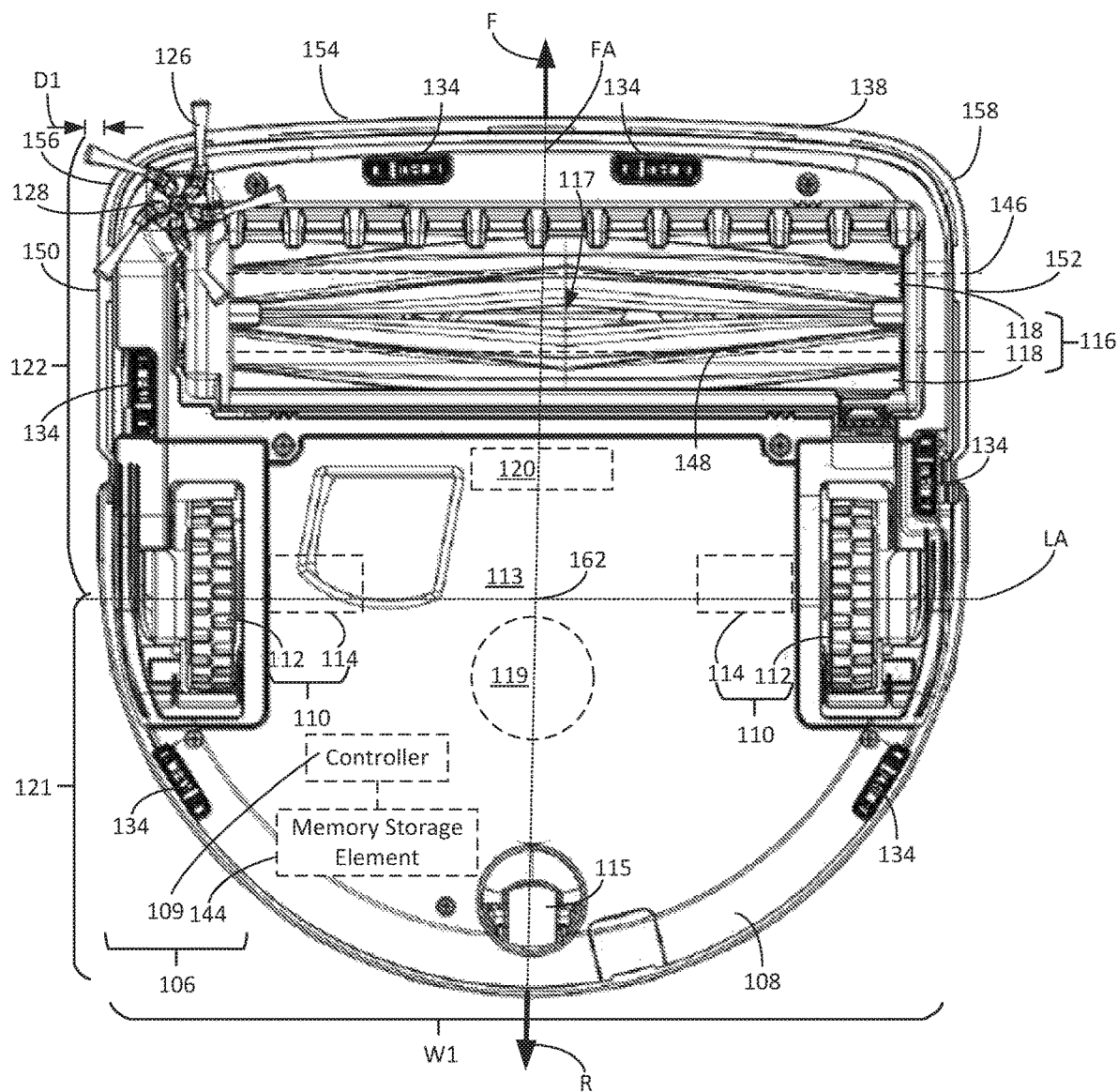
Figure 2B:
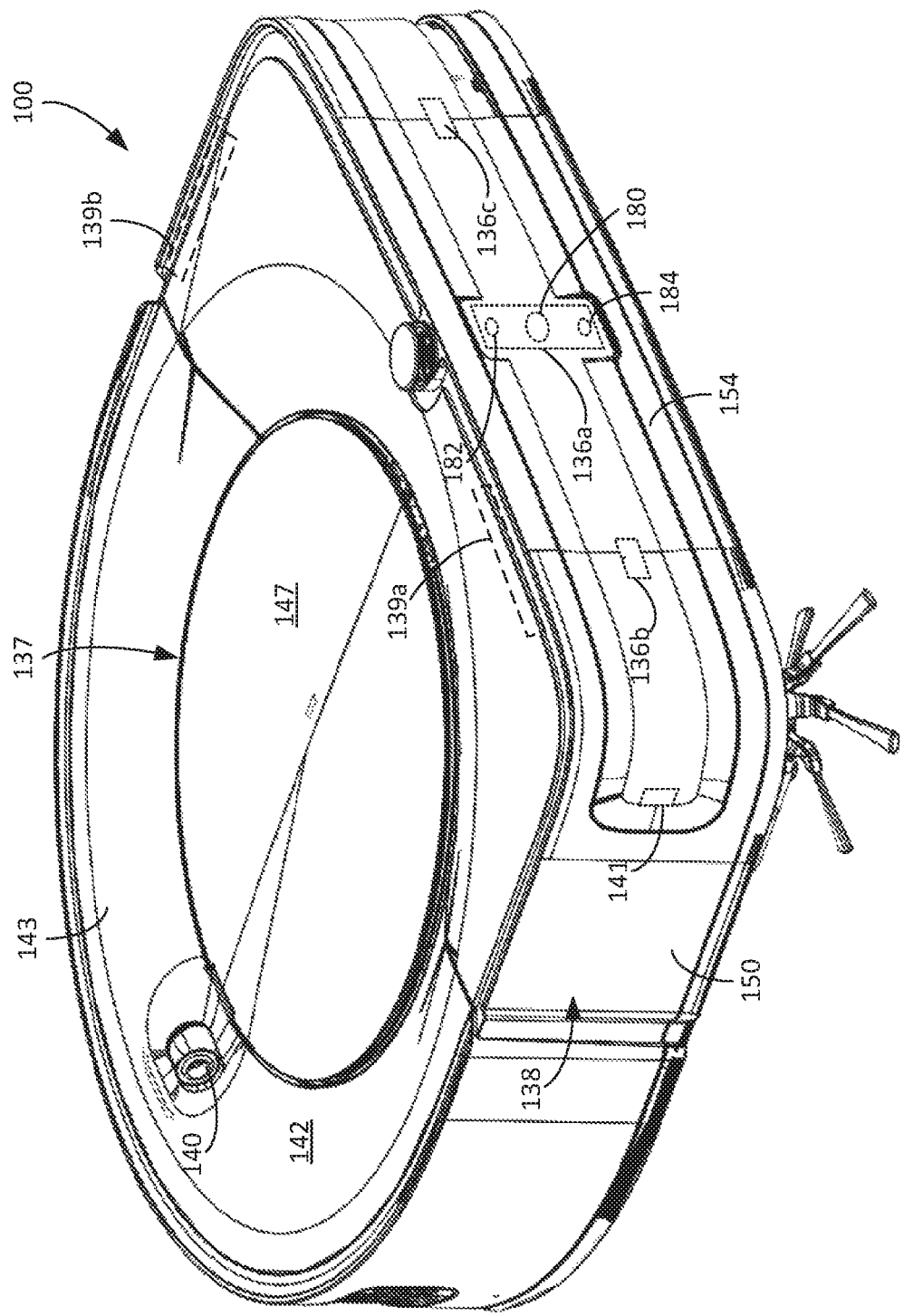

FIGS. 1 and 2A-2B depict different views of an example of a mobile floor-cleaning robot 100. Referring to FIG. 1, the robot 100 collects debris 105 from the floor surface 10 as the robot 100 traverses the floor surface 10. Referring to FIG. 2A, the robot 100 includes a robot housing infrastructure 108. The housing infrastructure 108 can define the structural periphery of the robot 100. In some examples, the housing infrastructure 108 includes a chassis, cover, bottom plate, and bumper assembly. The robot 100 is a household robot that has a small profile so that the robot 100 can fit under furniture within a home. For example, a height H1 (shown in FIG. 1) of the robot 100 relative to the floor surface is, for example, no more than 13 centimeters. The robot 100 is also compact. An overall length L1 (shown in FIG. 1) of the robot 100 and an overall width W1 (shown in FIG. 2) are each between 30 and 60 centimeters, e.g., between 30 and 40 centimeters, 40 and 50 centimeters, or 50 and 60 centimeters. The overall width W1 can correspond to a width of the housing infrastructure 108 of the robot 100.

The robot 100 includes a drive system 110 including one or more drive wheels. The drive system 110 further includes one or more electric motors including electrically driven portions forming part of the electrical circuitry 106. The housing infrastructure 108 supports the electrical circuitry 106, including at least a controller circuit 109, within the robot 100.

The drive system 110 is operable to propel the robot 100 across the floor surface 10. The robot 100 can be propelled in a forward drive direction F or a rearward drive direction R. The robot 100 can also be propelled such that the robot 100 turns in place or turns while moving in the forward drive direction F or the rearward drive direction 1Z. In the example depicted in FIG. 2A, the robot 100 includes drive wheels 112 extending through a bottom portion 113 of the housing infrastructure 108. The drive wheels 112 are rotated by motors 114 to cause movement of the robot 100 along the floor surface 10. The robot 100 further includes a passive caster wheel 115 extending through the bottom portion 113 of the housing infrastructure 108. The caster wheel 115 is not powered. Together, the drive wheels 112 and the caster wheel 115 cooperate to support the housing infrastructure 108 above the floor surface 10. For example, the caster wheel 115 is disposed along a rearward portion 121 of the housing infrastructure 108, and the drive wheels 112 are disposed forward of the caster wheel 115.

Retelling to FIG. 2B, the robot 100 includes a forward portion 122 that is substantially rectangular and a rearward portion 121 that is substantially semicircular. The forward portion 122 includes side surfaces 150, 152, a forward surface 154, and corner surfaces 156, 158. The corner surfaces 156, 1.58 of the forward portion 122 connect the side surface 150, 152 to the forward surface 154.

In the example depicted in FIGS. 1 and 2A-2B, the robot 100 is an autonomous mobile floor cleaning robot that includes a cleaning head assembly 116 (shown in FIG. 2A) operable to clean the floor surface 10. For example, the robot 100 is a vacuum cleaning robot in which the cleaning head assembly 116 is operable to clean the floor surface 10 by ingesting debris 105 (shown in FIG. 1) from the floor surface 10. The cleaning head assembly 116 includes a cleaning inlet 117 through which debris is collected by the robot 100. The cleaning inlet 117 is positioned forward of a center of the robot 100, e.g., a center 162, and along the forward portion 122 of the robot 100 between the side surfaces 150, 152 of the forward portion 122.

The cleaning head assembly 116 includes one or more rotatable members, e.g., rotatable members 118 driven by a roller motor 120. The rotatable members 118 extend horizontally across the forward portion 122 of the robot 100. The rotatable members 118 are positioned along a forward portion 122 of the housing infrastructure 108, and extend along 75% to 95% of a width of the forward portion 122 of the housing infrastructure 108, e.g., corresponding to an overall width W1 of the robot 100. Referring also to FIG. 1, the cleaning inlet 117 is positioned between the rotatable members 118.

As shown in FIG. 1, the rotatable members 118 are rollers that counter rotate relative to one another. For example, the rotatable members 118 can include a front roller and a rear roller mounted parallel to the floor surface 10 and spaced apart from one another by a small elongated gap. The rotatable members 118 can be rotatable about parallel horizontal axes 146, 148 (shown in FIG. 2A) to agitate debris 105 on the floor surface 10 and direct the debris 105 toward the cleaning inlet 117, into the cleaning inlet 117, and into a suction pathway 145 (shown in FIG. 1) in the robot 100. Referring back to FIG. 2A, the rotatable members 118 can be positioned entirely within the forward portion 122 of the robot 100. The rotatable members 118 include elastomeric shells that contact debris 105 on the floor surface 10 to direct debris 105 through the cleaning inlet 117 between the rotatable members 118 and into an interior of the robot 100, e.g., into a debris bin 124 (shown in FIG. 1), as the rotatable members 118 rotate relative to the housing infrastructure 108. The rotatable members 118 further contact the floor surface 10 to agitate debris 105 on the floor surface 10. In the example as illustrated in FIG. 2A, the rotatable members 118, such as front and rear rollers, may each feature a pattern of chevron-shaped vanes distributed along its cylindrical exterior, and the vanes of at least one roller make contact with the floor surface along the length of the roller and experience a consistently applied friction force during rotation that is not present with brushes having pliable bristles.

The rotatable members 118 may take other suitable configurations. In an example, at least one of the front and rear rollers may include bristles and/or elongated pliable flaps for agitating the floor surface. In an example, a flapper brush, rotatably coupled to the cleaning head assembly housing, can include a compliant flap extending radially outward from the core to sweep a floor surface as the roller is driven to rotate. The flap is configured to prevent errant filaments from spooling tightly about the core to aid subsequent removal of the filaments. The flapper brush includes axial end guards mounted on the core adjacent the ends of the outer core surface and configured to prevent spooled filaments from traversing axially from the outer core surface onto the mounting features. The flapper brush can include multiple floor cleaning bristles extending radially outward from the core.

The robot 100 further includes a vacuum system 119 operable to generate an airflow through the cleaning inlet 117 between the rotatable members 118 and into the debris bin 124. The vacuum system 119 includes an impeller and a motor to rotate the impeller to generate the airflow. The vacuum system 119 cooperates with the cleaning head assembly 116 to draw debris 105 from the floor surface 10 into the debris bin 124. In some cases, the airflow generated by the vacuum system 119 creates sufficient force to draw debris 105 on the floor surface 10 upward through the gap between the rotatable members 118 into the debris bin 124. In some cases, the rotatable members 118 contact the floor surface 10 to agitate the debris 105 on the floor surface 10, thereby allowing the debris 105 to be more easily ingested by the airflow generated by the vacuum system 119.

The robot 100 further includes a brush 126 (also referred to as a side brush) that rotates about a non-horizontal axis, e.g., an axis forming an angle between 75 degrees and 90 degrees with the floor surface 10. The non-horizontal axis, for example, forms an angle between 75 degrees and 90 degrees with the longitudinal axes of the rotatable members 118. The robot 100 includes a brush motor 128 operably connected to the side brush 126 to rotate the side brush 126.

The brush 126 is a side brush laterally offset from a fore-aft axis FA of the robot 100 such that the brush 126 extends beyond an outer perimeter of the housing infrastructure 108 of the robot 100. For example, the brush 126 can extend beyond one of the side surfaces 150, 152 of the robot 100 and can thereby be capable of engaging debris on portions of the floor surface 10 that the rotatable members 118 typically cannot reach, e.g., portions of the floor surface 10 outside of a portion of the floor surface 10 directly underneath the robot 100. The brush 126 is also forwardly offset from a lateral axis LA of the robot 100 such that the brush 126 also extends beyond the forward surface 154 of the housing infrastructure 108. As depicted in FIG. 2A, the brush 126 extends beyond the side surface 150, the corner surface 156, and the forward surface 154 of the housing infrastructure 108. In some implementations, a horizontal distance D1 that the brush 126 extends beyond the side surface 150 is at least, for example, 0.2 centimeters, e.g., at least 0.25 centimeters, at least 0.3 centimeters, at least 0.4 centimeters, at least 0.5 centimeters, at least 1 centimeter, or more. The brush 126 is positioned to contact the floor surface 10 during its rotation so that the brush 126 can easily engage the debris 105 on the floor surface 10.

The brush 126 is rotatable about the non-horizontal axis in a manner that brushes debris on the floor surface 10 into a cleaning path of the cleaning head assembly 116 as the robot 100 moves. For example, in examples in which the robot 100 is moving in the forward drive direction F, the brush 126 is rotatable in a clockwise direction (when viewed from a perspective above the robot 100) such that debris that the brush 126 contacts moves toward the cleaning head assembly and toward a portion of the floor surface 10 in front of the cleaning head assembly 116 in the forward drive direction F. As a result, as the robot 100 moves in the forward drive direction F, the cleaning inlet 117 of the robot 100 can collect the debris swept by the brush 126. In examples in which the robot 100 is moving in the rearward drive direction R, the brush 126 is rotatable in a counter-clockwise direction (when viewed from a perspective above the robot 100) such that debris that the brush 126 contacts moves toward a portion of the floor surface 10 behind the cleaning head assembly 116 in the rearward drive direction R. As a result, as the robot 100 moves in the rearward drive direction R, the cleaning inlet 117 of the robot 100 can collect the debris swept by the brush 126.

The electrical circuitry 106 includes, in addition to the controller circuit 109, a memory storage element 144 and a sensor system with one or more electrical sensors, for example. The sensor system, as described herein, can generate a signal indicative of a current location of the robot 100, and can generate signals indicative of locations of the robot 100 as the robot 100 travels along the floor surface 10. The controller circuit 109 is configured to execute instructions to perform one or more operations as described herein. The memory storage element 144 is accessible by the controller circuit 109 and disposed within the housing infrastructure 108. The one or more electrical sensors are configured to detect features in an environment of the robot 100. For example, referring to FIG. 2A, the sensor system includes cliff sensors 134 disposed along the bottom portion 113 of the housing infrastructure 108. Each of the cliff sensors 134 is an optical sensor that can detect the presence or the absence of an object below the optical sensor, such as the floor surface 10. The cliff sensors 134 can thus detect obstacles such as drop-offs and cliffs below portions of the robot 100 where the cliff sensors 134 are disposed and redirect the robot accordingly. More details of the sensor system and the controller circuit 109 are discussed below, such as with reference to FIG. 3.

Referring to FIG. 2B, the sensor system includes one or more proximity sensors that can detect objects along the floor surface 10 that are near the robot 100. For example, the sensor system can include proximity sensors 136a, 136b, 136c disposed proximate the forward surface 154 of the housing infrastructure 108. Each of the proximity sensors 136a, 136b, 136c includes an optical sensor facing outward from the forward surface 154 of the housing infrastructure 108 and that can detect the presence or the absence of an object in front of the optical sensor. For example, the detectable objects include obstacles such as furniture, walls, persons, and other objects in the environment of the robot 100.

The sensor system includes a bumper system including the bumper 138 and one or more bump sensors that detect contact between the bumper 138 and obstacles in the environment. The bumper 138 forms part of the housing infrastructure 108. For example, the bumper 138 can form the side surfaces 150, 152 as well as the forward surface 154. The sensor system, for example, can include the bump sensors 139a, 139b. The bump sensors 139a, 139b can include break beam sensors, capacitive sensors, or other sensors that can detect contact between the robot 100, e.g., the bumper 138, and objects in the environment. In some implementations, the bump sensor 139a can be used to detect movement of the bumper 138 along the fore-aft axis FA (shown in FIG. 2A) of the robot 100, and the bump sensor 139b can be used to detect movement of the bumper 138 along the lateral axis LA (shown in FIG. 2A) of the robot 100. The proximity sensors 136a, 136b, 136c can detect objects before the robot 100 contacts the objects, and the bump sensors 139a, 139b can detect objects that contact the bumper 138, e.g., in response to the robot 100 contacting the objects.

The sensor system includes one or more obstacle following sensors. For example, the robot 100 can include an obstacle following sensor 141 along the side surface 150. The obstacle following sensor 141 includes an optical sensor facing outward from the side surface 150 of the housing infrastructure 108 and that can detect the presence or the absence of an object adjacent to the side surface 150 of the housing infrastructure 108. The obstacle following sensor 141 can emit an optical beam horizontally in a direction perpendicular to the forward drive direction F of the robot 100 and perpendicular to the side surface 150 of the robot 100. For example, the detectable objects include obstacles such as furniture, walls, persons, and other objects in the environment of the robot 100. In some implementations, the sensor system can include an obstacle following sensor along the side surface 152, and the obstacle following sensor can detect the presence or the absence an object adjacent to the side surface 152. The obstacle following sensor 141 along the side surface 150 is a right obstacle following sensor, and the obstacle following sensor along the side surface 152 is a left obstacle following sensor. The one or more obstacle following sensors, including the obstacle following sensor 141, can also serve as obstacle detection sensors, e.g., similar to the proximity sensors described herein. In this regard, the left obstacle following can be used to determine a distance between an object, e.g., an obstacle surface, to the left of the robot 100 and the robot 100, and the right obstacle following sensor can be used to determine a distance between an object, e.g., an obstacle surface, to the right of the robot 100 and the robot 100.

In some implementations, at least some of the proximity sensors 136a, 136b, 136c, and the obstacle following sensor 141 each includes an optical emitter and an optical detector. The optical emitter emits an optical beam outward from the robot 100, e.g., outward in a horizontal direction, and the optical detector detects a reflection of the optical beam that reflects off an object near the robot 100. The robot 100, e.g., using the controller circuit 109, can determine a time of flight of the optical beam and thereby determine a distance between the optical detector and the object, and hence a distance between the robot 100 and the object.

In some implementations, the proximity sensor 136a includes an optical detector 180 and multiple optical emitters 182, 184. One of the optical emitters 182, 184 can be positioned to direct an optical beam outwardly and downwardly, and the other of the optical emitters 182, 184 can be positioned to direct an optical beam outwardly and upwardly. The optical detector 180 can detect reflections of the optical beams or scatter from the optical beams. In some implementations, the optical detector 180 is an imaging sensor, a camera, or some other type of detection device for sensing optical signals. In some implementations, the optical beams illuminate horizontal lines along a planar vertical surface forward of the robot 100. In some implementations, the optical emitters 182, 184 each emit a fan of beams outward toward an obstacle surface such that a one-dimensional grid of dots appear on one or more obstacle surfaces. The one-dimensional grid of dots can be positioned on a horizontally extending line. In some implementations, the grid of dots can extend across multiple obstacle surfaces, e.g., multiple obstacles surfaces adjacent to one another. The optical detector 180 can capture an image representative of the grid of dots formed by the optical emitter 182 and the grid of dots formed by the optical emitter 184. Based on a size of a dot in the image, the robot 100 can determine a distance of an object on which the dot appears relative to the optical detector 180, e.g., relative to the robot 100. The robot 100 can make this determination for each of the dots, thus allowing the robot 100 to determine a shape of an object on which the dots appear. In addition, if multiple objects are ahead of the robot 100, the robot 100 can determine a shape of each of the objects. In some implementations, the objects can include one or more objects that are laterally offset from a portion of the floor surface 10 directly in front of the robot 100.

The sensor system further includes an image capture device 140, e.g., a camera, directed toward a top portion 142 of the housing infrastructure 108. The image capture device 140 generates digital imagery of the environment of the robot 100 as the robot 100 moves about the floor surface 10. The image capture device 140 is angled in an upward direction, e.g., angled between 30 degrees and 80 degrees from the floor surface 10 about which the robot 100 navigates. The camera, when angled upward, is able to capture images of wall surfaces of the environment so that features corresponding to objects on the wall surfaces can be used for localization.

When the controller circuit 109 causes the robot 100 to perform the mission, the controller circuit 109 operates the motors 114 to drive the drive wheels 112 and propel the robot 100 along the floor surface 10. In addition, the controller circuit 109 operates the roller motor 120 to cause the rotatable members 118 to rotate, operates the brush motor 128 to cause the side brush 126 to rotate, and operates the motor of the vacuum system 119 to generate the airflow. To cause the robot 100 to perform various navigational and cleaning behaviors, the controller circuit 109 executes software stored on the memory storage element 144 to cause the robot 100 to perform by operating the various motors of the robot 100. The controller circuit 109 operates the various motors of the robot 100 to cause the robot 100 to perform the behaviors.

The sensor system can further include sensors for tracking a distance travelled by the robot 100. For example, the sensor system can include encoders associated with the motors 114 for the drive wheels 112, and these encoders can track a distance that the robot 100 has travelled. In some implementations, the sensor system includes an optical sensor facing downward toward a floor surface. The optical sensor can be an optical mouse sensor. For example, the optical sensor can be positioned to direct light through a bottom surface of the robot 100 toward the floor surface 10. The optical sensor can detect reflections of the light and can detect a distance travelled by the robot 100 based on changes in floor features as the robot 100 travels along the floor surface 10.

The controller circuit 109 uses data collected by the sensors of the sensor system to control navigational behaviors of the robot 100 during the mission. For example, the controller circuit 109 uses the sensor data collected by obstacle detection sensors of the robot 100, e.g., the cliff sensors 134, the proximity sensors 136a, 136b, 136c, and the bump sensors 139a, 139b, to enable the robot 100 to avoid obstacles or to prevent from falling down stairs within the environment of the robot 100 during the mission. In some examples, the controller circuit 109 controls the navigational behavior of the robot 100 using information about the environment, such as a map of the environment. With proper navigation, the robot 100 is able to reach a goal position or completes a coverage mission as efficiently and as reliably as possible. According to various embodiments discussed herein, the controller circuit 109 may include a coverage planner configured to identify a coverage plan, such as a path, for the robot 100 to pass through the entirety, or a particular portion, of the environment at least once, while minimizing or reducing the total travel time. In this document, the path refers to a trajectory that includes a set of linear path segments connected by a number of turns between the linear path segments. The robot 100 makes a turn to switch from one linear path segment to another linear path segment. To reduce the total travel time of the robot 100, the coverage planner can identify a path that includes a set of linear path segments connected by a number of turns therebetween. The coverage planner can use the environment partitioning and path planning techniques according to various embodiments as described in this document to determine the path that reduces the number of turns compared with a path having at least one portion in a substantially orthogonal direction (such as in a range of approximately 80-100 degrees, or a range of approximately 60-120 degrees, between two portions of the path). In some example, a team of two or more robots can jointly cover the environment according to their respective paths. The coverage planner may identify the respective paths; such that the time taken by the slowest robot among the team of robots is minimized or reduced. Examples of the coverage planner and the methods of identifying a path with reduced number of turns are discussed below, such as with reference to FIGS. 4-15.

The sensor data can be used by the controller circuit 109 for simultaneous localization and mapping (SLAM) techniques in which the controller circuit 109 extracts features of the environment represented by the sensor data and constructs a map of the floor surface 10 of the environment. The sensor data collected by the image capture device 140 can be used for techniques such as vision-based SLAM (VSLAM) in which the controller circuit 109 extracts visual features corresponding to objects in the environment and constructs the map using these visual features. As the controller circuit 109 directs the robot 100 about the floor surface 10 during the mission, the controller circuit 109 uses SLAM techniques to determine a location of the robot 100 within the map by detecting features represented in collected sensor data and comparing the features to previously stored features. The map formed from the sensor data can indicate locations of traversable and nontraversable space within the environment. For example; locations of obstacles are indicated on the map as nontraversable space, and locations of open floor space are indicated on the map as traversable space.

The sensor data collected by any of the sensors can be stored in the memory storage element 144. In addition, other data generated for the SLAM techniques, including mapping data forming the map, can be stored in the memory storage element 144. These data produced during the mission can include persistent data that are produced during the mission and that are usable during a further mission. For example, the mission can be a first mission, and the further mission can be a second mission occurring after the first mission. In addition to storing the software for causing the robot 100 to perform its behaviors, the memory storage element 144 stores sensor data or data resulting from processing of the sensor data for access by the controller circuit 109 from one mission to another mission. For example, the map can be a persistent map that is usable and updateable by the controller circuit 109 of the robot 100 from one mission to another mission to navigate the robot 100 about the floor surface 10. According to various embodiments discussed in this document, the persistent map can be updated in response to instruction commands received from a user. The controller circuit 109 can modify subsequent or fixture navigational behaviors of the robot 100 according to the updated persistent map, such as by modifying the planned path or updating obstacle avoidance strategy. Examples of modifying planned path are discussed below, such as with reference to FIGS. 10-12.

The persistent data, including the persistent map, enables the robot 100 to efficiently clean the floor surface 10. For example, the persistent map enables the controller circuit 109 to direct the robot 100 toward open floor space and to avoid nontraversable space. In addition, for subsequent missions, the controller circuit 109 is able to plan navigation of the robot 100 through the environment using the persistent map to optimize paths taken during the missions.

The robot 100 can, in some implementations, include a light indicator system 137 located on the top portion 142 of the robot 100. The light indicator system 137 can include light sources positioned within a lid 147 covering the debris bin 124 (shown in FIG. 2A). The light sources can be positioned to direct light to a periphery of the lid 147. The light sources are positioned such that any portion of a continuous loop 143 on the top portion 142 of the robot 100 can be illuminated. The continuous loop 143 is located on a recessed portion of the top portion 142 of the robot 100 such that the light sources can illuminate a surface of the robot 100 as they are activated.

Figure 3:
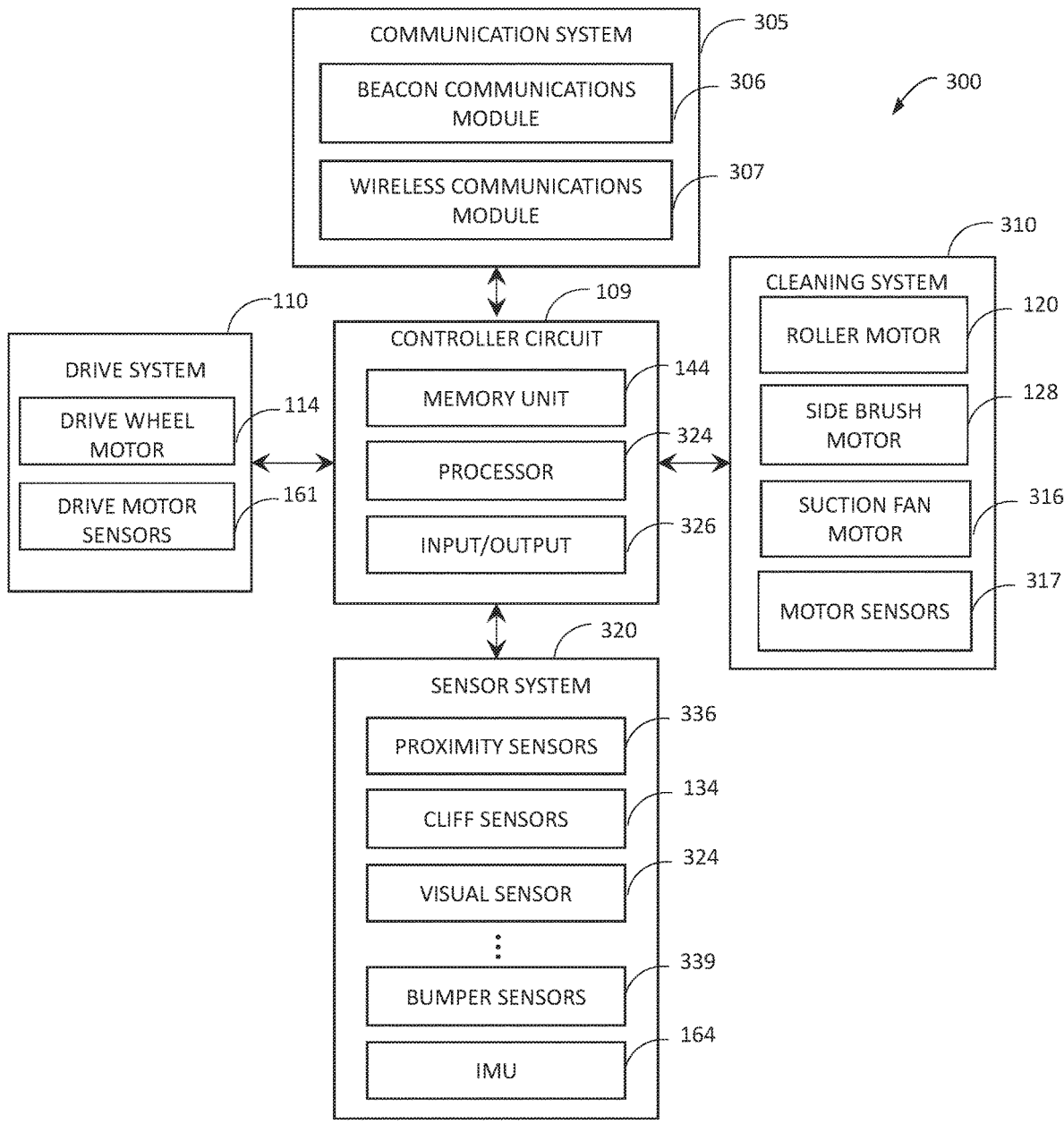
FIG. 3 is a diagram illustrating an example of a control architecture for operating a mobile cleaning robot.

FIG. 3 is a diagram illustrating an example of a control architecture 300 for operating a mobile cleaning robot. The controller circuit 109 can be communicatively coupled to various subsystems of the robot 100, including a communications system 305, a cleaning system 310, a drive system 110, and a navigation sensor system 320. The controller circuit 109 includes a memory unit 144 that holds data and instructions for processing by a processor 324. The processor 324 receives program instructions and feedback data from the memory unit 144, executes logical operations called for by the program instructions, and generates command signals for operating the respective subsystem components of the robot 100. An input/output unit 326 transmits the command signals and receives feedback from the various illustrated components.

The communications system 305 can include a beacon communications module 306 and a wireless communications module 307. The beacon communications module 306 may be communicatively coupled to the controller circuit 109. In some embodiments, the beacon communications module 306 is operable to send and receive signals to and from a remote device. For example, the beacon communications module 306 may detect a navigation signal projected from an emitter of a navigation or virtual wall beacon or a homing signal projected from the emitter of a docking station. Docking, confinement, home base, and homing technologies are discussed in U.S. Pat. Nos. 7,196,487 and 7,404,000, U.S. Patent Application Publication No. 20050156562, and U.S. Patent Application Publication No. 20140100693 (the entireties of which are hereby incorporated by reference). As described in U.S. Patent Publication 2014/0207282 (the entirety of which is hereby incorporated by reference), the wireless communications module 307 facilitates the communication of information describing a status of the robot 100 over a suitable wireless network (e.g., a wireless local area network) with one or more mobile devices (e.g., mobile device 404 shown in FIG. 4). More details of the communications system 305 are discussed below, such as with reference to FIG. 4.

The cleaning system 310 can include the roller motor 120, a brush motor 128 driving the side brush 126, and a suction fan motor 316 powering the vacuum system 119. The cleaning system 310 further includes multiple motor sensors 317 that monitor operation of the roller motor 120, the brush motor 128, and the suction fan motor 316 to facilitate closed-loop control of the motors by the controller circuit 109. In some embodiments, the roller motor 120 is operated by the controller circuit 109 (or a suitable microcontroller) to drive the rollers (e.g., rotatable members 118) according to a particular speed setting via a closed-loop pulse-width modulation (PWM) technique, where the feedback signal is received from a motor sensor 317 monitoring a signal indicative of the rotational speed of the roller motor 120. For example, such a motor sensor 317 may be provided in the form of a motor current sensor (e.g., a shunt resistor, a current-sensing transformer, and/or a Hall Effect current sensor).

The drive system 110 can include a drive-wheel motor 114 for operating the drive wheels 112 in response to drive commands or control signals from the controller circuit 109, as well as multiple drive motor sensors 161 to facilitate closed-loop control of the drive wheels (e.g., via a suitable PWM technique as described above). In some implementations, a microcontroller assigned to the drive system 110 is configured to decipher drive commands having x, y, and θ components. The controller circuit 109 may issue individual control signals to the drive wheel motor 114. In any event, the controller circuit 109 can maneuver the robot 100 in any direction across a cleaning surface by independently controlling the rotational speed and direction of each drive wheel 112 via the drive-wheel motor 114.

The controller circuit 109 can operate the drive system 110 in response to signals received from the navigation sensor system 320. For example, the controller circuit 109 may operate the drive system 110 to redirect the robot 100 to avoid obstacles and clutter encountered while treating a floor surface. In another example, if the robot 100 becomes stuck or entangled during use, the controller circuit 109 may operate the drive system 110 according to one or more escape behaviors. To achieve reliable autonomous movement, the navigation sensor system 320 may include several different types of sensors that can be used in combination with one another to allow the robot 100 to make intelligent decisions about a particular environment. By way of example and not limitation, the navigation sensor system 320 can include one or more of proximity sensors 336 (such as the proximity sensors 136a-136c), the cliff sensors 134, a visual sensor 324 such as the image capture device 140 configured for detecting features and landmarks in the operating environment and building a virtual map, such as using VSLAM technology, as described above.

The navigation sensor system 320 may further include bumper sensors 339 (such as the bumper sensors 139a and 139b), responsive to activation of the bumper 138. The sensor system 320 can include an inertial measurement unit (MO 164 that is, in part, responsive to changes in position of the robot 100 with respect to a vertical axis substantially perpendicular to the floor and senses when the robot 100 is pitched at a floor type interface having a difference in height, which is potentially attributable to a flooring type change. In some examples, the IMU 164 is a six-axis IMU having a gyro sensor that measures the angular velocity of the robot 100 relative to the vertical axis. However, other suitable configurations are also contemplated. For example, the IMU 164 may include an accelerometer sensitive to the linear acceleration of the robot 100 along the vertical axis. In any event, output from the IMU 164 is received by the controller circuit 109 and processed to detect a discontinuity in the floor surface across which the robot 100 is traveling. Within the context of the present disclosure the terms "flooring discontinuity" and "threshold" refer to any irregularity in the floor surface (e.g., a change in flooring type or change in elevation at a flooring interface) that is traversable by the robot 100, but that causes a discrete vertical movement event (e.g., an upward or downward "bump"). The vertical movement event could refer to a part of the drive system (e.g., one of the drive wheels 112) or the chassis of the robot housing 108, depending on the configuration and placement of the IMU 164. Detection of a flooring threshold, or flooring interface, may prompt the controller circuit 109 to expect a change in floor type. For example, the robot 100 may experience a significant downward vertical bump as it moves from high pile carpet (a soft floor surface) to a tile floor (a hard floor surface), and an upward bump in the opposite case.

A wide variety of other types of sensors, though not shown or described in connection with the illustrated examples, may be incorporated in the navigation sensor system 320 (or any other subsystem) without departing from the scope of the present disclosure. Such sensors may function as obstacle detection units, obstacle detection obstacle avoidance (ODOA) sensors, wheel drop sensors, obstacle-following sensors, stall-sensor units, drive-wheel encoder units, bumper sensors, and the like.

Examples of Communication Networks

FIG. 4A is a diagram illustrating by way of example and not limitation a communication network that enables networking between the mobile robot 100 and one or more other devices, such as a mobile device 404, a cloud computing system 406, or another autonomous robot 408 separate from the mobile robot 404. Using the communication network 410, the robot 100, the mobile device 404, the robot 408, and the cloud computing system 406 can communicate with one another to transmit data to one another and receive data from one another. In some implementations, the robot 100, the robot 408, or both the robot 100 and the robot 408 communicate with the mobile device 404 through the cloud computing system 406. Alternatively or additionally, the robot 100, the robot 408, or both the robot 100 and the robot 408 communicate directly with the mobile device 404. Various types and combinations of wireless networks (e.g., Bluetooth, radio frequency, optical based, etc.) and network architectures (e.g., mesh networks) may be employed by the communication network 410.

In some implementations, the mobile device 404 as shown in FIG. 4 is a remote device that can be linked to the cloud computing system 406, and can enable a user to provide inputs on the mobile device 404. The mobile device 404 can include user input elements such as, for example, one or more of a touchscreen display, buttons, a microphone, a mouse, a keyboard, or other devices that respond to inputs provided by the user. The mobile device 404 alternatively or additionally includes immersive media (e.g., virtual reality) with which the user interacts to provide a user input. The mobile device 404, in these cases, is, for example, a virtual reality headset or a head-mounted display. The user can provide inputs corresponding to commands for the mobile robot 404. In such cases, the mobile device 404 transmits a signal to the cloud computing system 406 to cause the cloud computing system 406 to transmit a command signal to the mobile robot 100. In some implementations, the mobile device 404 can present augmented reality images. In some implementations, the mobile device 404 is a smart phone, a laptop computer, a tablet computing device, or other mobile device.

According to various embodiments discussed herein, the mobile device 404 may include a user interface configured to display a map of the robot environment. Robot path, such as that identified by the coverage planner of the controller circuit 109, may also be displayed on the map. The interface may receive a user instruction to modify the environment map, such as by adding, removing, or otherwise modifying a keep-out traversable zone in the environment; adding, removing, or otherwise modifying a duplicate traversal zone in the environment (such as an area that requires repeated cleaning); restricting a robot traversal direction or traversal pattern in a portion of the environment; or adding or changing a cleaning rank, among others.

In some implementations, the communication network 410 can include additional nodes. For example, nodes of the communication network 410 can include additional robots. Alternatively or additionally, nodes of the communication network 410 can include network-connected devices. In some implementations, a network-connected device can generate information about the environment 20. The network-connected device can include one or more sensors to detect features in the environment 20, such as an acoustic sensor, an image capture system, or other sensor generating signals from which features can be extracted. Network-connected devices can include home cameras, smart sensors, and the like.

In the communication network 410 depicted in FIG. 4 and in other implementations of the communication network 410, the wireless links may utilize various communication schemes, protocols, etc., such as, for example, Bluetooth classes, Wi-Fi, Bluetooth-low-energy, also known as BLE, 802.15.4, Worldwide Interoperability for Microwave Access (WiMAX), an infrared channel or satellite band. In some cases, the wireless links include any cellular network standards used to communicate among mobile devices, including, but not limited to, standards that qualify as 1G, 2G, 3G, or 4G. The network standards, if utilized, qualify as, for example, one or more generations of mobile telecommunication standards by fulfilling a specification or standards such as the specifications maintained by International Telecommunication Union. The 3G standards, if utilized, correspond to, for example, the International Mobile Telecommunications-2000 (IMT-2000) specification, and the 4G standards may correspond to the International Mobile Telecommunications Advanced IMT-Advanced) specification. Examples of cellular network standards include AMPS, GSM, GPRS, UMTS, LTE. LTE Advanced, Mobile WiMAX, and WiMAX-Advanced. Cellular network standards may use various channel access methods, e.g., FDMA, TDMA, CDMA, or SDMA.

Figure 4B:
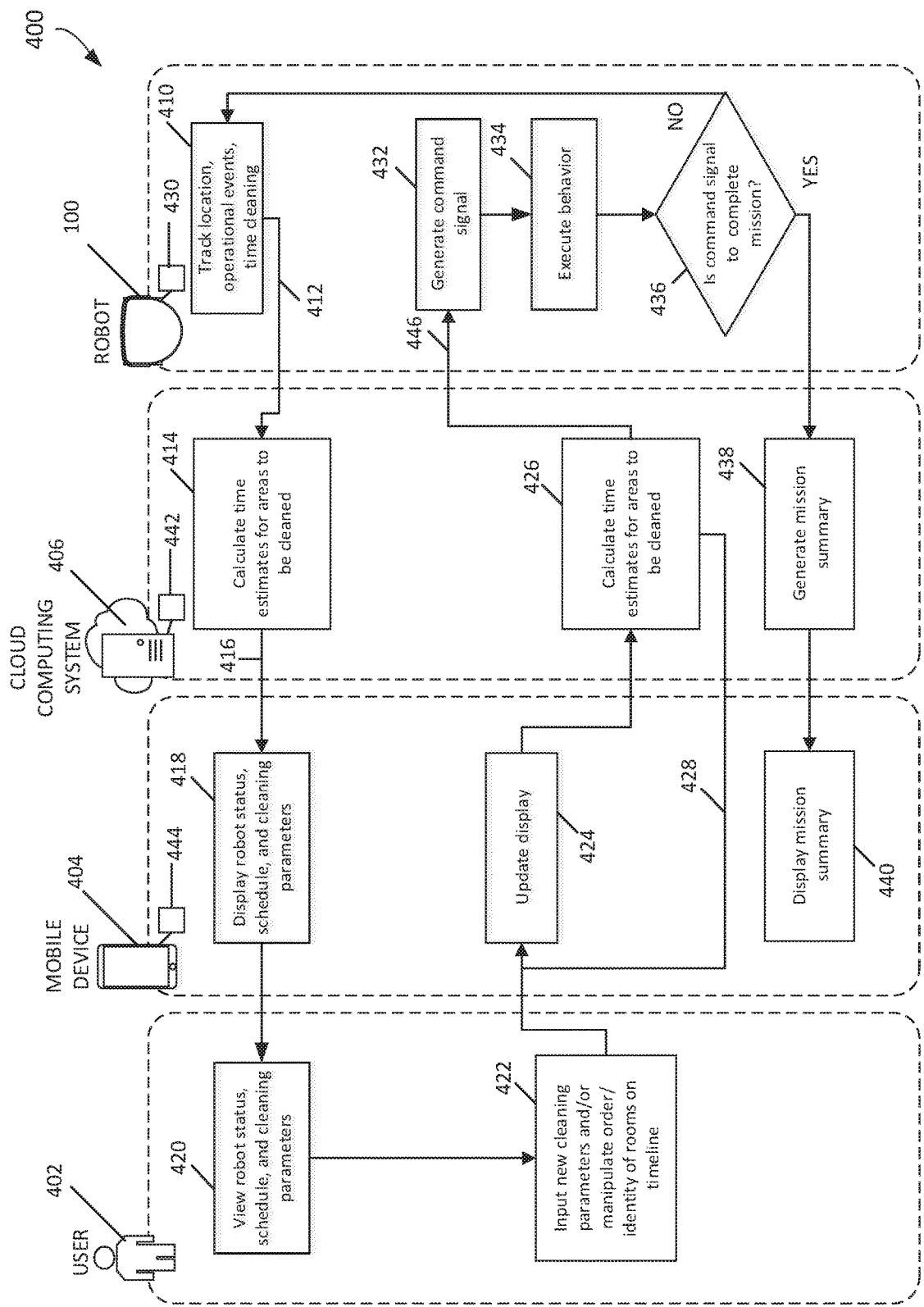
FIG. 4B is a diagram illustrating an exemplary process of exchanging information between the mobile robot and other devices in a communication network.

FIG. 4B is a diagram illustrating an exemplary process 400 of exchanging information among devices in the communication network 410, including the mobile robot 100, the cloud computing system 406, and the mobile device 404. A cleaning mission may be initiated by pressing a button on the mobile robot 100 or may be scheduled for a future time or day. The user may select a set of rooms to be cleaned during the cleaning mission or may instruct the robot to clean all rooms. The user may also select a set of cleaning parameters to be used in each room during the cleaning mission.

During a cleaning mission, the mobile robot 100 tracks 410 its status, including its location, any operational events occurring during cleaning, and a time spent cleaning. The mobile robot 100 transmits 412 status data (e.g. one or more of location data, operational event data, time data) to a cloud computing system 406, which calculates 414, by a processor 442, time estimates for areas to be cleaned. For example, a time estimate could be calculated for a cleaning room by averaging the actual cleaning times for the room that have been gathered during multiple (e.g. two or more) prior cleaning missions for the room. The cloud computing system 406 transmits 416 time estimate data along with robot status data to a mobile device 404. The mobile device 404 presents 418, by a processor 444, the robot status data and time estimate data on a display. The robot status data and time estimate data may be presented on the display of the mobile device as any of a number of graphical representations editable mission timeline and/or a mapping interface.

A user 402 views 420 the robot status data and time estimate data on the display and may input 422 new cleaning parameters or may manipulate the order or identity of rooms to be cleaned. The user 402, may, for example, delete rooms from a cleaning schedule of the mobile robot 100. In other instances, the user 402, may, for example, select an edge cleaning mode or a deep cleaning mode for a room to be cleaned. The display of the mobile device 404 is updates 424 as the user inputs changes to the cleaning parameters or cleaning schedule. For example, if the user changes the cleaning parameters from single pass cleaning to dual pass cleaning, the system will update the estimated time to provide an estimate based on the new parameters. In this example of single pass cleaning vs. dual pass cleaning, the estimate would be approximately doubled. In another example, if the user removes a room from the cleaning schedule, the total time estimate is decreased by approximately the time needed to clean the removed room. Based on the inputs from the user 402, the cloud computing system 406 calculates 426 time estimates for areas to be cleaned, which are then transmitted 428 (e.g. by a wireless transmission, by applying a protocol, by broadcasting a wireless transmission) back to the mobile device 404 and displayed. Additionally, data relating to the calculated 426 time estimates are transmitted 446 to a controller 430 of the robot. Based on the inputs from the user 402, which are received by the controller 430 of the mobile robot 100, the controller 430 generates 432 a command signal. The command signal commands the mobile robot 100 to execute 434 a behavior, which may be a cleaning behavior. As the cleaning behavior is executed, the controller continues to track 410 the robot's status, including its location, any operational events occurring during cleaning, and a time spent cleaning. In some instances, live updates relating to the robot's status may be additionally provided via push notifications to a mobile device or home electronic system (e.g. an interactive speaker system).

Upon executing 434 a behavior, the controller 430 checks 436 to see if the received command signal includes a command to complete the cleaning mission. If the command signal includes a command to complete the cleaning mission, the robot is commanded to return to its dock and upon return sends information to enable the cloud computing system 406 to generate 438 a mission summary which is transmitted to, and displayed 440 by, the mobile device 404. The mission summary may include a timeline and/or a map. The timeline may display, the rooms cleaned, a time spent cleaning each room, operational events tracked in each room, etc. The map may display the rooms cleaned, operational events tracked in each room, a type of cleaning (e.g. sweeping or mopping) performed in each room, etc.

Operations for the process 400 and other processes described herein can be executed in a distributed manner. For example, the cloud computing system 406, the mobile robot 100, and the mobile device 404 may execute one or more of the operations in concert with one another. Operations described as executed by one of the cloud computing system 406, the mobile robot 100, and the mobile device 404 are, in some implementations, executed at least in part by two or all of the cloud computing system 406, the mobile robot 100, and the mobile device 404.

Examples of Mobile Robot Predictive Maintenance (PdM) System

Various embodiments of systems, devices, and processes of predictive maintenance of a motor cleaning robot, such as the mobile robot 100, are discussed in the following with reference to FIGS. 5-17. While some components, modules, and operations may be described as being implemented in and performed by the robot 100, by a user, by a computing device, or by another actor, these operations may, in some implementations, be performed by actors other than those described. For example, an operation performed by the robot 100 can be, in some implementations, performed by the cloud computing system 406 or by another computing device (or devices). In other examples, an operation performed by the user can be performed by a computing device. In some implementations, the cloud computing system 406 does not perform any operations. Rather, other computing devices perform the operations described as being performed by the cloud computing system 406, and these computing devices can be in direct (or indirect) communication with one another and the robot 100. In some implementations, the robot 100 can perform, in addition to the operations described as being performed by the robot 100, the operations described as being performed by the cloud computing system 406 or the mobile device 404. Other variations are possible. Furthermore, while the methods, processes, and operations described herein are described as including certain operations or sub-operations, in other implementations, one or more of these operation or sub-operations may be omitted, or additional operations or sub-operations may be added.

Figure 5:
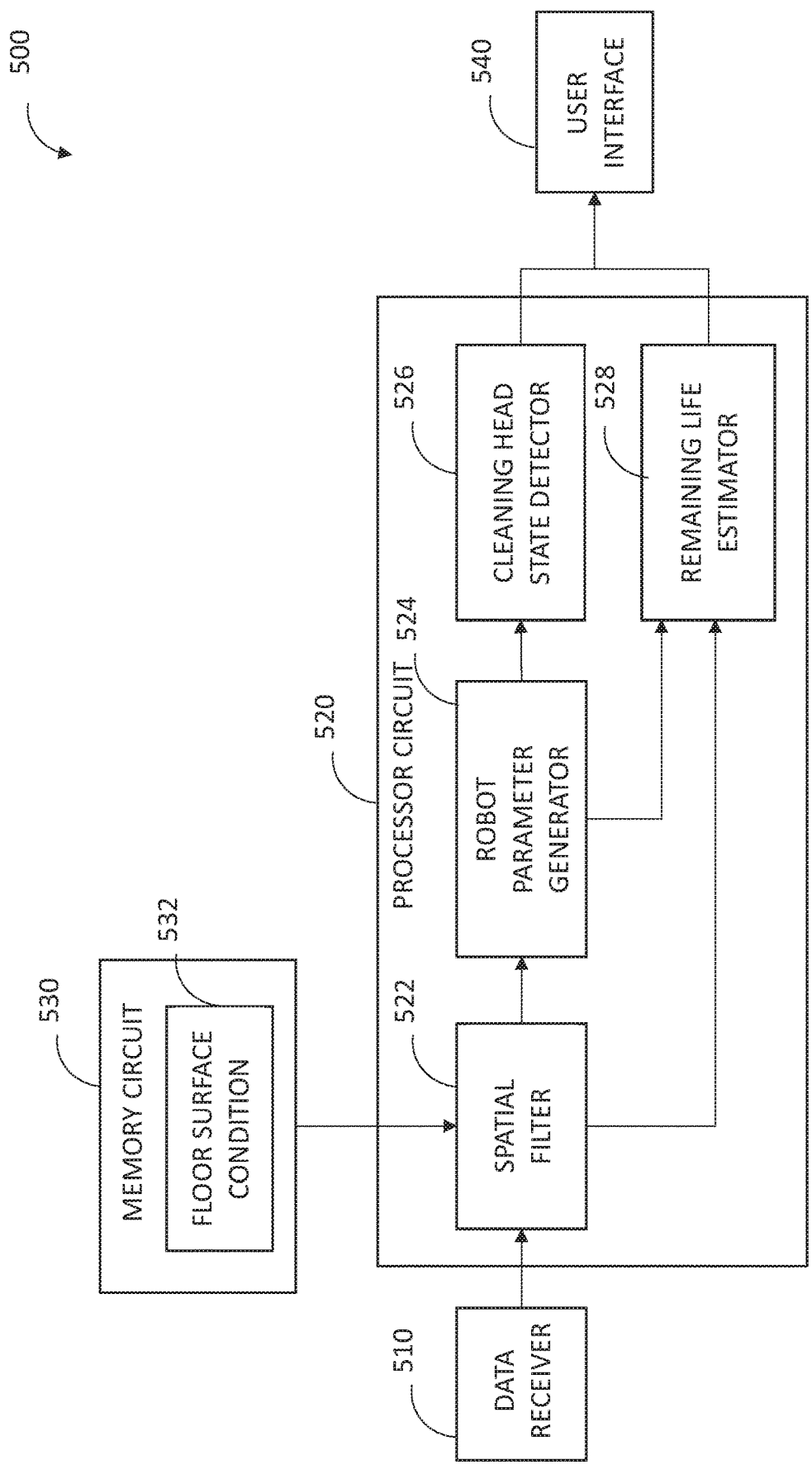
FIG. 5 is a diagram illustrating an example of a mobile robot predictive maintenance (PdM) system.

FIG. 5 is a diagram illustrating an example of a mobile robot PdM system 500. The system 500 can be configured to assess a health status of a cleaning head assembly in a mobile cleaning robot, such as the cleaning head assembly 116 of the mobile robot 100. By way of example and not limitation, the health status of the cleaning head can include information about debris accumulation levels, wear levels, and remaining useful life of the cleaning head assembly or a cleaning member thereof.

The system 500 can include one or more of a data receiver 510, a processor circuit 520, a memory circuit 530, and a user interface 540. At least a portion of the system 500 can be implemented in one or more of the mobile robot 100, the mobile device 404, the autonomous robot 408, or the cloud computing system 406. For instance, in one embodiment, some or all of the system 500 can be implemented in and executed by the mobile robot 100, wherein, referring to FIG. 3, the data receiver 510 can be a part of the input/output unit 326 coupled to the sensor system 320 to receive robot data, the processor circuit 520 can be a part of the processor 324, and the memory circuit 530 can be a part of the memory unit 144 in the mobile robot 100. In another embodiment, some or all of the system 500 can be implemented in and executed by the mobile device 404, such as a smart phone communicatively coupled to the mobile robot 100, wherein the data receiver 510 can be configured to receive robot data from the mobile robot 100 via a communication link. The memory circuit 530 in the smart phone can store a floor map and information about floor surface conditions. The processor circuit 520 can execute an application ("app") on the smart phone to determine cleaning head state, and/or to estimate the remaining useful life of the cleaning head, among other predictive maintenance tasks.

The data receiver 510 can receive robot data produced by a mobile cleaning robot during its active operation, such as while traversing an environment (e.g. a home) and cleaning a floor area in that environment. The data receiver 510 can be coupled to one or more sensors, such as the motor sensors 317, configured to sense and acquire robot data indicative of operation state of the cleaning head assembly. Examples of the robot data can include measurement of voltage supplied to the motor driving a cleaning member of the cleaning head assembly (e.g., the roller motor 120 driving the rotatable members 118, or the brush motor 128 driving drive side brush 126), motor current such as sensed by a motor current sensor a shunt resistor, a current-sensing transformer, and/or a Hall Effect current sensor), angular velocity of the cleaning member, motor rotational speed, or torque generated at the cleaning member. In an example, rotational velocity can be measured using an encoder sensor located at a rotor of the motor, or at a location along the drive train between the motor and the cleaning member. Examples of the encoder technologies can include optical, resistive, capacitive, or inductive measurement. In an example, torque load can be measured using one or more strain gages such as mounted on the motor or at a location along the drive train between the drive motor, or estimated using the current being drawn by the motor.

In some examples, the measurements of the sensor data (e.g., motor current, or angular velocity) can be transformed into one or more frequency-domain metrics, such as dominant frequencies, resonances, or spectral densities, among others. For example, the cleaning members (e.g., rotatable members 118) are often cylindrical elements constructed of flexible materials and therefore exhibit mechanical resonances when excited. A change in these resonances or other frequency domain characteristics can be used to estimate debris accumulation level or wear level.

The processor circuit 520 can perform PdM tasks including determining a cleaning head state, and deciding if a maintenance or replacement of the cleaning head is necessary. The processor circuit 520 may be implemented as a part of a microprocessor circuit, which may be a dedicated processor such as a digital signal processor, application specific integrated circuit (ASIC), microprocessor, or other type of processor for processing information including physical activity information. Alternatively, the microprocessor circuit may be a processor that may receive and execute a set of instructions of performing the functions, methods, or techniques described herein.

The processor circuit 520 may include circuit sets comprising one or more other circuits or sub-circuits, such as a spatial filter 522, a robot parameter generator 524, a cleaning head state detector 526, and a remaining life estimator 528. These circuits or modules may, alone or in combination, perform the functions, methods, or techniques described herein. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

The spatial filter 522 can process the received robot data, and extract a portion of said robot data corresponding to a floor area traversed by the mobile robot. The floor area can have a specific floor surface condition. In this document, the "surface condition" can include, among others, spatial, geometric, and textural information of a floor area. Examples of the surface conditions of a floor area can include a specific spatial location (e.g., a particular room or area such as a kitchen, or a sub-region in a room such as one or more of M-by-N regions in a gridded map of a room or a portion of the environment); a floor area of a specific size, shape, or dimension; or a floor area having a particular surface type (e.g., hardwood or carpet).

The memory circuit 530 can store a floor map including information about floor surface conditions 532 for different floor areas in the environment. The floor areas and the corresponding floor surface conditions may be marked or otherwise identified on the floor map. A user may designate, on the floor map, a floor area with a known surface condition and repeatedly traversed and cleaned by the mobile robot, or multiple floor areas with identical surface conditions (e.g., the same surface type) for the spatial filter 522. For example, a floor area in a hallway with a hardwood surface may be selected by a user on the floor map. Based on the floor map and the location of the designated floor area, the spatial filter 522 can extract the data portion corresponding to the mobile robot travelling across and cleaning the designated floor area.

In some examples, a user may designate the platform surface of a docking station as an area of interest. Robot data can be acquired when the mobile robot operates in a commanded "brush characterization mode", where the mobile robot performs "cleaning" operation (that is, the cleaning member rotatably engages the platform surface of the docking station) while the mobile cleaning robot remains stationary on the docking station.

As described above, the robot data, such as brush motor voltage and current and rotating speed of the cleaning member, are dominated by cleaning members' interaction with the floor surface. By analyzing the robot data portion corresponding to a specific floor area with fixed and known surface condition (or, a "controlled" surface condition), components due to debris and wear can be isolated from the robot data. Spatial filtering by the spatial filter 522 therefore provides a means for disambiguating the impact of floor interactions and the impact of debris accumulation and wear of the cleaning head on the measured robot data. Compared to carpeted surface, hard surfaces (e.g., hardwood floor, tile, or the platform surface of a docking station) are smoother and more rigid, and are less likely to attract and retain errant filaments such as hair and carpet fiber. As such, when operating on a hard surface, the cleaning members generally experience less friction on the hard surface than on the carpet, and the impact of the cleaning head-floor interactions on the measured robot data is generally less significant and more predictable. In some examples, the spatial filter 522 may extract robot data portion corresponding to a floor area with only hard floor surface and repeatedly traversed by the mobile robot.

In addition to or in lieu of the surface condition such as spatial, geometric, and textural information of a floor area, the spatial filter 522 can extract robot data portion based on a mode of traversing a specific floor area by the mobile cleaning robot. Examples of the traversal mode can include a coverage path (e.g., the location and direction to enter and exit the floor area, and path orientation within the floor area), a traversal pattern (e.g., the sequence or arrangement of the paths), or a traversal speed. In an example, a user may designate on the floor map a floor area repeatedly traversed and cleaned by the mobile robot, and a specified coverage path or traversal pattern. The spatial filter 522 can extract the data portion corresponding to the mobile robot travelling across and cleaning the designated floor area in accordance with the designated traversal path or pattern. In another example, a user may designate a floor area as well as a traversing speed requirement for the mobile robot. For example, the spatial filter 522 can extract the data portion corresponding to the mobile robot cleaning the designated floor area while travelling at its full speed.

Figure 6:
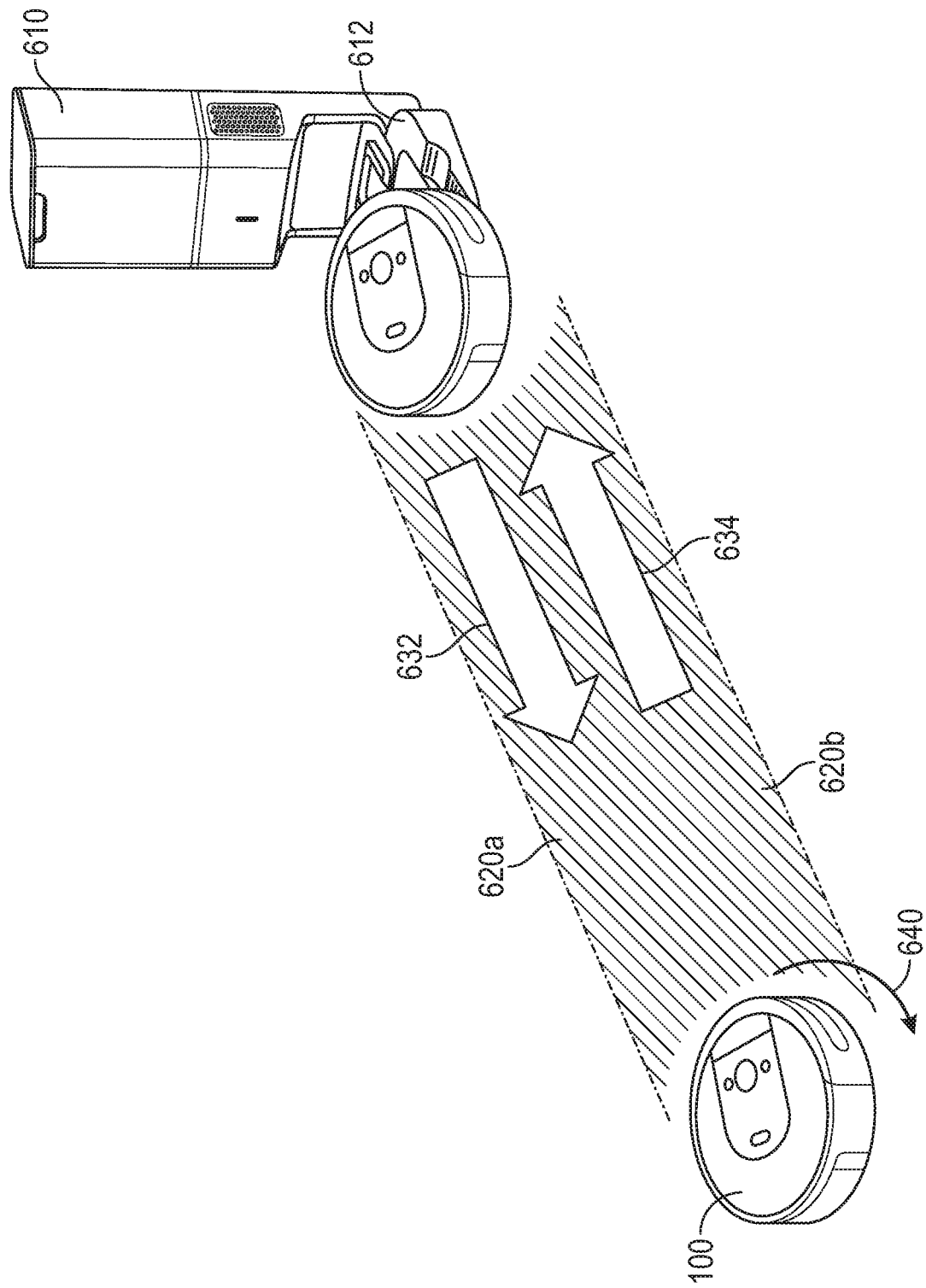
FIG. 6 is a diagram illustrating docking and undocking of a mobile robot, during which robot data are acquired and used to assess a cleaning head state.

In some examples, the spatial filter 522 may alternatively extract a portion of the robot data corresponding to a particular phase of a cleaning mission. A cleaning mission generally begins with an undocking session during which the cleaning robot departs from a docking station, followed by a cleaning phase including a sequence of floor cleaning across a number of regions in the environment, and ends with a docking phase during which the cleaning robot returns to the docking station. The docking station serves as a landmark for the mobile cleaning robot to begin and end a cleaning session. Referring now to FIG. 6, the cleaning robot 100 remains on a platform 612 of the docking station 610 prior to a cleaning mission. A cleaning mission begins with an undocking phase, when the mobile cleaning robot 100 departs the docking station 610, and travels backward along a reverse direction 632 along an undocking path 620A. During undocking, the mobile robot 100 can actively clean the floor surface of the undocking path 620A. The undocking phase ends when the mobile robot 100 backs for a specific distance. The mobile robot 100 then rotates a specific angle along a direction 640, switches from a forward-facing direction to a rear-facing direction relative to the docking station 610, and travels forward to continue the cleaning mission.

During a docking phase, the mobile robot 100 travels along a forward direction 634 along a docking path 620B, while at the same time actively cleans the floor surface of the docking path 620B. Upon approaching the docking station 610, the mobile robot 100 rotates from a forward-facing direction to a rear-facing direction relative to the docking station 610, and backs onto the platform 612 of the docking station 610 to complete the cleaning mission.

The undocking path 620A and the docking path 620B can each straight path with deterministic floor condition. The undocking and docking maneuvers are repeatable over different cleaning missions, such that the mobile robot 100 covers substantially the same undocking path 620A with a fixed and known floor surface condition during undocking, and similarly covers substantially the same docking path 620B with a fixed and known floor surface condition during docking. In some examples, the undocking path 620A and docking path 620B can be the same path. The spatial filter 522 may identify and extract a first portion of the robot data corresponding to the undocking phase when the mobile robot 100 traverses the undocking path 620A and cleans the floor surface thereof. Additionally or alternatively, the spatial filter 522 may identify and extract a second portion of the robot data corresponding to the docking phase when the mobile robot 100 traverses the docking path 620B and cleans the floor surface thereof. Because the docking and undocking paths are deterministic floor areas with known, and substantially fixed, floor surface conditions, spatial filtering of the robot data based on the docking or undocking phases can effectively control the floor condition over different cleaning missions even in the absence of a floor map. This can be advantageous due to its simplicity compared to the spatial filtering that requires a floor map to identify a floor area with controlled (i.e., substantially fixed) surface condition over cleaning missions. It can also be beneficial for non-mapping mobile robots that lack the capability of creating or storing a floor map.

In some examples, the spatial filter 522 may additionally or alternatively identify and extract a third portion of the robot data corresponding to a specified time period with respect to docking or undocking, such as T1 seconds immediately following the undocking phase, or T2 second right before the docking phase. Although the cleaning phase is generally associated with variable (or mission-specific) paths and variable floor areas with variable floor surface conditions, during certain portions of the cleaning phase such as temporally close to the docking and undocking phases the mobile robot more likely covers substantially the same floor area with the same floor surface conditions, and therefore can be used for spatial filtering of the robot data.

Referring back to FIG. 5, the robot parameter generator 524 can determine a robot parameter using the portion of the received robot data that corresponds to the floor area with the specific surface condition. In an example, the robot parameter can include power (P) consumed by a cleaning head motor that drives a cleaning head to rotatably engage the floor surface of the floor area, agitate and extract debris, such as the roller motor 120 driving the rotatable members 118, or the brush motor 128 driving the side brush 126. In addition to a first power component (P1) corresponding to floor interaction and cleaning, the power consumption P can additionally include a second power component P2, also referred to as disturbance power, exerted to overcome the friction or tension due to debris accumulated in the cleaning head (e.g., errant filaments spooling around the roller or the rotating brushes). The disturbance power P2 can be correlated to the debris accumulation level. Additionally, wear or damages to the cleaning head, such as the bristles or flaps on the rotatable members 118 for agitating the floor surface, can also affect the motor power. For example, compared to a cleaning member with fully-ridged flaps or thick and resilient bristles, a worn or damaged cleaning member with flattened flaps or soft and blunt bristles encounters less friction during floor engagement, and therefore can be driven more easily by the motor with less power. Therefore, the motor power P, or a component thereof (e.g., the disturbance power P2), can be used to determine the wear level of a cleaning member of the cleaning head assembly.

The motor power can be computed using electrical parameter measurements of the motor driving the cleaning member. For example, the motor power can be computed as a function of one or more of motor current, battery voltage, and motor speed. In some examples, the roller motor 120 or the brush motor 128 can drive the respective cleaning members according to a particular speed setting via a closed-loop pulse-width modulation (PWM) technique, and the motor power P can be calculated based on measured voltage supplied to the roller motor 120 or the brush motor 128, the measured current produced at the respective motors, and the PWM control signal characteristics (such as a switching frequency or a duty cycle) fed to the respective motors. Commonly assigned U.S. Pat. No. 9,993,129 entitled "MOBILE FLOOR-CLEANING ROBOT WITH FLOOR-TYPE DETECTION" describes techniques of determining motor power using motor parameters, the description of which is incorporated herein by reference in its entirety.

In some examples, the robot parameter generator 524 can determine energy (E) consumed by the cleaning head motor to traverse across and clean the entirety, or a portion of, the floor area with the specific surface condition. The motor energy (E) can be computed as an integral of the power (P) over time taken for the mobile robot to traversably clean the floor area. Similar to the motor power (P) which includes the P1 and P2 components, the motor energy (E) can include a first energy component (E1) corresponding to cleaning member's interaction with the floor surface, and a second disturbance energy component (E2) to overcome the friction due to debris accumulated in the cleaning head during cleaning.

The motor power and motor energy as described above are non-limiting examples of the robot parameter that can be used to determine the state of the cleaning head. In various examples, the robot parameter generator 524 may generate other robot parameters representative of floor-cleaning head interactions (e.g., torque produced at the cleaning member), statistical characteristics of the spatially filtered robot data (e.g., average motor current during the traversal of the floor area), or frequency-domain characteristics of the spatially filtered robot data (e.g., dominant frequency, or peak spectral density, of current measurements during the traversal of the floor area).

The cleaning head state detector 526 can determine a state of the cleaning head based on the determined robot parameter. The cleaning head state is indicative of at least one of a wear level, or a debris accumulation level, for the cleaning member (e.g., the rotatable members 118 or the side brush 126). In an example, the robot parameter generator 524 can generate multiple measurements of the robot parameter (e.g., motor power or motor energy) corresponding to repeated traversal of the same floor area by the mobile cleaning robot. The repeated traversal of the same floor area can occur over multiple cleaning missions respectively comprising traversal of the same floor area by the mobile cleaning robot. In an example, the cleaning head state detector 526 can determine the state of the cleaning head based on a trend of the robot parameter, such as over multiple cleaning missions during a monitoring period. Additionally or alternatively, the repeated traversal of the same floor area can occur in one cleaning mission, such as repeated cleaning of a user-specified duplicate traversal region in the environment within one mission. The cleaning head state detector 526 can determine the state of the cleaning head based on the multiple measurements of the robot parameter. Examples of determining a cleaning head state based on a robot parameter trend are discussed below, such as with reference to FIGS. 7A-7B.

The cleaning head state detector 526 can additionally or alternatively determine the state of the cleaning head based on a dynamic response of the cleaning head motor. The dynamic response can be measured when the mobile robot operates at a fixed and known location, and the motor excites the cleaning head to cause the cleaning member to interact with the floor surface in a similar fashion to a fielded robot during a cleaning mission, but does not perform useful cleaning. Such an operation mode is hereinafter referred to as a cleaning head characterization mode, to distinguish from normal cleaning mode in a field operation. Examples of determining a cleaning head state based on the cleaning head motor's dynamic response when the robot operates in a cleaning head characterization mode are discussed below, such as with reference to FIGS. 9A-9C.

Figure 10:
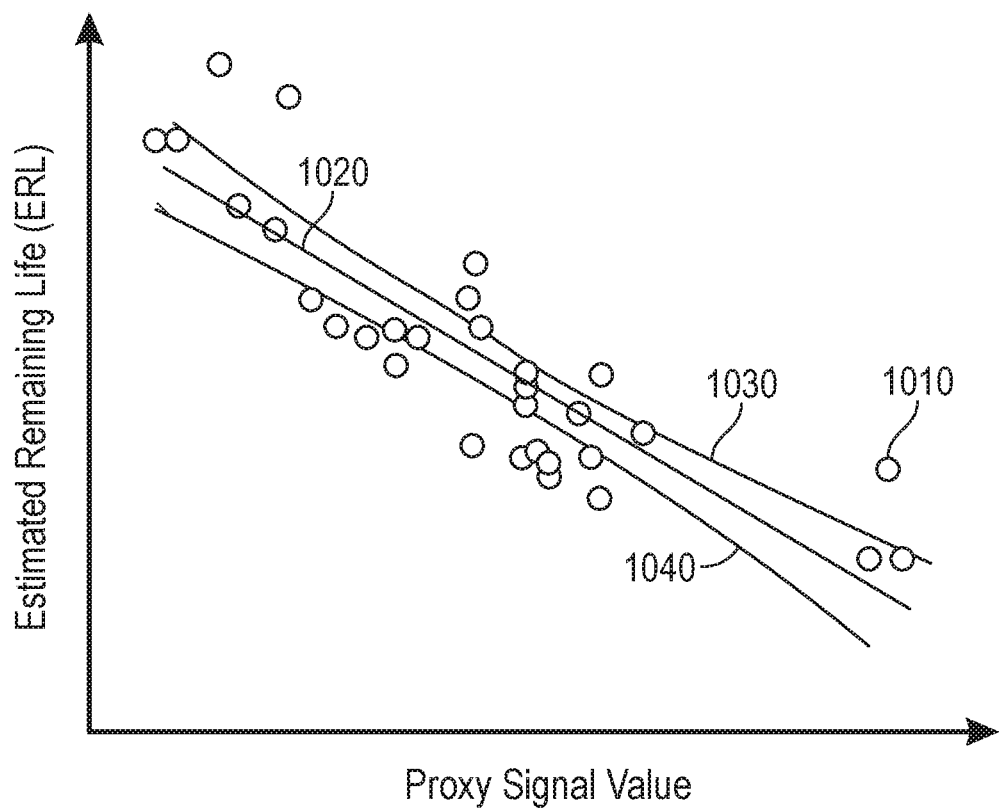
FIG. 10 is a graph illustrating an example of a linear regression model for estimating remaining useful life of a cleaning member of a cleaning head.

The remaining life estimator 528 can generate an estimate of remaining useful life (ERL) of the cleaning member. In an example, the ERL can be estimated using a regression model that relates the remaining useful life of the cleaning head to a signal serving as a proxy for the remaining useful life. The model can be generated using historical data (e.g., proxy signal characteristics and corresponding remaining life such as provided by a human expert). FIG. 10 is a graph illustrating an example of a linear regression model for estimating the ERL of the cleaning member. As illustrated in FIG. 10, the liner regression model can be generated using training data 1010 collected under controlled conditions (e.g., known floor surface conditions) Each data point of the training data 1010 represents an estimated ERL value (y-axis) for a corresponding proxy signal value (x-axis). Examples of the proxy signal can include one or more of the filtered robot data (e.g., motor current, angular velocity, torque) from the spatial filter 522 that correspond to a specific floor area with a specific floor condition, the robot parameter such as determined by the robot parameter generator 524, or a metric of the filtered robot data or the robot parameter such as a trend of the robot parameter, or the dynamic response of the cleaning head motor when the robot operates in a cleaning head characterization mode. Alternatively, a non-linear regression model may be used, such as one of polynomial, exponential, or logarithmic regression model, among others. Parameters of a regression model, such as slope and intercept for a regression line 1020, can be estimated using least squares method, least absolute deviations, or Bayesian regression method, among others. The remaining life estimator 528 can additionally determine from the training data 1010 a confidence interval of the estimated ERL for a proxy signal value, as indicated by a confidence lines 1030 and 1040. In an example, the confidence lines 1030 and 1040 define a 95% confidence band about the regression line 1020. The remaining life estimator 528 can use the generated regression model to predict or infer the remaining useful life for a measured proxy signal value.

In some examples, the ERL can be estimated using parameters estimated by a "virtual sensor", such as disturbance torque generated at the rotating cleaning head associated debris accumulation or wear or damage in the cleaning head. Examples of the virtual sensor, disturbance torque, and ERL determination are discussed below, such as with reference to FIG. 12.

Figure 11A:
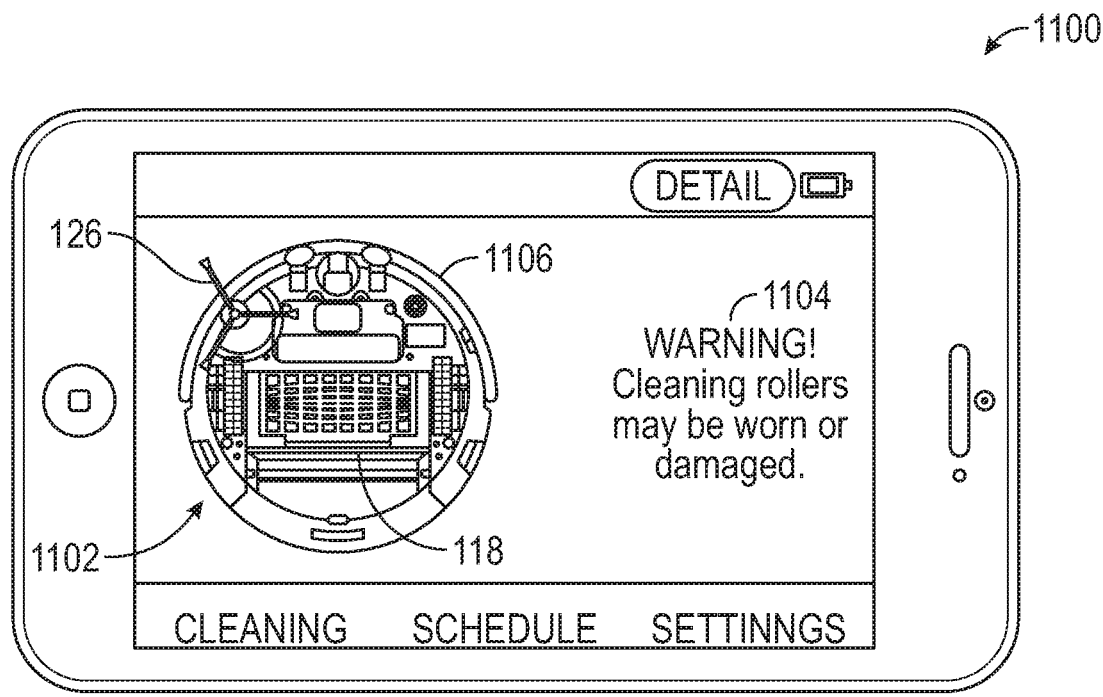
FIGS. 11A-11B are diagrams illustrating an exemplary user interface on a smart phone configured to display information about cleaning head state.
Figure 11B:
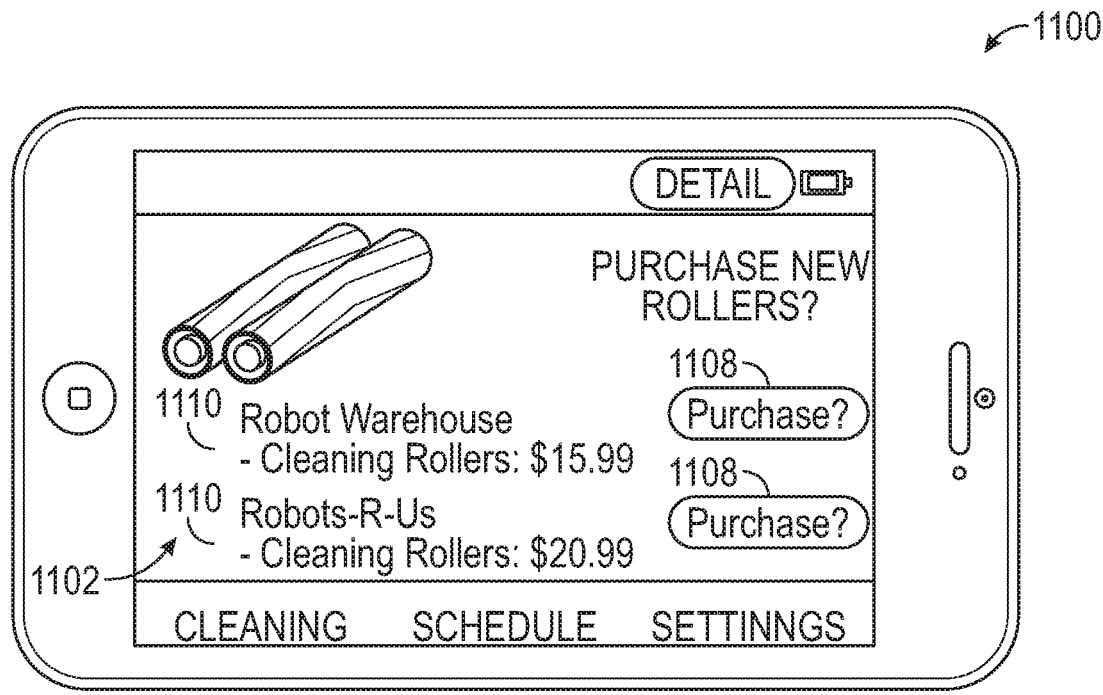

The user interface 540 can enable a user to provide inputs for controlling operation of the mobile robot, and notify the user of robot operating status and health state, such as the state of the cleaning head, and/or the ERL of the cleaning head. In an example, the user interface 540 can be integrated into the mobile device 404 communicatively coupled to the mobile robot 100. As described above, the mobile device 404 can be provided in the form of a smart phone operable to execute a software application ("app") that displays status information received from the robot 100 on a display screen. Referring now to FIGS. 11A-11B, which illustrates by way of non-limiting example a user interface of a smart phone 1100, an example of the mobile device 404. As shown in FIG. 1.1A, a warning of the state or level of wear or damage of the roller cleaning member 118 or the side brush 126 can be presented on the display screen 1102. The warning may be provided via one or more of a textual 1104 user-interface element, and a graphical 1106 user-interface element. Similar user-interface elements may be deployed on the display screen 1102 to indicate that the state or level of debris accumulation in the cleaning member 118 or the side brush 126. Other messages such as recommendation to clean the cleaning member in response to the determined debris accumulation level, or a recommendation to replace the cleaning member based on the determined wear level, may be presented on the display screen 1102. In an example, warning or recommendation messages may be generated when the detected cleaning head state, such as the debris level or the wear level, exceeds respective threshold, or when the falls below a threshold. In some examples, the recommendation includes switching to a different model or type of cleaning head or cleaning member than the worn cleaning head. For example, if the number of recommended replacements exceeds some frequency, a message may be presented to the user to recommend different cleaning head. FIG. 11B illustrates the display screen 1102 that provides one or more "one click" selection options 1108 that prompt the user to purchase new cleaning head (e.g., cleaning rollers) to replace the current set that are no longer functioning properly such as due to excess wear or damage. Further, in the illustrated example, textual user-interface elements 1110 present one or more pricing options represented along with the name of a corresponding online vendor.

In the foregoing examples, the software application executed by the mobile device 1100 is shown and described as providing alert-type indications to a user that maintenance of the robot 100 is required. In some examples, the software application can be configured to provide status updates periodically, such as at predetermined time intervals, or upon receiving a user inquiry about the health status of the mobile robot, such as debris or wear levels of the cleaning head.

Examples of Methods of Determining Cleaning Head State

Figure 7A:
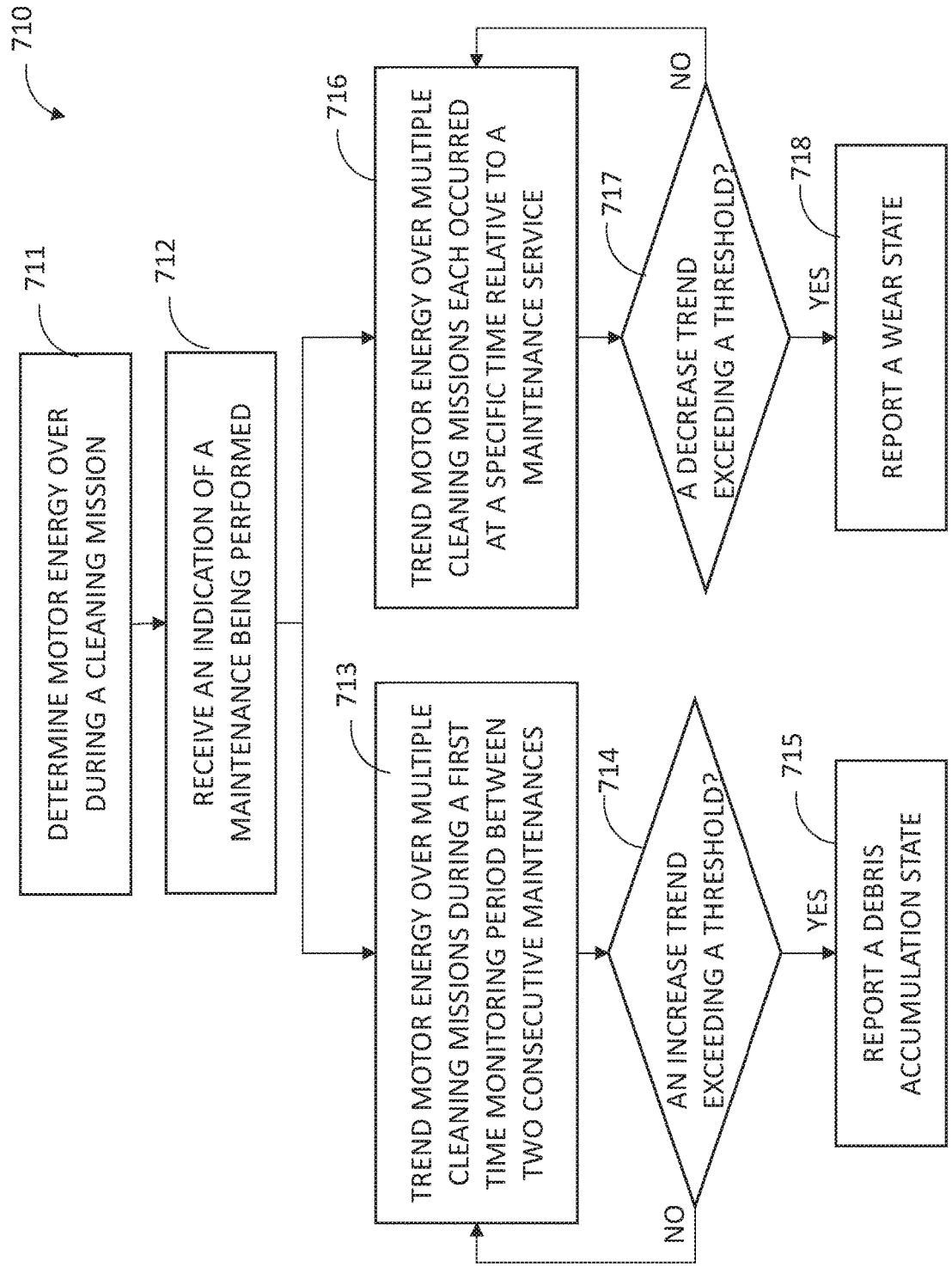
FIGS. 7A-7B are diagrams illustrating an exemplary method of determining a cleaning head state based on a trend of a robot parameter.

Various embodiments of methods for determining a clean head state, such as differentially determining a debris accumulation level from a wear or damage level, are discussed in the following with reference to FIGS. 7A-7B, 8, and 9A-9C. FIG. 7A is a diagram illustrating an exemplary method 710 of determining the cleaning head state based on a trend of the robot parameter, such as determined by the robot parameter generator 524. At least a portion of the process can be executed by the cleaning head state detector 526. The present inventors have recognized that debris accumulation and wear of the cleaning head lead to different manners of change in motor parameters such as motor power or motor energy. For example, the wear and debris accumulation can act on the robot parameter at different timescales, and the parameter trends can exhibit different directions of change (i.e., slopes with different algebraic signs). An example of the robot parameter used for detecting the debris accumulation and wear states of the cleaning head is motor energy, as used in method 710. At 711, energy produced by the motor that drives the roller motor 120 or the brush motor 128 to rotatably clean a specific floor area with a specific surface condition, can be calculated. As previously described, the motor energy can be computed using the robot data corresponding to the specific floor area, such as one or more of voltage supplied to the motor, electric current output, or a PWM control signal characteristic, and time taken for the mobile robot to clean the floor area.

At 712, an indication of a maintenance being performed on the cleaning head, such as an indication of the roller motor 120 or the brush motor 128 being taken out of the mobile robot (e.g., for cleaning, repair, or replacement) can be received. The maintenance indication can be provided by a user, such as via the user interface 540. Alternatively, a maintenance detector circuit, which can be a part of the processor circuit 520, can automatically detect a maintenance of the cleaning head being carried out, an example of which is described below with reference to FIG. 8.

The motor energy can be trended using current measurement of robot data and historical robot data, or trended over time such as over multiple cleaning missions or over repeated cleaning of a user-specified duplicate traversal region in one mission, when the motor robot traverses the same floor area with a specific floor condition (e.g., a specific floor size, dimension, or floor type). The motor energy may be trended in different time frames. At 713, the motor energy can be trended over multiple cleaning missions during a first monitoring period between two consecutive maintenance services. At 714, the motor energy trend can be compared to a pre-determined or user-specified debris detection criterion. For example, if an increase trend is detected, or if the motor energy exceeds a debris-indicated energy threshold, then at 715 a debris accumulation state is deemed detected. An alert can be generated and reported to a user. In some examples, multiple debris-indicated energy thresholds can be used to classify the debris accumulation into one of multiple debris levels. If no increase trend is detected, or if the motor energy does not exceed the debris-indicated energy threshold, then the cleaning head is deemed clean, and no debris accumulation state is declared. The trending of motor energy can be continued at 713.

The motor energy may additionally or alternatively be trended over multiple cleaning missions in a second time frame at 716. The second time frame can be longer than the first time frame. Dirt and errant filaments typically accumulate in the cleaning head over days or weeks of use, and wear typically occurs over several months. As such, an energy trend during the first short time frame can be used to detect a debris accumulation level, and an energy trend during the second longer time frame can be used to detect a wear level for the cleaning head. In an example, the first time period is in an order weeks (e.g., 1-3 weeks), and the second time frame is in an order of months (e.g., 1-6 months).

To improve the performance of wear level determination, the long-term energy trend at 716 can be generated over cleaning missions when the cleaning head is in a substantially identical pre-mission debris state. In an example, the motor energy trend includes motor energy values corresponding to multiple cleaning missions each occurred at a specific time relative to a maintenance service performed on the cleaning head, such as right after, or immediately before, a maintenance of the cleaning head. Having a controlled pre-mission debris state can help reduce the impact of short-term increase in motor energy (which may be related to debris accumulation) on the long-term decrease trend (which may be related to wear).

In contrast to the short-term increase in motor energy representing debris accumulation, a worn cleaning head may produce less interaction force between the cleaning member (e.g., flappers, fletches, or bristles) and the floor, and therefore a decrease in load torque on the cleaning head motor. This can be represented by a decrease trend (or a negative slop) of motor energy consumption over time. At 717, the motor energy trend can be compared to a wear detection criterion. For example, if a decrease trend is detected, or if the motor energy falls below a wear-indicated energy threshold, then at 718 a wear state is deemed detected. An alert can be generated and reported to a user. If no decrease trend is detected, or if the motor energy does not fall below the wear-indicated energy threshold, then no wear state is declared, and the trending of motor energy can be continued at 716.

Figure 7B:
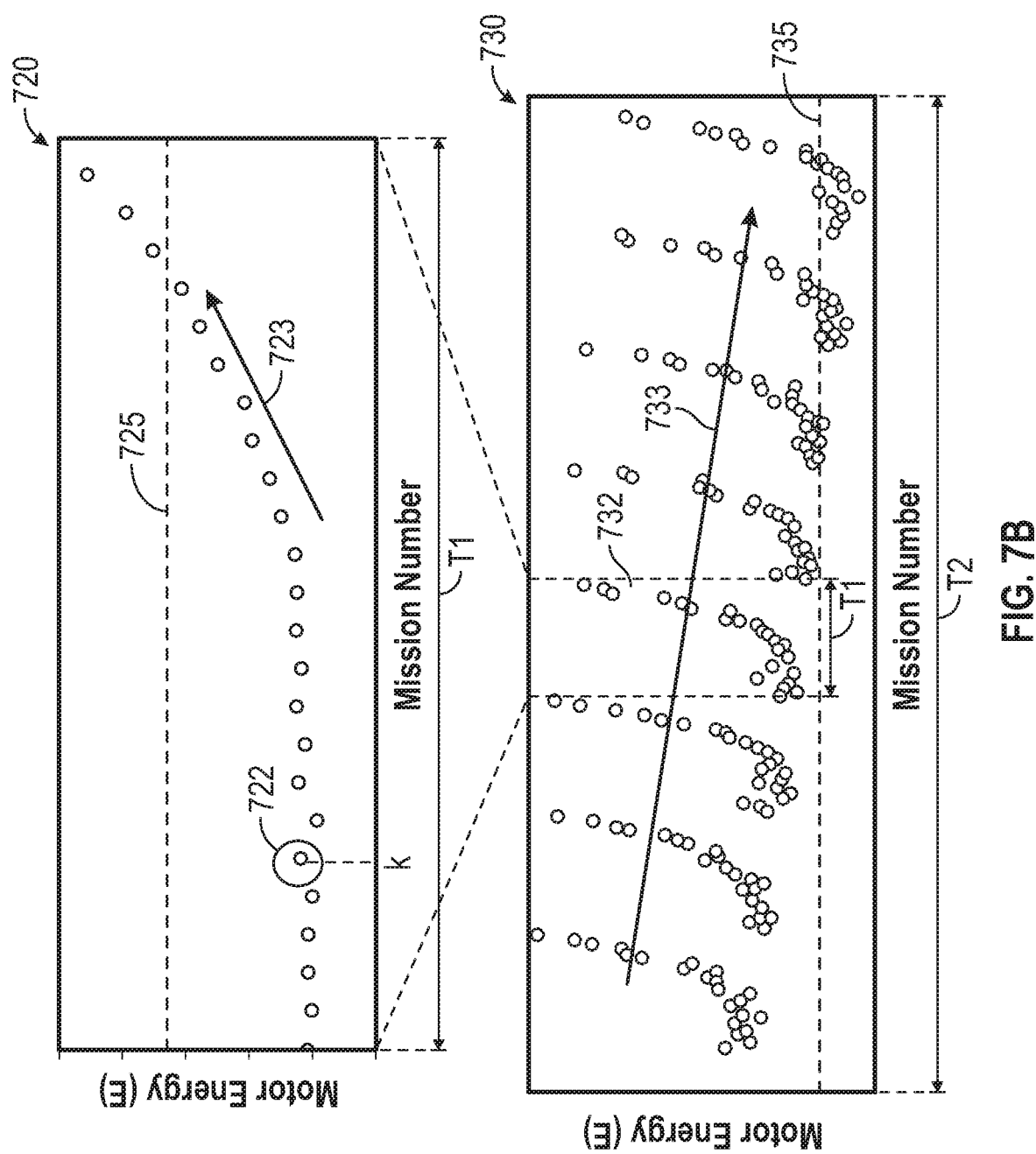

FIG. 7B illustrates by way of non-limiting example a short-term energy trend 720 during a first monitoring period T1 in accordance with step 713 of FIG. 7A, and a long-term energy trend 730 during a second monitoring period T2 in accordance with step 716 of FIG. 7A. Each motor energy value corresponds to a cleaning mission. For example, energy value 722 corresponds to the k-th cleaning mission during T1. In an example, T1 can be in an order of weeks (e.g., 1-3 weeks). In an example, the monitoring period T1 can be defined as a time frame between two consecutive maintenance services. Time of the maintenances of the cleaning head can be obtained from step 712. During T1, the first cleaning mission occurs right after a cleaning head maintenance, and the last cleaning mission occurs right before the next maintenance.

Debris accumulation can cause an increased load torque on the cleaning head motor, which can be represented by an increase trend 723 (or a positive slope) in motor effort or motor energy consumption over time. In an example, the cleaning head state detector 526 can compare the motor energy values at different missions during the first monitoring period, and determine a state of debris accumulation, or classify different levels of accumulation, based on an amount of increase, or a rate of increase (e.g., the slope of the increase trend 723), of the motor energy. Alternatively, the cleaning head state detector 526 can compare the motor energy values to a debris-indicated energy threshold 725, and determine a state of debris accumulation if the motor energy value exceeds the threshold 725.

The long-term energy trend 730 can be generated during a second monitoring period T2 longer than the first monitoring period T1. The second monitoring period T2 can be long enough to cover cleaning missions over a number of maintenance sessions of the cleaning head, such that each short-term energy trend 720 is a subset of the long-term energy trend 730. As illustrated in FIG. 7B, the long-term energy trend 730 can include multiple short-term energy trends 720 separated by maintenance sessions of the cleaning head each resetting the cleaning head states. The cleaning head state detector 526 can determine a state of wear for the cleaning head based on an amount of decrease, or a rate of decrease (e.g., the slope of the increase trend 723), of the motor energy during the second monitoring period. Alternatively, the cleaning head state detector 526 can compare the motor energy values to an energy threshold 735, and determine a state of wear if the motor energy value falls below the threshold 735. In some examples, multiple wear thresholds can be used to classify different levels of wear.

FIG. 8 is a diagram illustrating automatic maintenance detection, an example of the step 712 of the method 710. A maintenance detector circuit can be coupled to one or more sensors to detect an indication of maintenance being performed on the cleaning head. In an example, the maintenance detector circuit is coupled to a switch to detect an opening of a latch 812 that releasably locks the rotatory cleaning member 118 in the cleaning head assembly housing, removal of the cleaning member 118, and re-installment of the same (e.g., cleaned or repaired) or a replacement cleaning member 118. Additionally or alternatively, the maintenance detector circuit is coupled to a gyroscope or an accelerometer sensor to detect orientation of the mobile cleaning robot 100 compatible with maintenance actions, such as a flip-over or rotation of the mobile cleaning robot 100, or a state that the drive wheels 112 are not in contact with ground. Based on the detected maintenance indication, the cleaning head state detector 526 can generate the long-term energy trend 720 using motor energy values for those cleaning missions right before, or immediately after, the detected maintenance, and determine a wear level of the cleaning head based on the trend such as described above with reference to FIGS. 7A-7B.

Figure 9C:
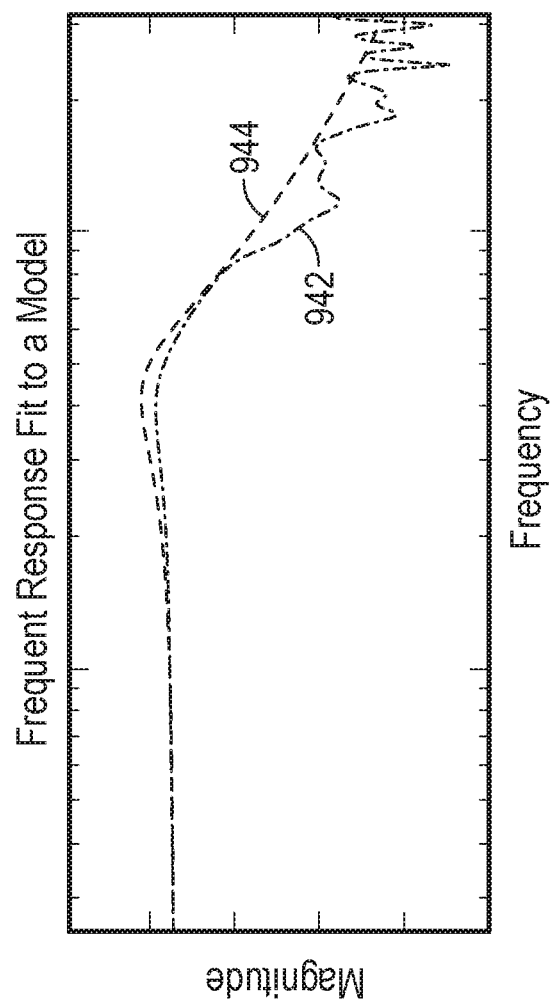
FIGS. 9A-9C illustrates an exemplary method of determining a cleaning head state based on a dynamic response of the cleaning head motor.
Figure 9A:
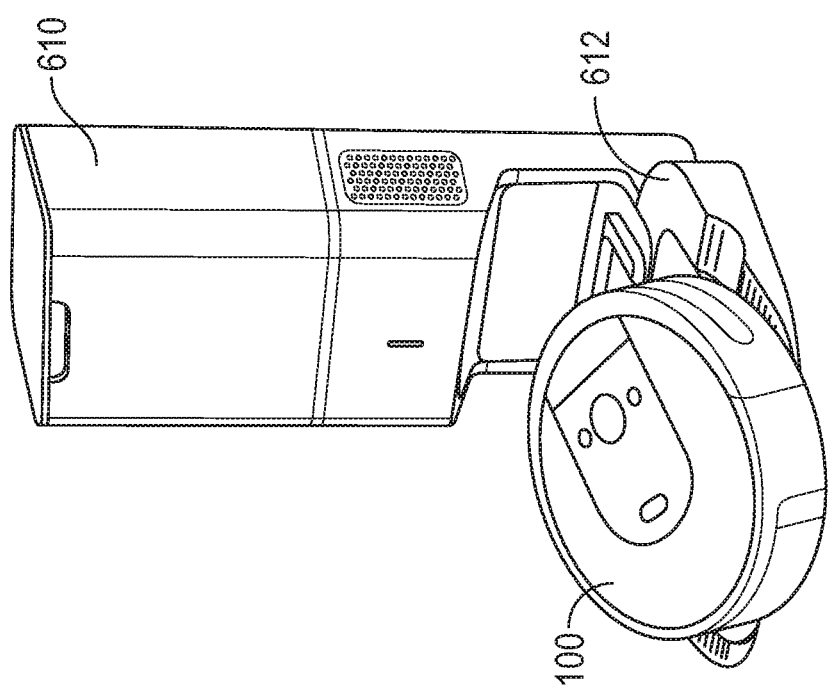
Figure 9B:
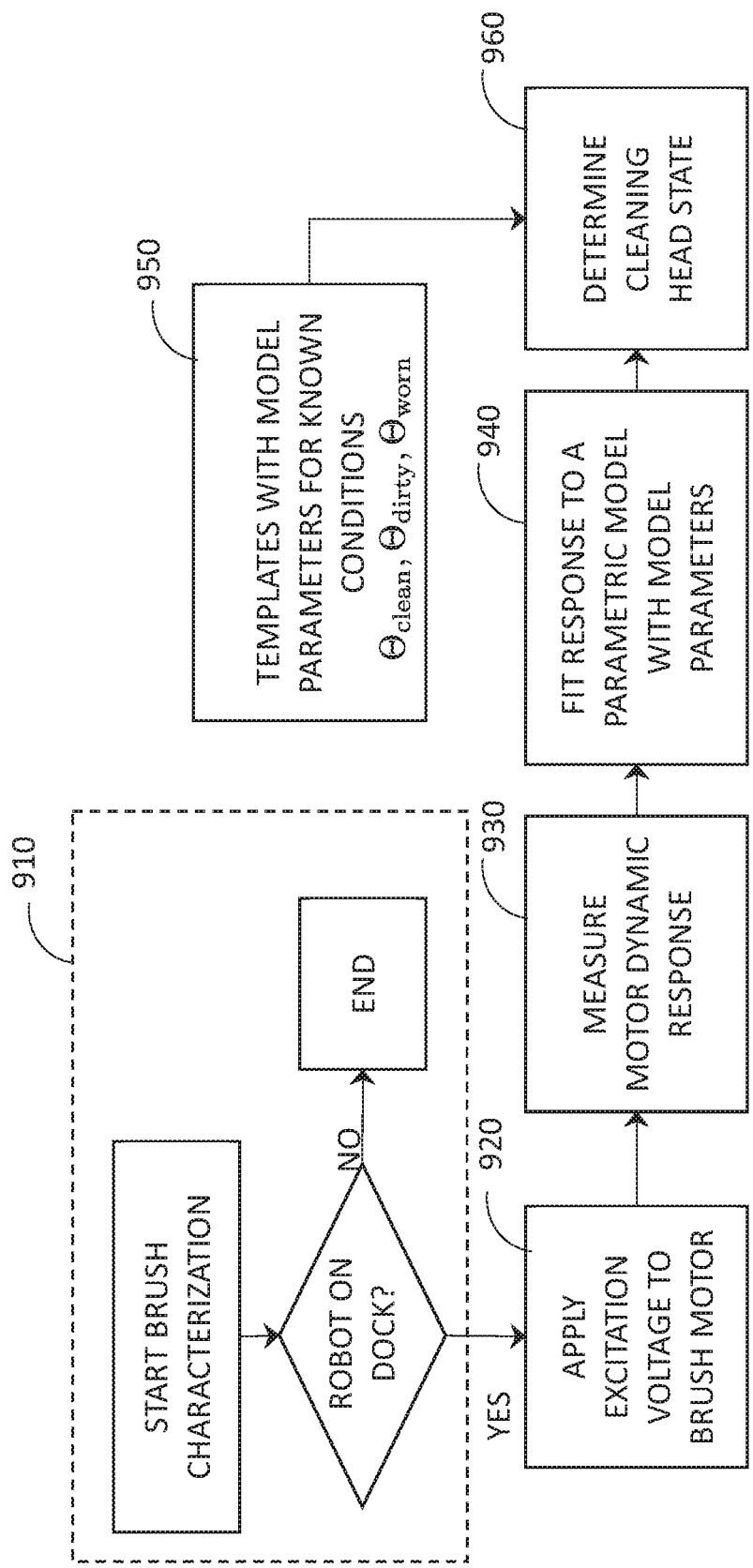

FIGS. 9A-9C illustrates an exemplary method of determining a cleaning head state based on a dynamic response of the cleaning head motor. The dynamic response can be measured when the mobile robot is operated in a cleaning head characterization mode. FIG. 9A illustrates an example of the cleaning head characterization mode, during which the mobile robot 100 remains stationary on the docking station 610. The cleaning member of the robot 100 rotatably engages the platform surface 612 of the docking station. Because the dock platform 612 has a fixed location with a known surface condition, spatial influence of floor conditions (e.g., different floor types) experienced by the mobile robot is under control. The dock platform generally has, or can be specially designed to have, hard and smooth surface. This can help control for and reduce the motor power component P1 or the energy component E1. In some examples, the cleaning member is driven in a manner such that it rotates but does not actively agitate and extract debris. As such, the motor power P or energy consumption E are less dominated by the motor power component P1 and the energy component E1, respectively. Instead, the motor power P and energy consumption E are dominated respectively by power or energy consumption due to debris accumulation or wear states of the cleaning head.

FIG. 9B illustrates an exemplary process of detecting the cleaning head state detection, at least a portion of which may be executed by the cleaning head state detector 526. At 910, the mobile robot is confirmed to be on the dock platform. At 920, an excitation signal, such as an excitation voltage u(t), is applied to the motor. The excitation signal can be a step function, or a swept sinusoid, among other forms, for the purpose of exciting dynamics that reveal debris accumulation or wear of the cleaning head. At 930, a motor dynamic response, such as frequency response, can be determined using the input voltage u(t) and resultant motor current output i(t). At 940, the motor dynamic response can be fit into a parametric model (F). The model F can be a function of one or more model parameters, $\Theta = (\theta_1, \theta_2, \ldots, \theta_K)$. Modeling fitting includes adjusting one or more model parameters through an optimization process until a specific fitting criterion is satisfied, such as a fitting error between the dynamic response and the model output $F(\Theta)$ falling below a threshold. The motor dynamic response can then be represented by the corresponding optimized model parameters $\Theta_{opt}$. Because the cleaning head characterization mode effectively controls for the spatial influence of the floor conditions, and the cleaning head is excited in a specific and deterministic manner, the optimized model parameter $\Theta_{opt}$ can more reliably represent the cleaning head state.

In an example, the parameter model F can be a transfer function model H(s) that describes the relationship between the voltage input u(t) and the current output i(t), which can be represented as follows:

$$H(s) = I(s)/U(s) \quad (1)$$

where I(s) is the Laplace transform of i(t), and U(s) the Laplace transform of u(t). The transfer function H(s) can take the form of a polynomial with a set of transfer function coefficients $\Theta = (\theta_1, \theta_2, \ldots, \theta_N)$. A non-limiting example of H(s) is given as follows:

$$H(s) = \frac{\theta_1}{s^2 + 2\theta_2\theta_3 s + \theta_1} \quad (2)$$

Referring now to FIG. 9C, which illustrates by way of non-limiting example a frequency response 942 of a cleaning head. The frequency response 942 can be represented by a magnitude response (vertical axis) at different frequencies (horizontal axis). Also shown in FIG. 9C is a magnitude response of a transfer function model 944 that fits the frequency response 942 in accordance with a specific fitting criterion. The motor dynamic response can then be represented by the transfer function coefficients $\Theta = (\theta_1, \theta_2, \theta_3)$, also referred to as measured fitted model parameter set.

Referring back to FIG. 9B, one or more of motor response templates can be received at 950. Examples of the motor response templates may include a first motor dynamic response template ($Y_D$) for a debris-accumulated cleaning head, or a second motor dynamic response template ($Y_W$) for a worn cleaning head. The motor response templates $Y_D$ and $Y_W$ can each be created when the mobile robot operations in the same cleaning head characterization mode, such as when the mobile robot remains stationary on the dock, while the cleaning member rotatably engages the platform surface of the docking station. The template $Y_D$ can be created experimentally under different known debris accumulation levels. The template can be created experimentally under different known wear levels. In some examples, a third model dynamic response template ($Y_C$) representing a clean and healthy cleaning head, can be created when the mobile robot operations in the same cleaning head characterization mode. The motor response templates can be created and stored in a memory, such as the memory circuit 530.

In various examples, any of the templates $Y_D$, $Y_W$, and optionally $Y_C$, can be represented by motor dynamic responses, such as motor frequency responses, when the mobile robot operations in the same cleaning head characterization mode. The template $Y_D$ can be created by finning multiple excitation/response experiments with various known debris levels, represented by a parametric model with a parameter set $\Theta_D = (\theta_{D1}, \theta_{D2}, \ldots, \theta_{DJ})$. Similarly, the template $Y_W$ can be created by running multiple excitation/response experiments with various known wear levels, represented by a model with a parameter set $\Theta_W = (\theta_{W1}, \theta_{W2}, \ldots, \theta_{WJ})$. The optional template $Y_C$ can be created by running multiple excitation/response experiments with the cleaning head remains in a known clean and healthy state, represented by a model with a parameter set $\Theta_C = (\theta_{C1}, \theta_{C2}, \ldots, \theta_{CK})$. In an example, $Y_D$, $Y_W$, and $Y_C$ can be modeled by respective transfer functions $H_D(s)$, $H_W(s)$, and $H_C(s)$, in a similar fashion to the transfer function H(s) for the motor dynamic response X. The parameter sets $\Theta_D$, $\Theta_W$, and $\Theta_C$ include respective transfer function coefficients. The parameter sets $\Theta_D$, $\Theta_W$, and $\Theta_C$ can then be stored in a memory.

At 960, a cleaning head state can be determined using the motor dynamic response X (e.g., the transfer function coefficients $\Theta$) from step 940, and any of the templates $Y_D$, $Y_W$, and $Y_C$ (e.g., the corresponding parameter sets $\Theta_D$, $\Theta_W$, and $\Theta_C$). A debris level can be determined based on a metric of similarity between the motor dynamic response X and the motor response template $Y_D$, or based on a comparison between $\Theta$ and $\Theta_D$. A wear level can be determined based on a metric of similarity between the motor dynamic response X and the motor response template $Y_W$, or based on a comparison between $\Theta$ and $\Theta_W$. A clean and healthy state of the cleaning head can be confirmed based on a metric of similarity between the motor dynamic response X and the motor response template $Y_C$, or based on a comparison between $\Theta$ and $\Theta_C$. In an example, the comparison between the measured fitted model parameter set $\Theta$ and the trained model parameter set such as $\Theta_D$, $\Theta_W$, or $\Theta_C$, can include a clustering analysis of one or more parameters of $\Theta$, and the corresponding one or more parameters of $\Theta_D$, $\Theta_W$, and $\Theta_C$. The measured fitted model parameters in $\Theta$ can be associated with the closest trained model parameters in one of $\Theta_D$, $\Theta_W$, and $\Theta_C$. In some example, clustering analysis can be performed using a subset (rather than all) of the parameters in $\Theta$ and the corresponding parameter subset in $\Theta_D$, $\Theta_W$, and $\Theta_C$. For example, if the parameter subset (e.g., parameter $\theta_k$ in $\Theta$) is known to represent, for example, a damping ratio or energy dissipation which is more informative to cleaning head state than other parameters representing a resonant frequency, then clustering analysis can be performed between $\theta_j$ and the corresponding parameter in the trained model parameter sets, e.g., $\theta_{Dj}$ in $\Theta_D$, $\theta_{Wj}$ in $\Theta_W$, or $\theta_{Cj}$ in $\Theta_C$.

As previously described with referenced to FIG. 7, detection of cleaning head state based on the parameter trend can be performed when the mobile robot is in active cleaning missions. In contrast, the cleaning head characterization mode requires that the mobile robot be at a fixed and known surface location, such as the dock platform. Detection of cleaning head state when operating the mobile robot in such a cleaning head characterization mode does not require repeated measurements of the robot parameter (e.g., motor power P or motor energy E) such as over multiple missions in order to control for the effect of interactions with the floor surface condition. Therefore, the cleaning head state detector 526 can determine the state of the cleaning head at any time the mobile robot is at the dock. In an example, an instantaneous recognition of debris or wear state can be made without referring to historical data, such as robot parameter values for historical cleaning missions.

Mobile Robot Predictive Maintenance (PdM) System Using a Virtual Sensor

Figure 12:
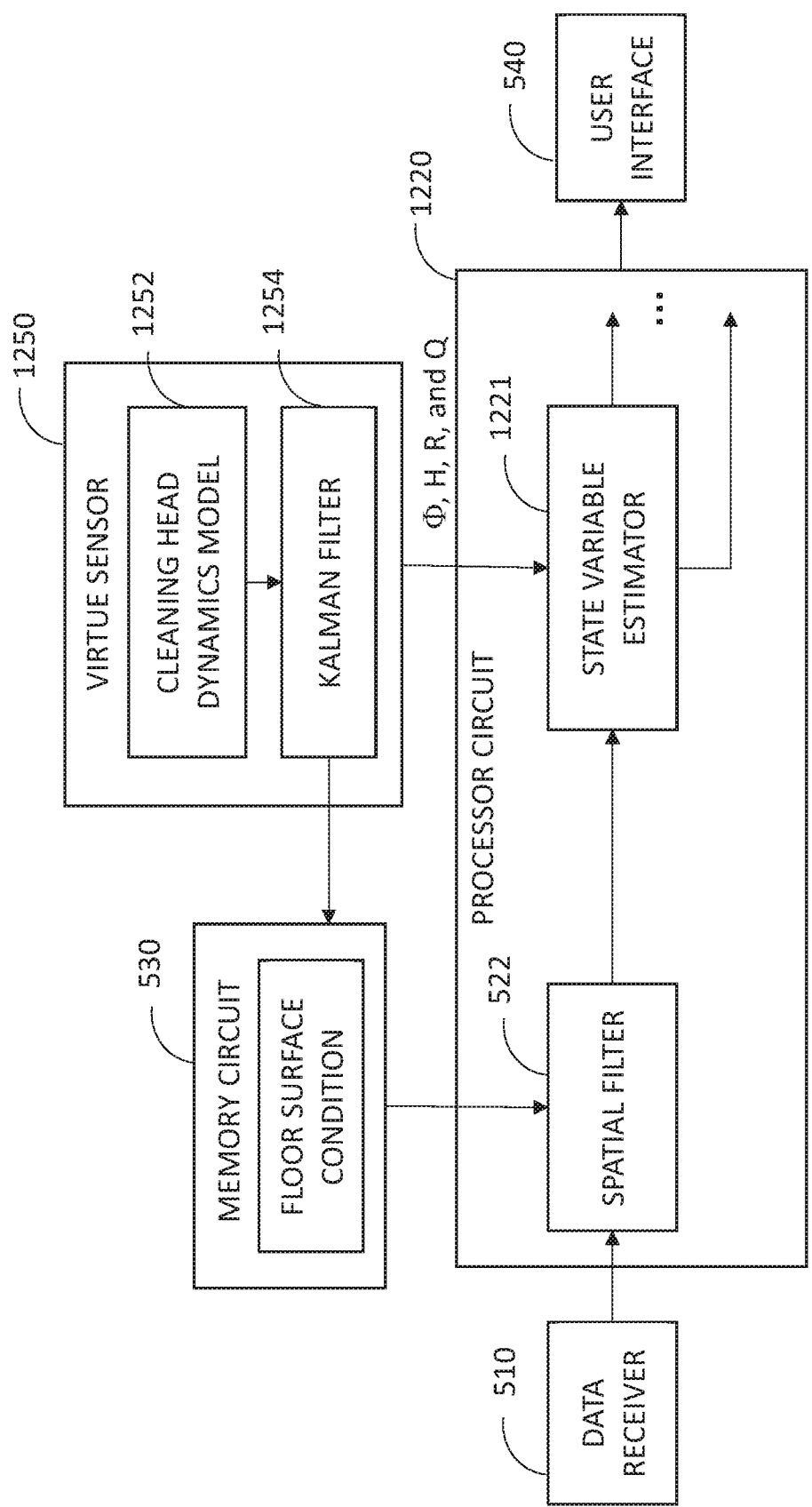
FIG. 12 is a diagram illustrating an example of a mobile robot PdM system configured to determine a cleaning head state using a virtue sensor based on a mathematical model.

FIG. 12 is a diagram illustrating an example of a mobile robot PdM system 1200. The system 1200 is an embodiment of the mobile robot PdM system 500, and can include the data receiver 510, a processor circuit 1220 which is a variant of the processor circuit 520, the memory circuit 530, and the user interface 540. The system 1200 can additionally include a virtual sensor 1250 configured to generate one or more parameters that are not directly measured by a physical sensor, but represent a state variable representative of the state of the cleaning head. In an example, the virtual sensor 1250 can include a mathematical model 1252 of the cleaning head assembly representing cleaning head dynamics. An example of the mathematical model is a linear state space model of the frequency response of the cleaning head:

$$x_{k+1} = \Phi x_k + u + \tau_d$$

$$y_m = H x_k \quad (3)$$

where u represents an excitation input to the system, $y_m$ represents an output (or observation) of the system that can be directly measured, $x_k$ represents a state of the system at time step k, $\tau_d$ represents a disturbance to the system (also known as system or process noise), $\Phi$ is a state transition matrix (from time step k to time step k+1), and H is an observation matrix between the current observation and current state. An example of the disturbance $\tau_d$ is a disturbance torque generated at the rotating cleaning head associated debris accumulation, wear or damage of the cleaning head.

The state-space model for the system frequency response can be created in a lab under artificially established known cleaning head states, such as various known debris levels or wear levels. Under each cleaning head state, the system is excited with the excitation signal u (e.g., voltage) at various different frequencies, and system response data can be collected (e.g., step voltage, measure current, angular velocity, etc.

The state-space model can be solved for matrices that parameterize the virtual sensor, such as $\Phi$ and H. The state-space model can be solved using a Kalman filter 1254. A discrete form of the Kalman filter algorithm can be represented by the following measurement update and time update equations:

$$K_k = P'_k H^T (H P'_k H^T + R)^{-1}$$

$$\hat{x}_k = \hat{x}'_k + K_k (z_k - H \hat{x}'_k)$$

$$P_k = (I - K_k H) P'_k$$

$$\hat{x}'_{k+1} = \Phi \hat{x}_k$$

$$P_{k+1} = \Phi P_k \Phi^T - Q \quad (4)$$

where K is the Kalman gain function (matrix), R is a measurement error covariance, Q is the disturbance (system or process) covariance, and $P_k'$ is a priori estimate error covariance matrix. Using the lab data collected under artificially established known cleaning head states, the Kalman filter model parameters, including matrices $\Phi$, H, R, and Q, can be determined and stored in a memory.

The processor circuit 1220 comprises a spatial filter 522 similar to the processor circuit 520 as shown in FIG. 5, and a state variable estimator 1221 configured to estimate the disturbance torque $\tau_d$ using (1) the spatially filtered robot data received from the spatial filter 522, and (2) the Kalman filter with filter parameters previously solved and saved in the memory. The spatially filtered robot data, such as measurements of motor current corresponding to the floor area with the specific surface condition as specified by the spatial filter 522, are used to update the previously established virtual sensor defined by the matrices $\Phi$, H, R, and Q of the Kalman filter. The processor circuit 1220 may also include one or more of the robot parameter generator 524, the cleaning head state detector 526, or the remaining life estimator 528, similar to the processor circuit 520. In an example, the cleaning head state detector 526 may determine the state of the cleaning head using the estimated disturbance torque $\tau_d$, among other robot data or robot parameter. In another example, the remaining life estimator 528 may determine an ERL of the cleaning head using the estimated disturbance torque $\tau_d$, among other robot data or robot parameter.

Examples of Cleaning Head State Diagnostic Based on Multi-Estimator Fusion

Figure 13:
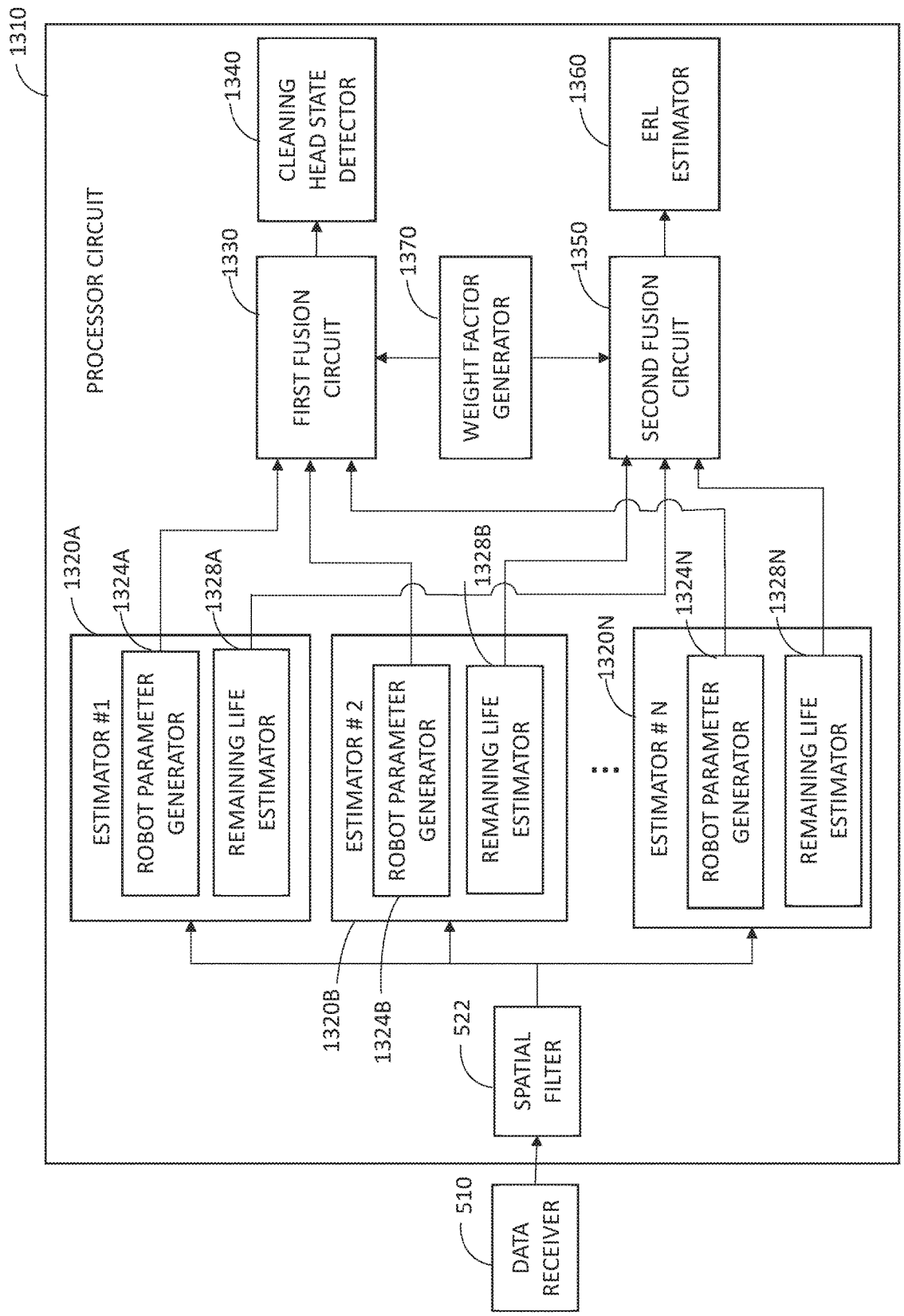
FIG. 13 is a diagram illustrating an exemplary mobile robot PdM system configured to determine cleaning head state based on based on multi-estimator fusion.
Figure 14:
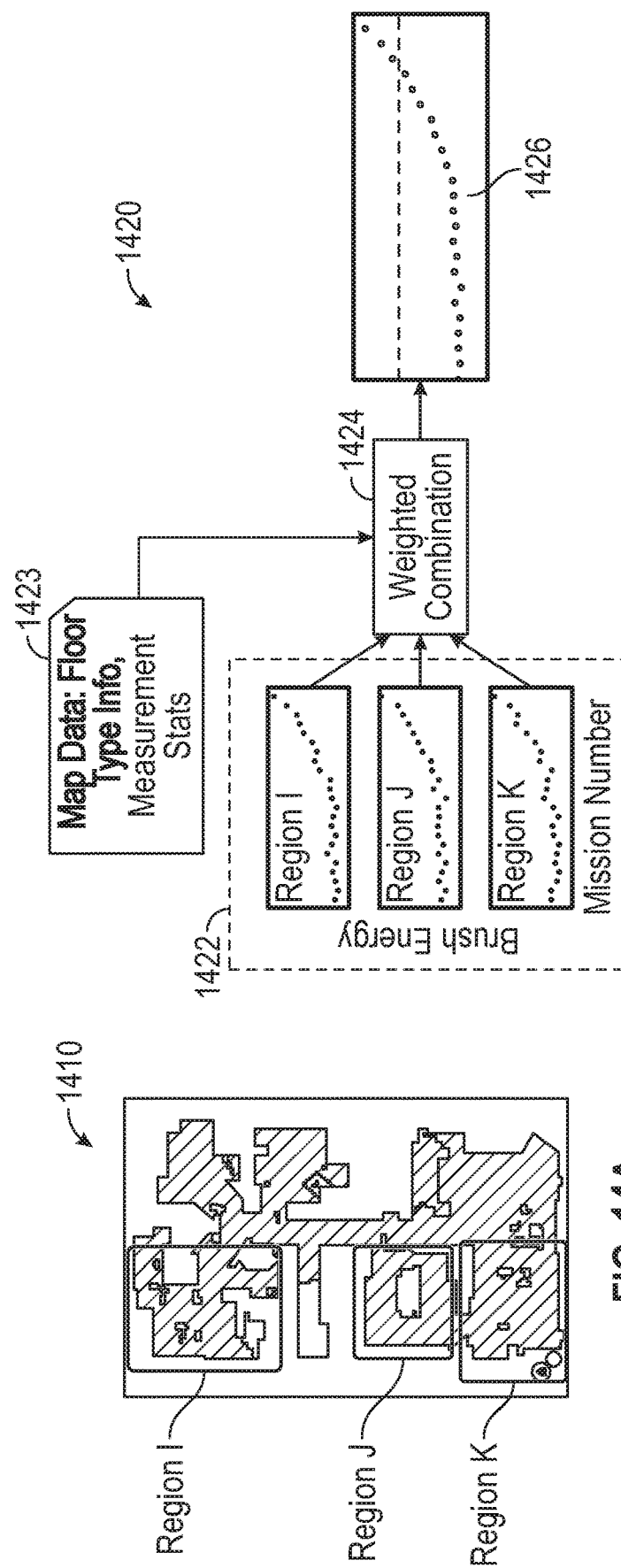
FIGS. 14A-14B are diagrams illustrating a fusion of robot parameters respectively determined by a plurality of estimators associated with different regions in an environment.

FIG. 13 is a diagram illustrating examples of a system 1300 of predictive maintenance of a cleaning head based on multi-estimator fusion. The system 1300 can include the data receiver 510, and a processor circuit 1310. The processor circuit 1310 can include the spatial filter 522 and a plurality of estimators 1320A, 1320B, . . . , 1320N each coupled to the spatial filter 522. The spatial filter 522 can recognize and extract, for the plurality of estimators, respective data portions corresponding to respective floor areas with specific surface conditions, such as by using a floor map of the environment. As described above with reference to FIG. 5, the surface condition can include, among others, spatial, geometric, and textural information of a floor area. The spatial filter 522 can extract different robot data portions for the plurality of estimators 1320A-1320N based on one or more of spatial location of a floor; size, shape, or dimension of a floor; floor surface type; mode of traversing a particular floor area; or a specific phase of cleaning mission such as docking or undocking phases. For example, the estimator 1320A can receive a robot data portion corresponding to a bedroom floor, the estimator 1320B can receive a robot data portion corresponding to a kitchen floor, and the estimator 13200 can receive a robot data portion corresponding to a dining room floor, etc. In another example, the spatial filter 522 may partition a particular room or an area in the environment into multiple regions (e.g., M-by-N regions in a gridded map). The robot data portions corresponding to the partitioned regions (i.e., robot data collected when the robot performs cleaning mission in a partition region) can then be extracted and provided to respective estimators. In another example, the spatial filter 522 may identify different regions based on the floor type, such as hardwood floor, tile, or carpeted floor. The estimator 1320A can receive from the spatial filter 522 a robot data portion corresponding to an area of hardwood floor, the estimator 1320B can receive a robot data portion corresponding to an area of tiled floor, and the estimator 13200 can receive a robot data portion corresponding to an area of carpeted floor, etc.

Each of the estimators 1320A-1320N can include a respective robot parameter generator and a remaining life estimator. Similar to the robot parameter generator 524 of the system 500, each of the robot parameter generators 1324A-1324N can determine a respective robot parameter using the robot data portion corresponding to the respective floor area with the respective floor condition. In an example, the robot parameter generators 1324A-1324N generate respective robot parameters during each cleaning mission, when the mobile robot travels across the respective floor areas associated with some or all of the estimators 1320A-1320N. When the mobile robot makes multiple trips to the same floor area (e.g., over multiple cleaning missions, or over repeated cleaning of a user-specified duplicate traversal region in one mission), the estimator associated with that floor area can accordingly generate a robot parameter for each traversal of the floor area.

The processor circuit 1310 can include a first fusion circuit 1330 configured to generate a composite robot parameter ($X_{total}$) using the robot parameters respectively determined by the plurality of estimators 1324A-1324N in a cleaning mission. In an example, $X_{total}$ can be a linear or a nonlinear combination of the robot parameters determined by the estimators 1324A-1324N, such as a weighted combination of the robot parameters each scaled by a respective weight factor:

$$X_{total} = \Sigma_{i=1}^{N} w_i \cdot X_i \tag{5}$$

where $X_i$ represents the robot parameter generated by the i-th estimator (e.g., estimator 1320I), $w_i$ represents the weight factor for $X_i$. As described above such as with reference to FIG. 5, the robot parameter may include power consumption or energy consumption of a motor driving the rotation of the cleaning head to interact with the floor and extract debris therefrom.

The processor circuit 1310 can include a weight factor generator 1370 for determining weight factors (e.g., $w_i$) for the robot parameters (e.g., $X_i$) estimated by the individual estimators based on a reliability of an estimate of cleaning head state (e.g., wear or debris accumulation) based on the corresponding robot parameter. In an example, the weight factor generator 1370 can determine the weight factors based on a floor type of the floor area associated with the respective estimator. A hard and smooth floor surface (e.g., hardwood or tile) would generally cause less friction on the floor-cleaning head interaction during active cleaning. Accordingly, the robot parameter (e.g., motor power or motor energy) from the corresponding estimator is less influenced by the floor interaction, and more reliably indicate debris or wear states of the cleaning head. In contrast, floor-cleaning head interaction may dominate the robot parameter corresponding to a carpeted floor, consequently, the robot parameter estimated for the carpeted floor is less reliably indicative of debris or wear states. A greater weight factor can therefore be applied to a robot parameter associated with a non-carpeted hard floor, and a smaller weight factor applied to a robot parameter associated with a carpeted floor.

The floor type information can be provided by a user to the system, such as marked on the floor map via the user interface 540, and associated with floor areas of different spatial locations. Alternatively, the floor type information can be detected automatically by a floor type detector coupled to one or more sensors. The acquired floor type information can be integrated into the floor map of the environment. In an example, a floor type may be determined based on power consumption while the robot traversed a floor surface with a particular floor type. A high power draw suggests a high friction surface interaction, and a low power draw suggests a low friction surface interaction. In some examples, the floor type classification can also include probability density functions for different floor types predetermined and stored in the memory. In another example, a floor type may be determined based on an inertial measurement unit (IMU) such as a gyro sensor or an accelerometer. A change in pitch as detected by a gyro can be used to determine whether the robot has traversed a floor surface threshold, or floor type interface. Such a detection of threshold, or flooring discontinuity, may suggest a change in floor type. In yet another example, the floor type may be recognized by analyzing images captured by a camera or an imaging sensor. In some examples, a floor type can be determined using an integration of sources of information, such as from different sensors as described above. Commonly assigned U.S. Pat. No. 9,993,129 entitled "MOBILE FLOOR-CLEANING ROBOT WITH FLOOR-TYPE DETECTION" describes automatic detection of various floor types of transition of floor types, the description of which is incorporated herein by reference in its entirety. The user-provided, or automatically detected, floor type information may then be used to determine weight factors for the individual robot parameters.

Additionally or alternatively, the weight factor generator 1370 can determine the weight factors for the robot parameters estimated by the individual estimators based on a statistic metric, such as a variability metric, of the robot data acquired when the mobile cleaning robot traverses the floor area associated with the respective estimator in a cleaning mission. In an example, the variability can be calculated as variance or standard deviation of motor current measurements within a cleaning mission. The current measurements include samples at a specific sampling rate (e.g., 200 Hz) of a data acquisition system. Less variable robot data is more reliably indicative of debris or wear states of the cleaning head than highly variable robot data. A greater weight factor can therefore be applied to a robot parameter associated with less variable robot data, and a smaller weight factor applied to a robot parameter associated with highly variable robot data.

The processor circuit 1310 can include a cleaning head state detector 1340 configured to generate a trend of the composite robot parameter over multiple cleaning missions each comprising traversal of one or more of the respective floor areas by the mobile cleaning robot, and to detect the state of the cleaning head based on the generated trend of the composite robot parameter. Similar to the cleaning head state detector 526 of the system 500, the state of the cleaning head can include debris accumulation level or wear or damage levels. The detection of the cleaning head state can be based on directions of change (i.e., slopes with different algebraic signs) over respective timescales, as described above with reference to FIG. 7. The detection of the cleaning head state can be presented to a user, such as via the user interface 540.

The processor circuit 1310 can include a second fusion circuit 1350 configured to generate an aggregated estimate of remaining useful life ($ERL_{agg}$) of the cleaning head using the ERLs respectively determined by the plurality of estimators 1324A-1324N in a cleaning mission. In an example, the $ERL_{agg}$ can be a linear or a nonlinear combination of the ERLs determined by the estimators 1324A-1324N, such as a weighted combination of the robot parameters each scaled by a respective weight factor:

$$ERL_{agg} = \Sigma_{i=1}^{N} w_i \cdot ERL_i \tag{6}$$

where $ERL_i$ represents the ERL estimated by the i-th estimator (e.g., estimator 1320I), represents the weight factor for $ERL_i$. The aggregated estimate of remaining useful life, $ERL_{agg}$, can be presented to a user, such as via the user interface 540. The $ERL_{agg}$ can be estimated for each cleaning mission. Alternatively, estimation of $ERL_{agg}$ can be performed on a periodic basis or upon receiving a user inquiry about the health status of the cleaning head. The estimated $ERL_{agg}$ can trigger a warning or alert message to the user if the $ERL_{agg}$ falls below a threshold.

FIGS. 14A-14B are diagrams illustrating fusion of robot parameters respectively determined by a plurality of estimators associated with different regions in an environment. FIG. 14A illustrates, by way of non-limiting example, a floor map 1410 of a robot cleaning environment, and three regions (Region i, Region j, and Region k) in the environment monitored by respective estimators. FIG. 14B illustrates the respective robot parameters generated by the respective estimates, which can be executed by the first fusion circuit 1330 of the system 1300. In this example, the robot parameters are motor energy values 1422 calculated as described above with reference to FIG. 7. The estimators determine respective motor energy values after each of a plurality of missions. A composite motor energy can be determined using combination 1424 of the motor energy from individual estimators, each weighted by a weight factor 1423 determined based on the floor type of the regions, or statistics (e.g., a variability metric) of the measured robot data, as described above with reference to the weight factor generator 1370. A trend 1426 of composite motor energy can then be generated over multiple cleaning missions, from which the cleaning head state (e.g., a debris accumulation state, or a wear state), such as by the cleaning head state detector 1340.

Figure 15:
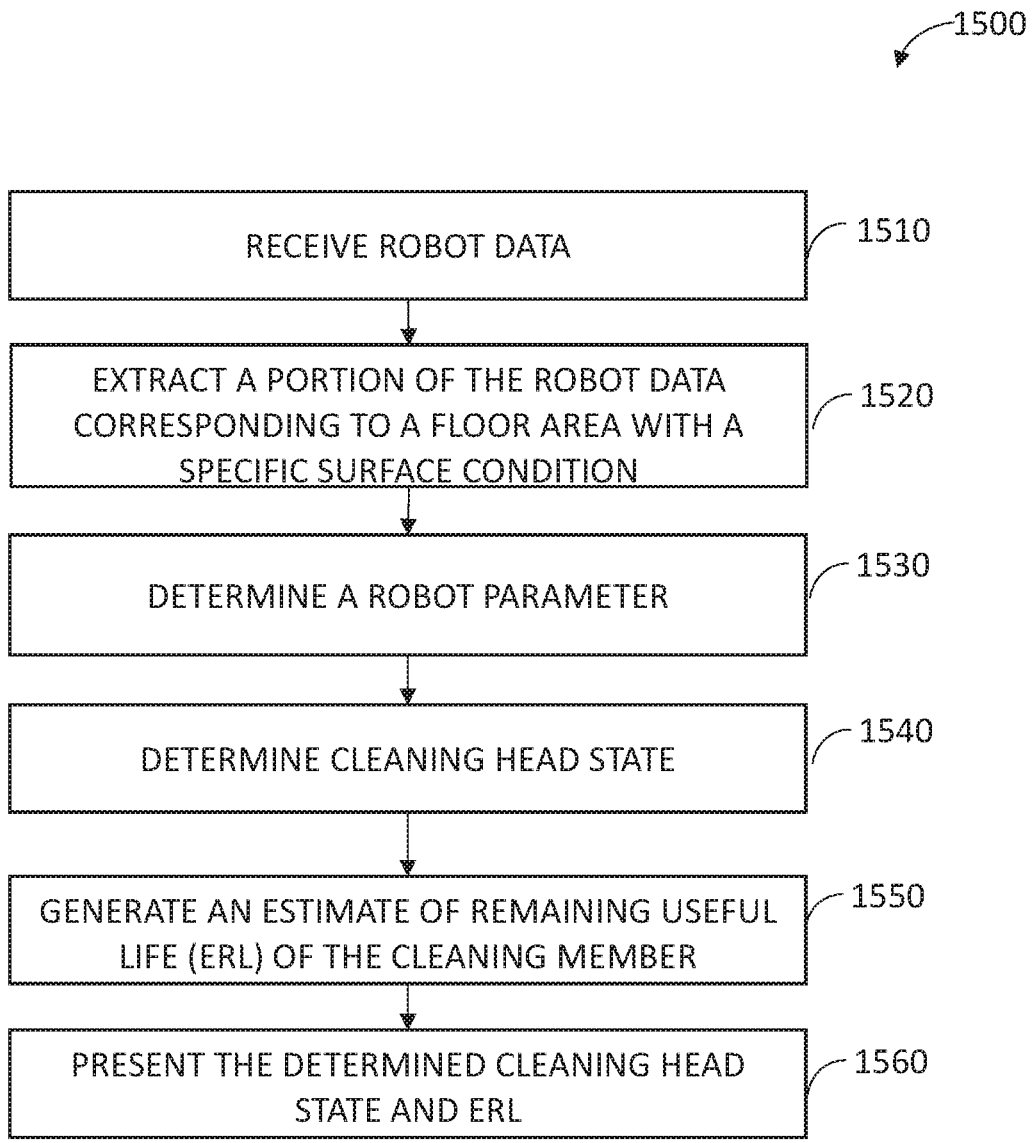
FIG. 15 is a flow diagram illustrating an example of a method of assessing a health status of a cleaning head in a mobile cleaning robot.

FIG. 15 is a flow diagram 1500 illustrating an example of a method of assessing a health status of a cleaning head assembly in a mobile cleaning robot, such as the mobile robot 100 configured to traverse and clean floor surface. The method 1500 can be implemented in, and executed by, by the mobile robot PdM system 500. The health status of the cleaning head can include information about debris accumulation levels and wear level of the cleaning head, and remaining useful life of the cleaning head.

The method 1500 commences at claim 1510 to receive robot data produced by the mobile cleaning robot during its active operation, such as while traversing an environment (e.g. a home) and cleaning a floor area in that environment. Examples of the robot data can include measurement of voltage supplied to the motor driving a cleaning member of the cleaning head assembly, motor current, angular velocity of the cleaning member, motor rotational speed, or torque generated at the cleaning member, among others. The robot data may be sensed by one or more sensors, such as the motor sensors 317. In some examples, the sensed robot data can be transformed into one or more frequency-domain metrics, such as dominant frequencies, resonances, or spectral densities, among others. In some examples, the sensed robot may include parameters generated by a virtual sensor, such as the mathematical model 1252 of the cleaning head assembly representing cleaning head dynamics. The virtual-sensor parameters represent the operating state of the cleaning head, some of which may not be feasible to be directly measured using a physical sensor. An example of the virtual-sensor parameter is a disturbance to the system (also known as system or process noise), such as a disturbance torque, FIG. 12 illustrates exemplary virtual sensors, or the mathematical models, for estimating the disturbance torque. The estimated disturbance torque, among other robot data, can be analyzed to determine a health state of the cleaning head.

At 1520, a portion of the received robot data (including data sensed by physical sensors, or by virtue sensors) corresponding to a floor area in the environment traversed repeatedly by the mobile cleaning robot can be extracted. The floor area has a specific surface condition. Extraction of the robot data is also referred to as spatial filtering of robot data, and can be performed such as by using the spatial filter 522. The surface conditions of a floor area can include a specific spatial location, a floor area of a specific size, shape, or dimension; or a floor area having a particular surface type (e.g., hardwood or carpet), among other spatial, geometric, and textural information of a floor area. In an example, information of surface conditions of one or more floor areas in the environment can be stored in a floor map.

Additionally or alternatively, data portion can be extracted at 1520 based on other conditions of the floor area. In an example, robot data can be extracted according to the mobile robot's traversing mode on a specific floor area, such as a coverage path, a traversal pattern, or a traversal speed. For example, a user may designate, on the floor map, a floor area with a specified coverage path or traversal pattern. When the mobile robot travels across and cleans the designated floor area in accordance with the designated traversal path or pattern, the robot data are collected for analyzing cleaning head state.

Additionally or alternatively, data portion can be extracted at 1520 according to a phase of a cleaning mission. As illustrated in FIG. 6, a cleaning mission generally begins with an undocking session during which the cleaning robot departs from a docking station, followed by a cleaning phase including a sequence of floor cleaning across a number of regions in the environment, and ends with a docking phase during which the cleaning robot returns to the docking station. In an example, the extracted data portion can include a first portion corresponding to the docking phase. In another example, the extracted data portion can include a second portion corresponding to the undocking phase. In yet another example, the extracted data portion can include a third portion corresponding to a specified time period with respect to docking or undocking, such as T1 seconds immediately following the undocking phase, or T2 second right before the docking phase.

At 1530, a robot parameter can be determined using the extracted portion of the robot data that corresponds to the floor area with the specific surface condition. The robot parameter can be representative of floor-cleaning head interactions (e.g., torque produced at the cleaning member), statistical characteristics of the spatially filtered robot data (e.g., average motor current during the traversal of the floor area), or frequency-domain characteristics of the spatially filtered robot data. One example of the robot parameter is power (P) consumed by a cleaning head motor that drives a cleaning head, which can be computed using one or more of motor current, battery voltage, and motor speed. Another example of the robot parameter is energy (E) consumed by the cleaning head motor to traverse across and clean the floor area with the specific surface condition, which can be computed as an integral of the power (P) over the time period for cleaning the entirety or a portion of the floor area.

At 1540, a state of the cleaning head can be determined based on the determined robot parameter, such as using the cleaning head state detector 526. The cleaning head state is indicative of at least one of a wear level, or a debris accumulation level, for the cleaning member (e.g., the rotatable members 118 or the side brush 126). In an example, the cleaning head state can be determined based on the multiple measurements of the robot parameter, such as a trend of the robot parameter over multiple cleaning missions during a specified monitoring period. Dirt and errant filaments typically accumulate in the cleaning head over days or weeks of use, and wear typically occurs over several months. As such, an energy trend during the first short time frame can be used to detect a debris accumulation level, and an energy, trend during the second longer time frame can be used to detect a wear level for the cleaning head. As illustrated in FIGS. 7A-7B, an increase trend of motor energy within a first short monitoring time period can be used to detect a debris accumulation state, and a decrease trend of motor energy within a longer monitoring time frame can be used to detect a wear state.

The cleaning head state can additionally or alternatively be determined based on a dynamic response of the cleaning head motor, estimated when the mobile robot operates in a cleaning head characterization mode, such as at the platform of the docking station, or other fixed location with a known surface condition. As illustrated in FIG. 9A-9C, one or more of a first motor response template for a worn cleaning head, or a second motor response template for a debris-accumulated cleaning head, can be generated using robot data corresponding to the cleaning member rotatably engaging the platform surface of the docking station. A state of the cleaning head can be determined based on a comparison of the determined motor frequency response to at least one of the first or second motor response template.

At 1550, an estimate of remaining useful life (ERL) of the cleaning member can be generated using the determined robot parameter provided at 1530, or alternatively using the spatially filtered robot data provided at step 1520. The ERL can be estimated using a regression model that relates the remaining useful life of the cleaning head to a signal serving as a proxy for the remaining useful life. Examples of the regression model can include a linear regression model, or a non-linear regression model such as polynomial, exponential, logarithmic regression models, among others. The ERL can additionally or alternatively be estimated using parameters estimated by the virtual sensor, such as disturbance torque, examples of which are describe above with reference to FIG. 12.

At 1560, information about mobile robot operating status and health state, such as the state of the cleaning head and/or the ERL of the cleaning head, can be presented to a user, such as via a user interface. The information may include textual and/or graphical notifications, examples of which are described above with reference to FIGS. 11A-11B. The notification can include warning of the state or level of wear or damage of the cleaning head, state or level of debris accumulation in the cleaning head, a recommendation to clean the cleaning member in response to the determined debris accumulation level, a recommendation to replace the cleaning member based on the determined wear level, or a recommendation to switch to a different model of the cleaning head different from the worn cleaning head, among other information.

Figure 16:
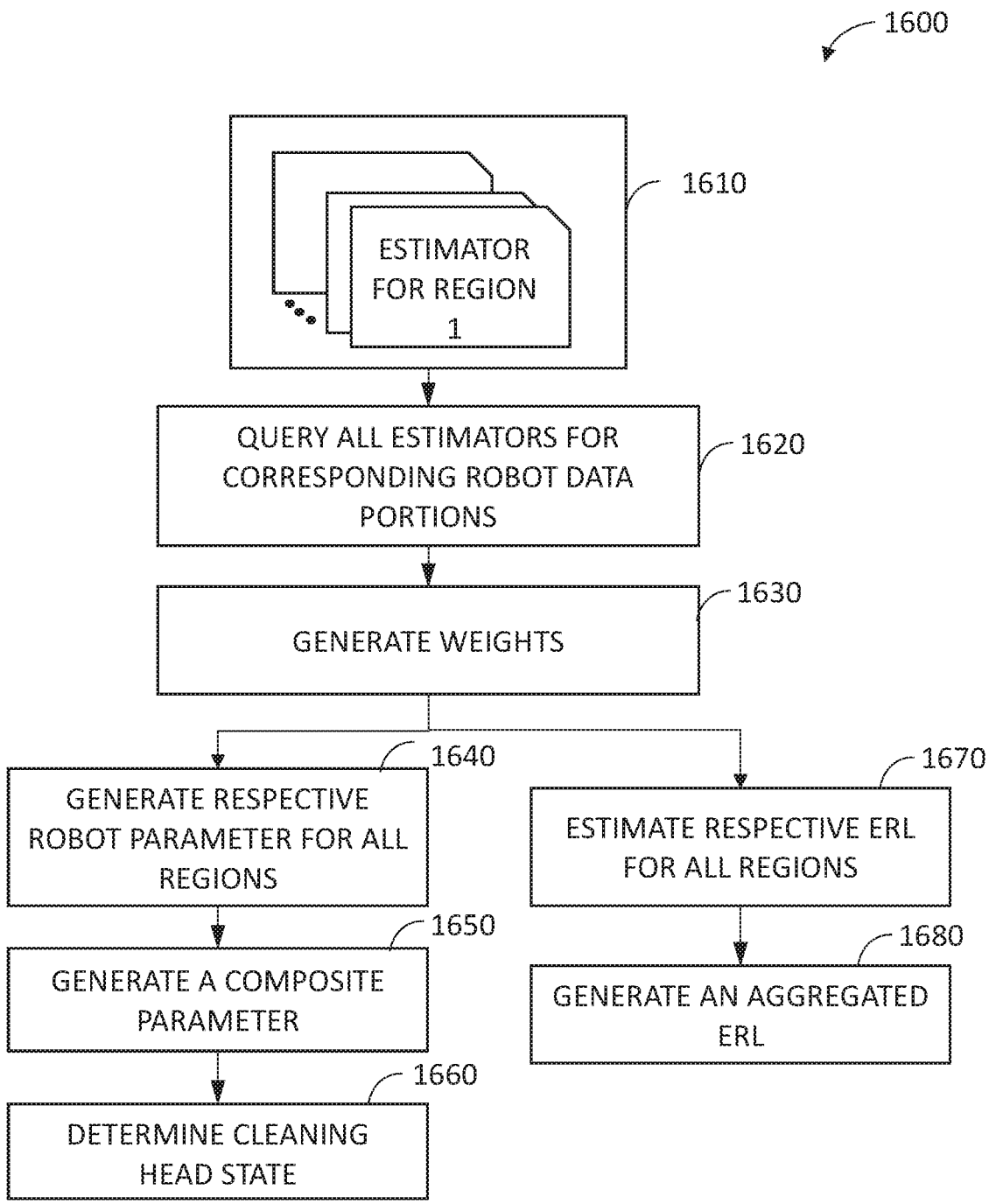
FIG. 16 is a flow diagram illustrating an example of a method of assessing a health status of a cleaning head based on multi-estimator fusion.

FIG. 16 is a flow diagram illustrating an example of a method 1600 of assessing a health status of a cleaning head assembly in a mobile cleaning robot based on multi-estimator fusion. The method 1600 can be implemented in and executed by the mobile robot PdM system 1300. The method 1600 commences at 1610, where a plurality of estimators can be associated with respective floor areas (or regions in the environment) with respective surface conditions. The surface conditions of the floor areas can include, for examples, spatial location of a floor; size, shape, or dimension of a floor; floor surface type; mode of traversing a particular floor are; or a specific phase of cleaning mission such as docking or undocking phases; among other spatial, geometric, and textural information of a floor area. At 1620, the estimators are queried for robot data corresponding to the floor area with the specific surface conditions. In an example, each estimator can receive robot data (e.g., motor current sensed by a sensor) when the mobile robot traverses the respective floor areas. The association between the estimators and the corresponding floor areas can be created and stored in a floor map.

At 1630, weight factors can be determined respectively for the plurality of estimators, such as using the weight factor generator 1370 as described above with reference to FIG. 13. In an example, the weight factor for an estimator can be determined based on the floor type of the floor area associated with the estimator. A hard and smooth floor surface (e.g., hardwood or tile) would generally cause less friction on the floor-cleaning head interaction during active cleaning. Accordingly, the robot parameter (e.g., motor power or motor energy) from the corresponding estimator is less influenced by the floor interaction, and more reliably indicate debris or wear states of the cleaning head. Therefore, a greater weight factor can be assigned to an estimator associated with a non-carpeted hard floor, and a smaller weight factor assigned to an estimator associated with a carpeted floor.

The weight factor may alternatively or additionally be determined based on statistics of robot data acquired by an estimator when the mobile robot traverses and cleans the floor area associated with the estimator during a cleaning mission. By way of non-limiting example, the statistics of robot data can include variability (e.g., variance or standard deviation) of motor current measurements received by an estimator in a cleaning mission. Less variable robot data is more reliably indicative of debris or wear states of the cleaning head than highly variable robot data. A greater weight factor can therefore be applied to a robot parameter associated with less variable robot data, and a smaller weight factor applied to a robot parameter associated with highly variable robot data.

Each estimator can generate a robot parameter at 1640, and/or an estimate of remaining useful life (ERL) of the cleaning head at 1670. At 1640, respective robot parameters can be determined using respective robot data received by the estimators. When the mobile robot makes multiple trips to the same floor area (either through repeated cleaning of a user-specified duplicate traversal region in one mission, or over multiple cleaning missions), the estimator associated with that floor area can accordingly generate a robot parameter for each traversal of the area.

At 1650, a composite robot parameter ($P_{total}$) can be generated using a linear or a nonlinear combination of the robot parameters determined respectively by the estimators, such as a weighted combination of the robot parameters each scaled by a respective weight factor provided at 1630. At 1660, the composite robot parameter can be trended over multiple cleaning missions, and the state of the cleaning head can be detected based on the trend of the composite robot parameter. In an example, a debris accumulation state and/or a wear state of the cleaning head can be determined based on the directions of change (i.e., slopes with different algebraic signs) over respective timescales, as described above with reference to FIG. 7.

The ERLs estimated respectively at 1670 for the plurality of estimators can be combined to generate an aggregated ERL ($ERL_{agg}$). The $ERL_{agg}$ can be determined using a linear or a nonlinear combination of the ERLs for the respective estimators, such as a weighted combination of the robot parameters each scaled by a respective weight factor provided at 1630. The $ERL_{agg}$ can be estimated for each cleaning mission, or determined on a periodic basis. The cleaning head state determined at 1660, and the aggregated estimate of remaining lifetime ($ERL_{agg}$) determined at 1680, can be presented to a user, or a warning can be triggered in response to the debris accumulation or wear state, or the $ERL_{agg}$ falling below a threshold.

Figure 17:
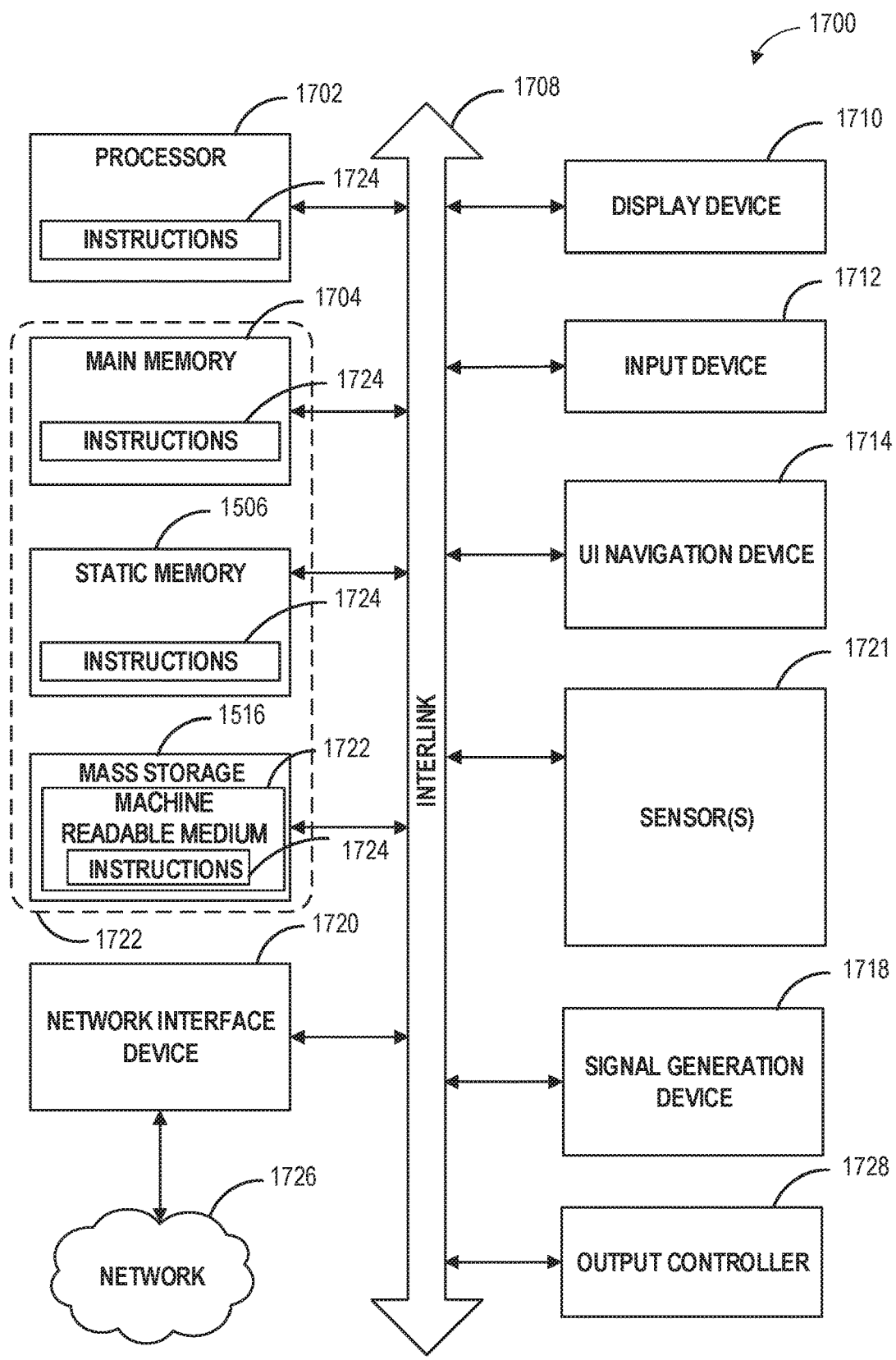
FIG. 17 is a block diagram illustrating an example machine upon which any one or more of the techniques (e.g., methodologies) discussed herein may perform.

FIG. 17 illustrates generally a block diagram of an example machine 1700 upon which any one or more of the techniques (e.g., methodologies) discussed herein may perform. Portions of this description may apply to the computing framework of various portions of the mobile robot 100, the mobile device 404, or other computing system such as a local computer system or the cloud computing system 406.

In alternative embodiments, the machine 1700 may operate as a standalone device or may be connected (e.g., networked) to other machines. In a networked deployment, the machine 1700 may operate in the capacity of a server machine, a client machine, or both in server-client network environments. In an example, the machine 1700 may act as a peer machine in peer-to-peer (P2P) (or other distributed) network environment. The machine 1700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc. to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 1700 may include a hardware processor 1702 (e.g., a central processing unit (CPU), a graphics processing unit (GPU), a hardware processor core, or any combination thereof), a main memory 1704 and a static memory 1706, some or all of which may communicate with each other via an interlink (e.g., bus) 1708. The machine 1700 may further include a display unit 1710 (e.g., a raster display, vector display, holographic display, etc.), an alphanumeric input device 1712 (e.g., a keyboard), and a user interface (UI) navigation device 1714 (e.g., a mouse). In an example, the display unit 1710, input device 1712 and UI navigation device 1714 may be a touch screen display. The machine 1700 may additionally include a storage device (e.g., drive unit) 1716, a signal generation device 1718 (e.g., a speaker), a network interface device 1720, and one or more sensors 1721, such as a global positioning system (GPS) sensor, compass, accelerometer, or other sensor. The machine 1700 may include an output controller 1728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1716 may include a machine readable medium 1722 on which is stored one or more sets of data structures or instructions 1724 (e.g., software) embodying or utilized by any one or more of the techniques or functions described herein. The instructions 1724 may also reside, completely or at least partially, within the main memory 1704, within static memory 1706, or within the hardware processor 1702 during execution thereof by the machine 1700. In an example, one or any combination of the hardware processor 1702, the main memory 1704, the static memory 1706, or the storage device 1716 may constitute machine readable media.

While the machine-readable medium 1722 is illustrated as a single medium, the term "machine readable medium" may include a single medium or multiple media (e.g., a centralized or distributed database, and/or associated caches and servers) configured to store the one or more instructions 1724.

The term "machine readable medium" may include any medium that is capable of storing, encoding, or carrying instructions for execution by the machine 1700 and that cause the machine 1700 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EPSOM)) and flash memory devices; magnetic disks, such as internal hard disks and removable disks; magneto-optical disks; and CD-ROM and DVD-ROM disks.

The instructions 1724 may further be transmitted or received over a communication network 1726 using a transmission medium via the network interface device 1720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as WiFi®, IEEE 802.16 family of standards known as WiMax®), IEEE 802.15.4 family of standards, peer-to-peer (P2P) networks, among others. In an example, the network interface device 1720 may include one or more physical jacks (e.g., Ethernet, coaxial, or phone jacks) or one or more antennas to connect to the communication network 1726. In an example, the network interface device 1720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1700, and includes digital or analog communications signals or other intangible medium to facilitate communication of such software.

Various embodiments are illustrated in the figures above. One or more features from one or more of these embodiments may be combined to form other embodiments.

The method examples described herein can be machine or computer-implemented at least in part. Some examples may include a computer-readable medium or machine-readable medium encoded with instructions operable to configure an electronic device or system to perform methods as described in the above examples. An implementation of such methods may include code, such as microcode, assembly language code, a higher-level language code, or the like. Such code may include computer readable instructions for performing various methods. The code can form portions of computer program products. Further, the code can be tangibly stored on one or more volatile or non-volatile computer-readable media during execution or at other times.

The above detailed description is intended to be illustrative, and not restrictive. The scope of the disclosure should therefore be determined with references to the appended claims, along with the full scope of equivalents to which such claims are entitled.

What is claimed is:

1. A system for assessing a health status of a cleaning member in a mobile cleaning robot, the system comprising:
    a mobile cleaning robot including a cleaning member driven by a motor and rotatably engaging a floor surface to extract debris, the mobile cleaning robot configured to traverse an environment and generate robot data;
    a processor circuit configured to:
        receive the robot data from the mobile cleaning robot;
        determine a robot parameter using a portion of the received robot data corresponding to a floor area in the environment traversed by the mobile cleaning robot, the floor area having a surface condition; and
        determine a state of the cleaning head based on the determined robot parameter, the cleaning head state indicative of at least one of a wear level of the cleaning member or a debris accumulation level in the cleaning member; and
    a user interface configured to notify a user of the determined state of the cleaning head.

2. The system of claim 1, wherein the processor circuit is configured to generate a trend of the robot parameter including over multiple cleaning missions respectively comprising traversal of the same floor area by the mobile cleaning robot, and to determine the state of the cleaning head based on the generated trend of the robot parameter.

3. The system of claim 1, wherein the processor circuit is further configured to generate an estimate of remaining useful life (ERL) of the cleaning member using the determined robot parameter.

4. The system of claim 1, wherein the robot data include measurements of one or more of:
    voltage supplied to the motor;
    motor current;
    angular velocity of the cleaning member; or
    torque generated at the cleaning member.

5. The system of claim 3, wherein the processor circuit is configured to:
    estimate a state variable of the cleaning member using (1) a mathematical model of the cleaning head assembly representing cleaning head dynamics, and (2) the data portion corresponding to the floor area with the surface condition; and
    generate the ERL of the cleaning member using the estimated state variable.

6. The system of claim 1, wherein the processor circuit is configured extract the portion of the received robot data corresponding to the floor area with the surface condition based on a floor map containing information about surface conditions of one or more floor areas in the environment, the surface condition including one or more of:
    a floor type;
    a floor surface at a specific spatial location of the environment;
    a platform surface of a docking station for the mobile cleaning robot; or
    a floor surface having a specific dimension or shape.

7. The system of claim 1, wherein the processor circuit is configured to extract the portion of the received robot data according to a phase of a cleaning mission including at least one of:
    a docking phase upon which the mobile cleaning robot returns to a docking station; or
    an undocking phase upon which the mobile cleaning robot departs the docking station.

8. The system of claim 1, wherein the robot parameter includes energy generated by the motor for driving the cleaning member across the floor area with the surface condition, and wherein the processor circuit is configured to:
    generate a trend of motor energy including over multiple cleaning missions respectively comprising traversal of the same floor area by the mobile cleaning robot;
    determine the debris accumulation level based on an increase trend of the motor energy during a first monitoring period; and
    determine the wear level based on a decrease trend of the motor energy during a second monitoring period longer than the first monitoring period.

9. The system of claim 1, wherein the robot parameter includes a dynamic response of the motor driving the cleaning member to rotatably engage a platform surface of a docking station for the mobile cleaning robot;
    wherein the processor circuit is configured to determine the state of the cleaning head based on a comparison of the determined dynamic response of the motor to one or more of a first motor response template for a worn cleaning head, or a second motor response template for a debris-accumulated cleaning head; and wherein the first and second motor response templates are each generated using robot data corresponding to the cleaning member rotatably engaging the platform surface of the docking station.

10. The system of claim 9, wherein the processor circuit is configured to:
generate a parametric model to fit the determined dynamic response of the motor;
determine one or more model parameters for the parametric model such that the fitting satisfies a specific criterion; and
determine the state of the cleaning head using the determined one or more model parameters.

11. The system of claim 1, comprising a plurality of estimators associated with respective floor areas in the environment with respective surface conditions, wherein:
the plurality of estimators each is configured to determine a respective robot parameter using a portion of the received robot data corresponding to the respective floor area; and
the processor circuit is configured to:
generate a composite robot parameter using the robot parameters respectively determined by the plurality of estimators in a cleaning mission;
generate a trend of the composite robot parameter over multiple cleaning missions each comprising traversal of one or more of the respective floor areas by the mobile cleaning robot; and
determine the state of the cleaning head based on the generated trend of the composite robot parameter.

12. The system of claim 11, wherein the processor circuit is configured to determine for each of the plurality of estimators a respective weight factor based on a floor type of the floor area associated with the respective estimator or based on a variability metric of the robot data acquired when the mobile cleaning robot traverses the floor area associated with the respective estimator in a cleaning mission, and to generate the composite robot parameter using a combination of the robot parameters weighted by respective weight factors.

13. The system of claim 1, wherein the user interface is configured to: generate a recommendation to clean the cleaning member in response to the determined debris accumulation level, or a recommendation to replace the cleaning member based on the determined wear level; or prompt the user to purchase a new cleaning head to replace the cleaning head with the determined wear level.

14. A method of assessing a health status of a cleaning member in a mobile cleaning robot, the method comprising:
traversing an environment and generating robot data using a mobile cleaning robot including a cleaning member driven by a motor and rotatably engaging a floor surface to extract debris;
collecting robot data from the mobile cleaning robot using a processor circuit;
determining, via the processor circuit, a robot parameter using a portion of the received robot data corresponding to a floor area in the environment traversed by the mobile cleaning robot, the floor area having a surface condition;
determining, via the processor circuit, a state of the cleaning head based on the determined robot parameter, the cleaning head state indicative of at least one of a wear level of the cleaning member or a debris accumulation level in the cleaning member; and
presenting on a user interface the determined state of the cleaning head.

15. The method of claim 14, comprising extracting the portion of the received robot data corresponding to the floor area with the surface condition based on a floor map containing information about surface conditions of one or more floor areas in the environment, the surface condition including one or more of:
a floor type;
a floor surface at a specific location in the environment;
a platform surface of a docking station for the mobile cleaning robot; or
a floor surface having a specific dimension or shape.

16. The method of claim 14, comprising extracting the portion of the received robot data based on a specific phase of a cleaning mission including at least one of:
a docking phase upon which the mobile cleaning robot returns to a docking station; or
an undocking phase upon which the mobile cleaning robot departs the docking station.

17. The method of claim 14, further comprising:
estimating a state variable of the cleaning member using (1) a mathematical model of the cleaning head assembly representing cleaning head dynamics, and (2) the data portion corresponding to the floor area with the surface condition;
generating an estimate of remaining useful life (ERL) of the cleaning member using the estimated state variable.

18. The method of claim 14, wherein the robot parameter includes energy generated by the motor for driving the cleaning member across the floor area with the surface condition, the method comprising:
generating a trend of the robot parameter including over multiple cleaning missions respectively comprising traversal of the same floor area by the mobile cleaning robot
determining the debris accumulation level based on an increase trend of the motor energy during a first monitoring period; and
determining the wear level based on a decrease trend of the motor energy during a second monitoring period longer than the first monitoring period.

19. The method of claim 14, wherein the robot parameter includes a dynamic response of the motor driving the cleaning member to rotatably engage a platform surface of a docking station for the mobile cleaning robot;
wherein determining the state of the cleaning head is based on a comparison of the determined dynamic response of the motor to one or more of a first motor response template for a worn cleaning head, or a second motor response template for a debris-accumulated cleaning head; and
wherein the first and second motor response templates are each generated using robot data corresponding to the cleaning member rotatably engaging the platform surface of the docking station.

20. The method of claim 14, comprising:
determining at least a first robot parameter using a first portion of the received robot data corresponding to a first floor area in the environment having a first surface condition, and a second robot parameter using a second portion of the received robot data corresponding to a second floor area in the environment having a second surface condition, the first and second floor areas each traversed by the mobile cleaning robot;

generating a composite robot parameter using at least the first and second robot parameters;

generating a trend of the composite robot parameter over multiple cleaning missions each comprising traversal of one or more of the first or the second floor area by the mobile cleaning robot; and determining the state of the cleaning head based on the generated trend of the composite robot parameter.

* * * * *